US006760478B1

(12) United States Patent
Adiletta et al.

(10) Patent No.: US 6,760,478 B1
(45) Date of Patent: Jul. 6, 2004

(54) METHOD AND APPARATUS FOR PERFORMING TWO PASS QUALITY VIDEO COMPRESSION THROUGH PIPELINING AND BUFFER MANAGEMENT

(75) Inventors: Matthew James Adiletta, Worcester, MA (US); King-Wai Chow, Marlboro, MA (US); Samuel William Ho, Marlborough, MA (US); Robert Clint Rose, Hudson, MA (US); William Ralph Wheeler, Southborough, MA (US); Duane E. Galbi, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 88 days.

(21) Appl. No.: 09/613,359

(22) Filed: Jul. 10, 2000

Related U.S. Application Data

(63) Continuation of application No. 08/670,199, filed on Jun. 21, 1996, now Pat. No. 6,101,276.

(51) Int. Cl.[7] .............................. G06K 9/36; H04N 7/12
(52) U.S. Cl. .................. 382/236; 382/239; 375/240.02; 375/240.13; 375/240.16
(58) Field of Search ................................ 382/236, 232, 382/234, 239; 348/416, 699, 402, 409, 390, 415, 413, 405, 384; 375/340.02, 240.01, 240.12, 240.13, 240.16, 240.14

(56) References Cited

U.S. PATENT DOCUMENTS

| 4,541,012 A | 9/1985 | Tescher | 358/133 |
|---|---|---|---|
| 4,646,148 A | 2/1987 | Lienard et al. | 382/236 |
| 4,779,131 A | 10/1988 | Matsumoto et al. | 348/699 |
| 4,809,350 A | 2/1989 | Shimoni et al. | 382/238 |
| 4,868,653 A | 9/1989 | Golin et al. | 358/133 |

(List continued on next page.)

OTHER PUBLICATIONS

"21230 Video Codec—Product Brief," publication of Digital Equipment Corporation, 1995 (4 pp.).
Adiletta, M. et al., "Architecture of a flexible real–time video encoder/decoder: The DECchip 21230," *SPIE* vol. 3021, 1997 (pp. 136–148).
Liou, M., "Overview of the px64 kbit/s Video Coding Standard," *Communications of the ACM: 34(4)*, Apr. 1991, pp. 60–63.
Wallace, G.K., "The JPEG Still Picture Compression Standard," *Communications of the ACM: 34 (4)*, Apr. 1991, pp. 31–44.
LeGall, D., "MPEG:A Video Compression Standard for Mulitmedia Applications," *Communications of the ACM: 34 (4)*, Apr. 1991. pp. 47–58.
Liou, M.L., "Visual Telephony as an ISDN Application," *IEEE Communications Magazine*, Feb. 1990, pp. 30–38.
"Line Transmission of Non–Telephone Signals," ITU–T standard, pp. 1–25.

*Primary Examiner*—Wenpeng Chen

(57) ABSTRACT

An apparatus and method for performing two-pass real time video compression is provided. Tactical decisions such as encoding and quantization values are determined in software, whereas functional execution steps are performed in hardware. By appropriately apportioning the tasks between software and hardware, the benefits of each type of processing are exploited, while minimizing both hardware complexity and data transfer requirements. One key concept that allows the compression unit to operate in real time is that the architecture and pipelining both allow for B frames to be executed out of order. By buffering B frames, two-pass motion estimation techniques can be performed to tailor bit usage to the requirements of the frame, and therefore provide a more appealing output image.

17 Claims, 59 Drawing Sheets

U.S. PATENT DOCUMENTS

| | | | |
|---|---|---|---|
| 5,122,873 A | 6/1992 | Golin | 358/133 |
| 5,164,819 A | 11/1992 | Music | 348/420 |
| 5,177,608 A | 1/1993 | Ohki et al. | 348/416 |
| 5,185,819 A | 2/1993 | Ng et al. | 382/56 |
| 5,208,673 A * | 5/1993 | Boyce | 358/167 |
| 5,227,878 A | 7/1993 | Puri et al. | 358/136 |
| 5,231,484 A | 7/1993 | Gonzales et al. | 358/133 |
| 5,247,357 A | 9/1993 | Israelsen | 348/418 |
| 5,263,100 A | 11/1993 | Kim et al. | 382/239 |
| 5,265,180 A | 11/1993 | Golin | 382/56 |
| 5,301,205 A | 4/1994 | Tsutsui et al. | 375/1 |
| 5,365,272 A | 11/1994 | Siracusa | 348/426 |
| 5,371,547 A | 12/1994 | Siracusa et al. | 348/426 |
| 5,379,122 A | 1/1995 | Eschbach | 358/426 |
| 5,379,355 A | 1/1995 | Allen | 382/138 |
| 5,384,598 A | 1/1995 | Rodriguez et al. | 348/384 |
| 5,404,168 A | 4/1995 | Yamada et al. | 348/405 |
| 5,412,431 A | 5/1995 | Vogel | 348/405 |
| 5,416,604 A | 5/1995 | Park | 358/433 |
| 5,428,567 A | 6/1995 | Horvath et al. | 365/78 |
| 5,440,346 A | 8/1995 | Alattar et al. | 348/420 |
| 5,448,297 A | 9/1995 | Alattar et al. | 348/415 |
| 5,453,799 A | 9/1995 | Yang et al. | 348/699 |
| 5,457,675 A | 10/1995 | Suzuki et al. | 369/124 |
| 5,461,378 A | 10/1995 | Shimoyoshi et al. | 341/51 |
| 5,483,287 A | 1/1996 | Siracusa | 348/426 |
| 5,491,519 A | 2/1996 | Kim | 348/520 |
| 5,510,840 A | 4/1996 | Yonemitsu et al. | 348/402 |
| 5,544,239 A | 8/1996 | Golin et al. | 382/236 |
| 5,557,330 A | 9/1996 | Astle | 348/394 |
| 5,559,557 A | 9/1996 | Kato | 348/405 |
| 5,574,504 A | 11/1996 | Yagasaki et al. | 348/415 |
| 5,615,287 A * | 3/1997 | Fu et al. | 382/232 |
| 5,625,759 A | 4/1997 | Freeman | 395/114 |
| 5,640,208 A * | 6/1997 | Fujinami | 375/240.14 |
| 5,657,086 A * | 8/1997 | Tahara et al. | 375/240.13 |
| 5,684,534 A * | 11/1997 | Harney et al. | 375/240.25 |
| 5,724,098 A | 3/1998 | Murakami et al. | 348/416 |
| 5,731,850 A * | 3/1998 | Maturi et al. | 348/699 |
| 5,742,346 A | 4/1998 | Sievers et al. | 348/420 |
| 5,838,834 A * | 11/1998 | Saito | 382/251 |
| 6,101,276 A * | 8/2000 | Adiletta et al. | 382/236 |
| 6,252,991 B1 * | 6/2001 | Uchio et al. | 382/236 |

\* cited by examiner

310

| FRAME | A | B | C | D | E | F | G | H | I | J |
|---|---|---|---|---|---|---|---|---|---|---|
| FRAME INDEX | 1 | 2 | 3 | 4 | 5 | 6 | 7 | 8 | 9 | 10 |
| 311a PRIOR TO REFERENCE FRAME | B | P | B | B |   | I | B | B | P | B |
| 311b P MATCHES FRAME F | B | P | B | B | I | p | B | B | P | B |

| FRAME | A | B | C | D | E | F | G | H | I | J |
|---|---|---|---|---|---|---|---|---|---|---|
| FRAME INDEX | 1 | 2 | 3 | 4 | 5 | 6 | 7 | 8 | 9 | 10 |
| 313a SUBSEQUENT TO REF. FRAME | P | B | B | I |   | B | B | P | B | B |
| 313b p MATCHES FRAME D | P | B | B | I | p | B | B | P | B | B |

| FRAME | A | B | C | D | E | F | G | H | I | J |
|---|---|---|---|---|---|---|---|---|---|---|
| FRAME INDEX | 1 | 2 | 3 | 4 | 5 | 6 | 7 | 8 | 9 | 10 |
| 315a BETWEEN TWO B FRAMES | B | B | I | B |   | B | P | B | B | P |
| 315b p MATCHES FRAME G | B | B | I | B | B | P | p | B | B | P |

FIG. 23C

```
/* STAGE 1 */
    r3 = o2 + o5;
    r6 = o2 - o5;

/* STAGE 2 */
    r1 = o0 + o7;
    r8 = o0 - o7;
    r18 = r6 * 1c6;

/* STAGE 3 */
    r2 = o1 + o6;
    r7 = o1 - o6;
    r21 = r6 * 1c7;

/* STAGE 4 */
    r4 = o3 + o4;
    r14 = r5 + r7;
    r20 = r7 * 1c4;

/* STAGE 5 */
    r5 = o3 - o4;
    r11 = r2 - r3;
    r19 = r14 * 1c5;

/* STAGE 6 */
    r10 = r2 + r3;
    r16 = r5 * 1c9;
```

```
/* STAGE 7 */
    r12 = r1 - r4;
    r13 = r6 + r5;
    r24 = r11 * 1c3;

/* STAGE 8 */
    r9 = r1 + r4;
    r15 = r11 + r12;
    r26 = r12 * 1o1;

/* STAGE 9 */
    r22 = r9 + r10;
    r25 = r15 * 1c2;

/* STAGE 10 */
    r23 = r9 - r10;
    r17 = r13 * 1c8;

/* STAGE 11 */
    r28 = r18 + r19;
    r34 = r28 + r25;
```

```
/* STAGE 12 */
    r30 = r21 + r17;
    r33 = r25 + r24;
    r31 = r22 * 1c11;

/* STAGE 13 */
    r29 = r19 + r20;
    r36 = r30 - r28;
    r32 = r23 * 1c11;

/* STAGE 14 */
    r27 = r16 + r17;
    r36 = r28 + r30;
    r40 = r35 * 1c10;

/* STAGE 15 */
    r35 = r27 + r29;

/* STAGE 16 */
    r37 = r27 - r29;
    r39 = r35 + r38;

/* STAGE 17 */
    r42 = r35 - r38;
    r41 = r37 * 1c10;

/* STAGE 18 */
    r41 = r37 * 1c10;
```

FIG. 30B

```
/* STAGE 1 */
    r2 = o5 * 1c10;
/* STAGE 2 */
    r5 = o0 + o4;
    r6 = o0 - o4;
    r3 = o3 * 1c10;
/* STAGE 3 */
    r1 = o1 + o7;
    r4 = o1 - o7;
    r13 = r6 * 1c11;
/* STAGE 4 */
    r7 = o6 + o2;
    r8 = r1 + r3;
    r14 = o6 * 1c3;
/* STAGE 5 */
    r11 = r2 + r4;
    r10 = r1 - r3;
    r15 = r7 * 1c2;
/* STAGE 6 */
    r9 = r4 - r2;
    r17 = r11 + r8
    r16 = o2 * 1c1;
```

```
/* STAGE 7 */
    r18 = r9 + r10;
    r25 = r10 * 1c4;
/* STAGE 8 */
    r20 = r15 + r16;
    r24 = r18 * 1c5;
/* STAGE 9 */
    r19 = r14 + r15;
    r23 = r9 * 1c6;
/* STAGE 10 */
    r28 = r19 + r13;
    r33 = r25 + r24;
    r21 = r8 * 1c9;
/* STAGE 11 */
    r29 = r13 - r19;
    r36 = r28 + r33;
    r22 = r17 * 1c8;
```

```
/* STAGE 12 */
    r32 = r23 + r24;
    r41 = r28 - r33;
    r12 = r5 * 1c11;
/* STAGE 13 */
    r31 = r21 + r22;
    r37 = r29 + r32;
    r26 = r11 * 1c7;
/* STAGE 14 */
    r30 = r12 - r20;
    r40 = r29 - r32;
/* STAGE 15 */
    r27 = r20 + r12;
    r38 + r30 + r31;
/* STAGE 16 */
    r34 = r22 + r26;
    r39 = R30 - r31;
/* STAGE 17 */
    r35 = r27 + r34;
    r42 = r27 - r34;
/* STAGE 18 */
```

FIG. 30D

BLOCK ELEMENT ARRAY:

DCT DOUBLE BUFFER STORAGE:

DCT DATA STORE ORGANIZATION — 651

| RAM ADDR WORDLINE | | | | | | | | |
|---|---|---|---|---|---|---|---|---|
| 0  | 63 | 0  | 7  | 56 |
| 1  | 62 | 1  | 6  | 57 |
| 2  | 61 | 2  | 5  | 58 |
| 3  | 60 | 3  | 4  | 59 |
| 4  | 55 | 8  | 15 | 48 |
| 5  | 54 | 9  | 14 | 49 |
| 6  | 53 | 10 | 13 | 50 |
| 7  | 52 | 11 | 12 | 51 |
| 8  | 47 | 16 | 23 | 40 |
| 9  | 46 | 17 | 22 | 41 |
| 10 | 45 | 18 | 21 | 42 |
| 11 | 44 | 19 | 20 | 43 |
| 12 | 39 | 24 | 31 | 32 |
| 13 | 38 | 25 | 30 | 33 |
| 14 | 37 | 26 | 29 | 34 |
| 15 | 36 | 27 | 28 | 35 |

DCT DOUBLE BUFFER ADDRESSING — 652

| RAM ADDR WORDLINE | TRANSFORM DOMAIN | ALGORITHM |
|---|---|---|
| 2, 0, 1, 3 | ROWS 0:3 | ROW 0:3 |
| 14, 12, 13, 15 | ROWS 4:7 | ROW 0:3 +12 |
| 8, 0, 4, 12 | COLS 0:3 | ROW 0:3 × 4 |
| 11, 3, 7, 15 | COLS 4:7 | ROW 0:3 × 4 +3 |

RAM ADDR BITLINE CONTROL — 653

| DCT CONDITION | | | | |
|---|---|---|---|---|
| ROW 0:3 | R | L | R | L |
| ROW 4:7 | | | | |
| COL 0:3 | R | L | L | R |
| COL 4:7 | | | | |

DCT OPERAND FETCH ORDER: — 654

| LEFT | RIGHT |
|---|---|
| 2 | 5 |
| 0 | 7 |
| 1 | 6 |
| 3 | 4 |

FIG. 33

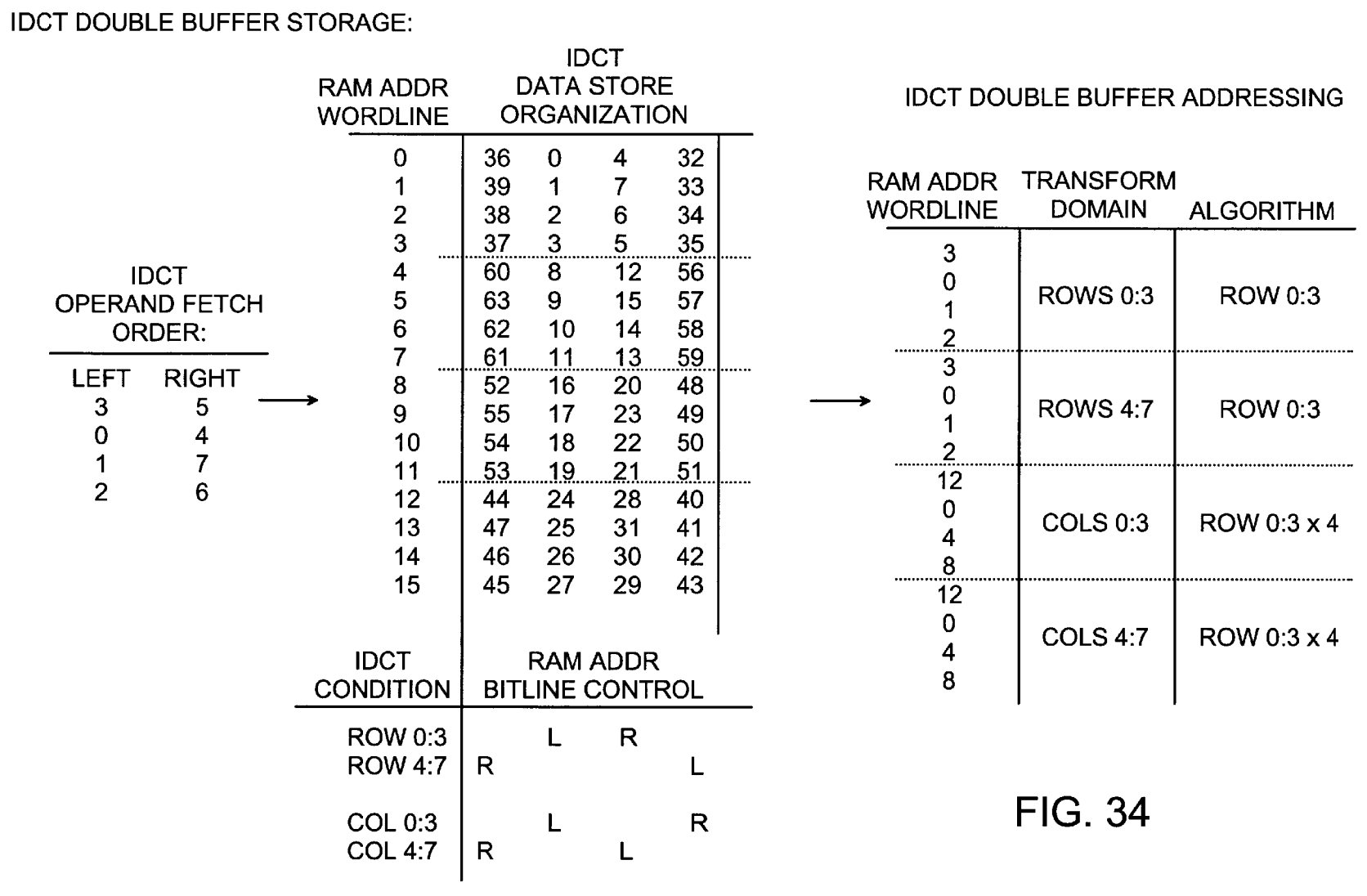

IDCT DOUBLE BUFFER STORAGE:

| RAM ADDR WORDLINE | IDCT DATA STORE ORGANIZATION | | | |
|---|---|---|---|---|
| 0  | 0  | 4  | 32 | 36 |
| 1  | 1  | 7  | 33 | 39 |
| 2  | 2  | 6  | 34 | 38 |
| 3  | 3  | 5  | 35 | 37 |
| 4  | 8  | 12 | 56 | 60 |
| 5  | 9  | 15 | 57 | 63 |
| 6  | 10 | 14 | 58 | 62 |
| 7  | 11 | 13 | 59 | 61 |
| 8  | 16 | 20 | 48 | 52 |
| 9  | 17 | 23 | 49 | 55 |
| 10 | 18 | 22 | 50 | 54 |
| 11 | 19 | 21 | 51 | 53 |
| 12 | 24 | 28 | 40 | 44 |
| 13 | 25 | 31 | 41 | 47 |
| 14 | 26 | 30 | 42 | 46 |
| 15 | 27 | 29 | 43 | 45 |

IDCT OPERAND FETCH ORDER:

| LEFT | RIGHT |
|---|---|
| 3 | 5 |
| 0 | 4 |
| 1 | 7 |
| 2 | 6 |

| IDCT CONDITION | RAM ADDR BITLINE CONTROL | | | |
|---|---|---|---|---|
| ROW 0:3 | R | L | R | L |
| ROW 4:7 |   |   |   |   |
| COL 0:3 | R | L | L | R |
| COL 4:7 |   |   |   |   |

IDCT DOUBLE BUFFER ADDRESSING

| RAM ADDR WORDLINE | TRANSFORM DOMAIN | ALGORITHM |
|---|---|---|
| 3, 0, 1, 2 | ROWS 0:3 | ROW 0:3 |
| 3, 0, 1, 2 | ROWS 4:7 | ROW 0:3 |
| 12, 0, 4, 8 | COLS 0:3 | ROW 0:3 x 4 |
| 12, 0, 4, 8 | COLS 4:7 | ROW 0:3 x 4 |

FIG. 34

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 |
|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 0 | 0 | 1 | 0 | 1 | 0 | 0 | 0 | 1 | 1 | 1 | 1 | 0 | 0 | 0 | 1 | 0 | 1 | 1 | 0 | 0 | 0 | 0 | 0 | 1 | 0 | 0 | 0 | 1 | 0 | 1 | 0 | 0 | 0 | 0 | 0 | 1 | 0 | 1 | 1 | 0 |

ENCODED INCOMING BITSTREAM 814a

FIG. 39

CODE WORD TABLE 812

| MOVING MASK BIT 812b | VARIABLE LENGTH CODE (812a) NOTE1 | DECODED DATA (RUN) 812c | DECODED DATA (LEVEL) 812c |
|---|---|---|---|
| 0 | 10 | END OF BLOCK | |
| 0 | 1 s (NOTE2) | 0 | 1 |
| 1 | 11 s (NOTE3) | 0 | 1 |
| 1 | 011 s | 1 | 1 |
| 1 | 0100 s | 0 | 2 |
| 0 | 0101 s | 2 | 1 |
| 1 | 0010 1 s | 0 | 3 |
| 0 | 0011 1 s | 3 | 1 |
| 0 | 0011 0 s | 4 | 1 |
| 1 | 0001 10 s | 1 | 2 |
| 0 | 0001 11 s | 5 | 1 |
| 0 | 0001 01 s | 6 | 1 |
| 0 | 0001 00 s | 7 | 1 |
| 0 | 0000 01 s | ESCAPE | |
| 1 | 0000 110 s | 0 | 4 |
| 0 | 0000 100 s | 2 | 2 |
| 0 | 0000 111 s | 8 | 1 |
| 0 | 0000 101 s | 9 | 1 |
| 1 | 0010 0110 s | 0 | 5 |
| 0 | 0010 0001 s | 0 | 6 |
| 0 | 0010 0101 s | 1 | 3 |
| 0 | 0010 0100 s | 3 | 2 |
| 0 | 0010 0111 s | 10 | 1 |
| 0 | 0010 0011 s | 11 | 1 |
| 0 | 0010 0010 s | 12 | 1 |
| 0 | 0010 0000 s | 13 | 1 |
| 1 | 0010 0000 s | 13 | 1 |
| 0 | 0000 0010 10 s | 0 | 7 |
| 0 | 0000 0011 00 s | 1 | 4 |
| 0 | 0000 0010 11 s | 2 | 3 |
| 0 | 0000 0011 11 s | 4 | 2 |
| 0 | 0000 0010 01 s | 5 | 2 |
| 0 | 0000 0011 10 s | 14 | 1 |
| 0 | 0000 0011 01 s | 15 | 1 |
| 0 | 0000 0010 00 s | 16 | 1 |

NOTE1-THE LAST BIT 's' DENOTES THE SIGN OF THE LEVEL, '0' FOR POSITVE, '1' FOR NEGATIVE.
NOTE2-THIS CODE SHALL BE USED FOR THE FIRST (DC) COEFFICIENT IN THE BLOCK
NOTE3-THIS CODE SHALL BE USED FOR ALL OTHER COEFFICIENTS.

FIG. 39a

CODE WORD TABLE 812 (CONTINUED)

| MOVING MASK BIT 812b | VARIABLE LENGTH CODE (812a) | DECODED DATA (RUN) 812c | DECODED DATA (LEVEL) 812c |
|---|---|---|---|
| 0 | 0000 0001 1101 s | 0 | 8 |
| 0 | 0000 0001 1000 s | 0 | 9 |
| 0 | 0000 0001 0011 s | 0 | 10 |
| 0 | 0000 0001 0000 s | 0 | 11 |
| 0 | 0000 0001 1011 s | 1 | 5 |
| 0 | 0000 0001 0100 s | 2 | 4 |
| 0 | 0000 0001 1100 s | 3 | 3 |
| 0 | 0000 0001 0010 s | 4 | 3 |
| 0 | 0000 0001 1110 s | 6 | 2 |
| 0 | 0000 0001 0101 s | 7 | 2 |
| 0 | 0000 0001 0001 s | 8 | 2 |
| 0 | 0000 0001 1111 s | 17 | 1 |
| 0 | 0000 0001 1010 s | 18 | 1 |
| 0 | 0000 0001 1001 s | 19 | 1 |
| 0 | 0000 0001 0111 s | 20 | 1 |
| 0 | 0000 0001 0110 s | 21 | 1 |
| 1 | 0000 0000 1101 0 s | 0 | 12 |
| 0 | 0000 0000 1100 1 s | 0 | 13 |
| 0 | 0000 0000 1100 0 s | 0 | 14 |
| 0 | 0000 0000 1011 1 s | 0 | 15 |
| 0 | 0000 0000 1011 0 s | 1 | 6 |
| 0 | 0000 0000 1010 1 s | 1 | 7 |
| 0 | 0000 0000 1010 0 s | 2 | 5 |
| 0 | 0000 0000 1001 1 s | 3 | 4 |
| 0 | 0000 0000 1001 0 s | 5 | 3 |
| 0 | 0000 0000 1000 1 s | 9 | 2 |
| 0 | 0000 0000 1000 0 s | 10 | 2 |
| 0 | 0000 0000 1111 1 s | 22 | 1 |
| 0 | 0000 0000 1111 0 s | 23 | 1 |
| 0 | 0000 0000 1110 1 s | 24 | 1 |
| 0 | 0000 0000 1110 0 s | 25 | 1 |
| 0 | 0000 0000 1101 1 s | 26 | 1 |
| NOTE-THE LAST BIT 'S' DENOTES THE SIGN OF THE LEVEL, '0' FOR POSITIVE, '1' FOR NEGATIVE. | | | |

FIG. 39b

CODE WORD TABLE 812 (CONTINUED)

| MOVING MASK BIT 812b | VARIABLE LENGTH CODE (812a) | DECODED DATA (RUN) 812c | DECODED DATA (LEVEL) 812c |
|---|---|---|---|
| 1 | 0000 0000 0111 11 s | 0 | 16 |
| 0 | 0000 0000 0111 10 s | 0 | 17 |
| 0 | 0000 0000 0111 01 s | 0 | 18 |
| 0 | 0000 0000 0111 00 s | 0 | 19 |
| 0 | 0000 0000 0110 11 s | 0 | 20 |
| 0 | 0000 0000 0110 10 s | 0 | 21 |
| 0 | 0000 0000 0110 01 s | 0 | 22 |
| 0 | 0000 0000 0110 00 s | 0 | 23 |
| 0 | 0000 0000 0101 11 s | 0 | 24 |
| 0 | 0000 0000 0101 10 s | 0 | 25 |
| 0 | 0000 0000 0101 01 s | 0 | 26 |
| 0 | 0000 0000 0101 00 s | 0 | 27 |
| 0 | 0000 0000 0100 11 s | 0 | 28 |
| 0 | 0000 0000 0100 10 s | 0 | 29 |
| 0 | 0000 0000 0100 01 s | 0 | 30 |
| 0 | 0000 0000 0100 00 s | 0 | 31 |
| 1 | 0000 0000 0011 000 s | 0 | 32 |
| 0 | 0000 0000 0010 111 s | 0 | 33 |
| 0 | 0000 0000 0010 110 s | 0 | 34 |
| 0 | 0000 0000 0010 101 s | 0 | 35 |
| 0 | 0000 0000 0010 100 s | 0 | 36 |
| 0 | 0000 0000 0010 011 s | 0 | 37 |
| 0 | 0000 0000 0010 010 s | 0 | 38 |
| 0 | 0000 0000 0010 001 s | 0 | 39 |
| 0 | 0000 0000 0010 000 s | 0 | 40 |
| 0 | 0000 0000 0011 111 s | 1 | 8 |
| 0 | 0000 0000 0011 110 s | 1 | 9 |
| 0 | 0000 0000 0011 101 s | 1 | 10 |
| 0 | 0000 0000 0011 100 s | 1 | 11 |
| 0 | 0000 0000 0011 011 s | 1 | 12 |
| 0 | 0000 0000 0011 010 s | 1 | 13 |
| 0 | 0000 0000 0011 001 s | 1 | 14 |
| NOTE-THE LAST BIT 'S' DENOTES THE SIGN OF THE LEVEL, '0' FOR POSITIVE, '1' FOR NEGATIVE. | | | |

FIG. 39c

CODE WORD TABLE 812 (CONCLUDED)

| MOVING MASK BIT 812b | VARIABLE LENGTH CODE (812a) | DECODED DATA (RUN) 812c | DECODED DATA (LEVEL) 812c |
|---|---|---|---|
| 1 | 0000 0000 0001 0011 s | 1 | 15 |
| 0 | 0000 0000 0001 0010 s | 1 | 16 |
| 0 | 0000 0000 0001 0001 s | 1 | 17 |
| 0 | 0000 0000 0001 0000 s | 1 | 18 |
| 0 | 0000 0000 0001 0100 s | 6 | 3 |
| 0 | 0000 0000 0001 1010 s | 11 | 2 |
| 0 | 0000 0000 0001 1001 s | 12 | 2 |
| 0 | 0000 0000 0001 1000 s | 13 | 2 |
| 0 | 0000 0000 0001 0111 s | 14 | 2 |
| 0 | 0000 0000 0001 0110 s | 15 | 2 |
| 0 | 0000 0000 0001 0101 s | 16 | 2 |
| 0 | 0000 0000 0001 1111 s | 27 | 1 |
| 0 | 0000 0000 0001 1110 s | 28 | 1 |
| 0 | 0000 0000 0001 1101 s | 29 | 1 |
| 0 | 0000 0000 0001 1100 s | 30 | 1 |
| 0 | 0000 0000 0001 1011 s | 31 | 1 |

NOTE-THE LAST BIT 'S' DENOTES THE SIGN OF THE LEVEL, '0' FOR POSITIVE, '1' FOR NEGATIVE.

FIG. 39d

METHOD AND APPARATUS FOR PERFORMING TWO PASS QUALITY VIDEO COMPRESSION THROUGH PIPELINING AND BUFFER MANAGEMENT

RELATED APPLICATION

This application is a continuation of U.S. patent application Ser. No. 08/670,199 filed on Jun. 21, 1996, now U.S. Pat. No. 6,101,276, issued Aug. 8, 2000 the entire teachings of which are incorporated herein by reference.

FIELD OF THE INVENTION

This invention relates in general to computer systems and more specifically to computer video compression and decompression techniques.

BACKGROUND OF THE INVENTION

With the convergence of computers, communications and media, video compression techniques have become increasingly important. Video compression is often used to translate video images (from camera, VCR, laser discs, etc.) into digitally encoded frames. The digitally encoded frames may then be easily transferred over a network, or stored in a memory. When desired, the compressed images are then decompressed for viewing on a computer monitor or other such device.

The three most common video compression standards are MPEG (Moving Pictures Experts Group), JPEG (Joint Photographic Expert Group), and H.261. These standards partition incoming video frames into small tiles and perform either spatial or temporal compression on the tiles. Each standard has a defined compression sequence for the series of incoming frames.

Compressed frames are classified as either Intra-coded (I frames), Predictive frames (P frames), or Bi-directional frames (B-frames). An 'I' frame is a frame in which spatial redundancies are removed using spatial compression techniques. A 'P' frame is a frame in which temporal redundancies have been removed by matching tiles through motion estimation in the current frame to a previous reference frame, then spatially compressing the temporal difference. A 'B' frame is a frame in which temporal redundancies are removed by matching tiles in the current frame to a previous and a future reference frame, then compressing the difference with the spatial transform.

To perform spatial compression alone, such as in the I frame, only the individual frame is required for the compression. However, to perform the temporal compressions, which are required for both the 'P' and 'B', frames, the compression of other frames must first be performed. Each P frame is encoded based on the previous I or 'P' reference frame. Because 'B' frames require the results of both past and future frame calculations, the processing of the B frame is an out-of order function, in which future reference frames must be analyzed prior to the intervening B frames.

Two recognized forms of video compression techniques are real-time compression and high-quality n-pass compression, where n>1. Each form has known advantages. Real-time video compression uses only spatial compression techniques (I frames) to allow images to be compressed at the rate at which they are input. Thus real-time compression processes require less buffering of the input image and consequently less hardware complexity.

To provide real-time compression, a 'peephole' approach is typically implemented whereby each tile in each frame is encoded as it is processed. One drawback of this scheme arises from the fact that only a fixed number of bits are allocated for encoding a frame. If bits are used to encode portions of the frame as they are received, bits may be 'used up' encoding low priority components of the tile, leaving fewer bits available for encoding higher priority blocks which may appear later in the frame.

Two-pass compression alleviates the above encoding problem by processing each frame in two steps. First, each frame undergoes a Motion Estimation (ME) calculation. During the ME phase, for P and B frames, the possible motion of each macroblock in the frame is characterized relative to a past and/or future reference frame as described above. In addition, for I, P and B frames, energy statistics are generated for the frame to profile the visual complexity of the frame, providing energy statistics allow for proper allocation of bits for encoding purposes throughout the frame.

Following the ME phase, the frame undergoes Motion Compensation (MC), during which the data is actually compressed. Based on the encoding directives, a Discrete Cosine Transform (DCT) is performed on each portion (or block) of each frame, or to the temporal differences between each block and its corresponding reference point in another frame. The resulting data is then quantized and transformed into run-level tokens (RLE) tokens, which are then encoded.

Because the entire frame is evaluated before bits are allocated for encoding the different blocks of the frame, the output image provided is of much higher quality than that provided via the 'peephole' compression technique described above. It would be desirable to provide two-pass compression techniques in real-time. However the complexity of the process has precluded it from being a valuable tool for video compression applications which require real-time performance. The main problem with two-pass compression techniques is encountered when analyzing B frames, as will be shown below.

Referring now to FIG. 1, a subset of a typical input stream of MPEG encoded frames, I1, B2, B3, P4, B5, B6, P7 is shown, where numbers designate the temporal order of images to encode and the I, P, and B references designate intra-coded, predictive or bi-directional frames as described above. Each P frame is encoded based on the previous I or P reference frame. Thus, to maintain real-time operation, the compression technique should be able to process P frames and I frames as they are received. Each B frame is encoded based on the previous I or P reference frame, and/or the next I or P reference frame. As seen in FIG. 1, a problem with real-time two pass processing soon develops when encoding B frames.

At time T0 frame I1 is input to ME stage of the compression engine. At time T1, frame I1 is passed to the MC stage of compression where the compression is completed. Although the ME stage is free, the B2 frame may not be input for ME processing, because the data for the next P frame has not yet been calculated. In fact, the next P frame is not even received until time T3, at which time it is input to the ME stage of the compression engine. At time T4, frame P4 is forwarded to the MC stage for compression. Only after this compression step is completed may the B2 frame be input to the ME stage of processing, at time T5. At time T6, the B3 frame may be input to the ME stage of processing, and at the B2 frame moves to the MC stage of processing. However, at time T6, the frame P7 is being input in real time, and must be processed.

If the processing of the P7 frame is extended to time T7, then the compression engine is no longer operating in real time, and thus the prior art solution is ineffective at providing a real-time two-pass compression algorithm. In order to make such a solution work, it would be necessary to accelerate processing of the ME and MC engines by a factor of 4/3 so that the ME and MC engines operate on 4/3 frames during each frame interval. However, such a solution would require more process power than is currently marketable for video compression techniques.

SUMMARY OF THE INVENTION

According to one aspect of the invention, a method of performing real-time compression and decompression of video data input to a video compression/decompression unit is disclosed. The video data is apportioned into a plurality of frames including reference frames, where a subset of the frames are dependent frames having dependencies on one or more of the reference frames for compression purposes. The method includes the steps of compressing the reference frames as they are input, but storing the dependent frames until the associated one or more reference frames have been compressed. After the associated reference frames are compressed, the associated dependent frame is retrieved and compressed.

With such and arrangement, a high quality image may be produced because bits are more optimally allocated across pictures than they are using conventional techniques. Because the reference frame is encoded prior to the dependent frames, such as B frames, more bits are available to encode the reference frame. It is inherently more important for reference frames to be optimally encoded because the reference frame is not only displayed but is used to effect encoding of up to 4 other dependent frames. Accordingly, the present invention, by delaying the compression of dependent frames until all associated reference frames have been compressed, provides a high quality image.

According to a further aspect of the invention, the method of compressing the frames further includes the steps of determining motion characteristics for each of said frames and providing compressed data for each of the frames in response to the motion characteristics. In the present invention, the step of determining motion characteristics operates on a first frame in parallel with the step of providing compressed data operating on a second frame. With such an arrangement, the motion characteristic stage and the data compression stage each can be designed to process a frame in one frame interval. As a result, a fully pipelined operation may be provided that allows for real time two-pass video compression.

According to a further aspect of the invention, the method includes the step of storing the dependent, B frames in a memory of a coupled computer system while they await processing of their associated reference frames. Such an arrangement minimizes the storage requirements of the video compression/decompression unit itself, thereby reducing the overall cost of the system.

BRIEF DESCRIPTION OF THE DRAWINGS

The above-mentioned and other features of the invention will now become more apparent by reference to the following description taken in connection with the accompanying drawings in which:

FIGS. 23A–23C provide examples of a "synthetic" P frame being inserted into the Group of Pictures to provide for a dropped frame;

FIGS. 30A–30D include flow diagrams and sequence execution diagrams for providing forward and inverse Discrete Cosine Transforms;

FIG. 33 is a table diagram for illustrating an order of operation that allows for compression transform efficiency in the process outlined in FIGS. 31A and B above;

FIG. 34 is a table diagram for illustrating a second order of operations that allows for compression transform efficiency in the process outlined in FIGS. 31A and B above;

FIG. 39 is an example of an encoded bitstream shown in FIG. 38;

FIGS. 39a–39d is an example of a codeword table as shown in FIG. 38;

DESCRIPTION OF THE PREFERRED EMBODIMENT

Figure 2:
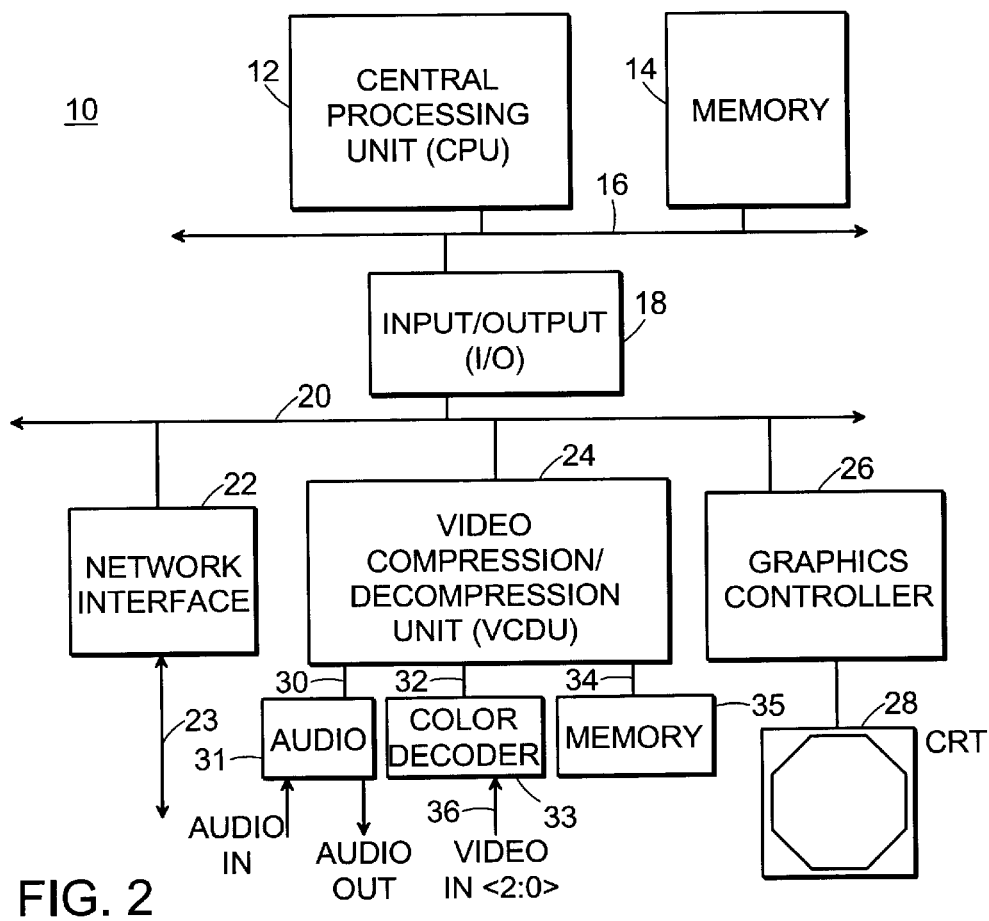
FIG. 2 is a block diagram of a computer system incorporating the present invention.

Referring now to FIG. 2, a computer system 10 for use with the present invention is shown to include a central processing unit (CPU) 12 for processing an instruction stream. The instruction stream as well as data which is used by the CPU is stored in a memory 14. The CPU 12 and the memory 14 are coupled together via a system bus 16.

Also coupled to system bus 16 is Input/Output (I/O) interface 18. The I/O interface enables the CPU to communicate with a number of external devices via an I/O bus 20. The I/O bus 20 of the present invention is operated according to the Peripheral Connect Interface (PCI™) protocol, and is capable of transferring data at 133 Mbyte/sec, although it is understood that the present invention could be modified for use with other I/O protocols by one of ordinary skill in the art.

A network interface 22 is coupled to I/O bus 20 for interfacing the CPU with other CPU's in a network. Also coupled to the PCI bus is a graphics controller 26, which is used to control the display of images on a CRT 28. In addition, a video compression/decompression unit (VCDU) 24 is coupled to the I/O bus for providing compression and decompression of the video images received from external devices via external ports.

The VCDU has three ports; an option port 30, a video port 32, and a memory port 34. The option port provides an interface between the PCI bus and audio signal processing devices 31 such as Analog Devices® 2171 and 2181 family of digital signal processors. The video port 32 provides an interface to any one of a number of digital video decoder devices 33 from Philips® and Brooktree®, such as the Philips® SAA717x family of devices or the Brooktree® Bt81x family of devices. The memory port 34 couples the VCDU to an external DRAM device 35 which is used for temporary storage of data during the compression/decompression process.

The raw, analog video is input to the video port 36 of the VCDU and converted into luminance and chrominance data types, where the luminance roughly corresponds to the intensity at that point, and the chrominance corresponds to the color. The digital data consists of eight bits of luminance (Y), eight bits of chrominance-blue (Cb) and eight bits of chrominance-red (Cr). Raw, analog video data are received by the color decoder 33 and translated to digital YUV format according to the CCIR601 standard at either an NTSC format of 720 pixels×480 scan lines at 29.97 frames/second, or PAL format of 720 pixels×576 lines at 25 frames per second. The pixel data arrives as a stream of horizontal scan lines. The scan lines arrive in interlaced order (first all consecutive even lines from top to bottom followed by all consecutive odd lines from top to bottom).

Once the input pixels are digitized, the VCDU works in concert with the CPU to compress the input SIF (Standard Interchange Format) frames. There are three types of compression standards, including the MPEG standard developed by the Moving Pictures Experts Group, the JPEG standard developed by the Joint Picture Experts Group, or the H.26x video teleconferencing standard. Each type of compression standard uses a variety of encoding techniques for encoding incoming frames. For example, the MPEG standard and the H.26x teleconferencing standard use a combination of spatial encoding, temporal encoding and entropy encoding techniques, while the JPEG standard uses only spatial encoding techniques and entropy encoding techniques. The various types of encoding techniques will be described later herein.

For purposes of simplification, compression of an input video frame stream using the MPEG standard will be described, although it will become apparent as to how the described system could be modified to perform compression according to the other compression standards.

The MPEG standard was developed to reduce the high cost of video compression codes and resolve the critical problem of interoperability of equipment from different manufacturers. Some requirements of the MPEG standard were a targeted rate of between 1.5 and 3.0 Mbits/sec, the ability to randomly access any frame in a series of images, and the production of a high quality image.

According to the MPEG standard each video input frame is compressed into one of three types of frames: either an Intra-coded frame (I), a Predicted frame (P) or a Bi-directional Frame (B). Intra-coded frames provide access points for random access with moderate, spatial compression of the image. Predicted frames are coded with reference to a past Intra-coded or Predicted frames, and are in general used as a reference for future predicted frames. Bi-directional frames provide the highest amount of compression, but require both a past and a future reference for prediction. Bi-directional frames are never used as a reference.

A typical MPEG compression sequence of the raw frame data into the three frame types is shown below, where the letters I, P, and B are used to designate the type of MPEG frame, and the numerical designators are used to indicate the order of receipt of the frames:

I1 B2 B3 P4 B5 B6 P7 B8 B9 P10 B11 B12 I13

In the above sequence, it can be seen that every 3rd input frame is identified and compressed as a reference frame. This frame sequence is described as having an M=3 reference distance.

As mentioned above, the I frames and the P frames are both reference frames for both P frames and B frames. The I frames differ from the P and B frames in that they do not reference any other frame, and are therefore compressed using spatial compression techniques. The P and B frames are compressed using temporal compression techniques, as will be described in more detail below.

Figure 3:
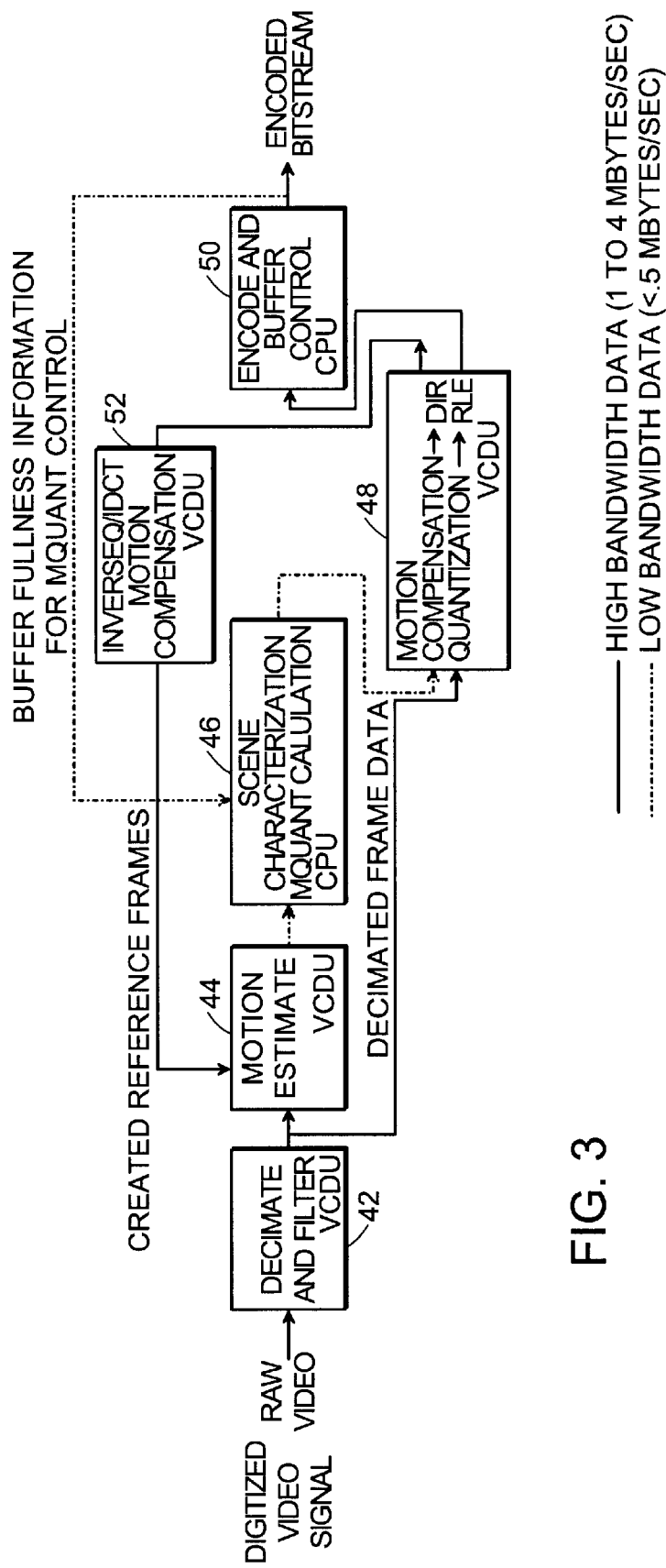
FIG. 3 is a functional flow diagram illustrating the apportionment of video compression/decompression tasks between the video compression/decompression unit of FIG. 2.

Referring now to FIG. 3, a functional block diagram will be used to describe the processes undertaken by the CPU and the VCDU to provide real-time MPEG compression. Each functional block includes a designator, either CPU or VCDU for indicating which portion of the computer system 10 operates to perform the respective function.

The digitized YUV data video signal is fed to a decimate and filter functional unit (DFU) 42 which performs the first step of compression through resolution reduction. The DFU is responsible for reducing the amount of video data by means of sub-sampling and decimation of horizontal scan lines as they arrive by optionally keeping only half the scan lines, either even or odd. Pixels output from the DFU are generated as a weighted average of the incoming ones, in effect filtering out high frequency components. In addition, the pixel data may additionally be filtered using a low pass filter to remove extraneous noise which would greedily use up compression bits, although this is not a requirement. The result is SIF (Standard Interchange Format) frames, 352 pixels×240 lines for rectangular systems (320×240 for square).

Thus the color decoder 33 reduces the raw pixel data via subsampling and decimation to conform to the Standard Interchange Format (SIF). NTSC SIF frames comprise 352 pixels by 240 scan lines transmitted at 29.97 frames/second. PAL SIF frames comprise 352 pixels by 288 scan lines transmitted at approximately 25 frames/second. The pixels are in YUV 4:2:0 format, meaning for every two chrominance pixels, one byte of blue (U) and one byte of red (V), there are 4 pixels (or bytes) of luminance (Y) data. The frames are forwarded to the VCDU off-chip memory 34 (FIG. 2) for temporary buffering.

Figure 4:
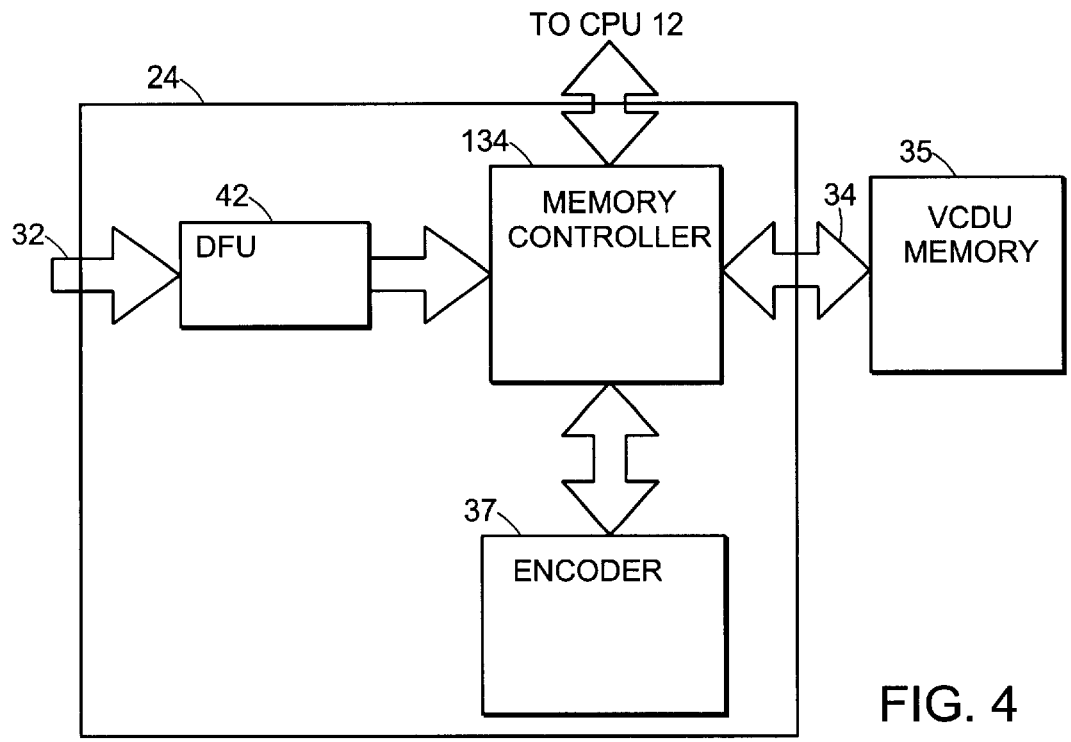
FIG. 4 is a block diagram of the components of one embodiment of the Video Compression Decompression unit of FIG. 2.

Referring now to FIG. 4, a block diagram of a first embodiment of a VCDU 24 is shown. The VCDU 24 includes a DFU 42 coupled to the video port 32 which, as discussed above, performs the first step of compression of the video input stream through resolution reduction. The DFU 42 is coupled to a memory controller 134. The memory controller 134 is coupled to external VCDU memory 35 through the memory port 34, for controlling transmission of data to and from various units in the VCDU 24. The VCDU 24 further includes an encoder 37 which here, converts the digitized video input into a compressed MPEG video stream. The preferred embodiment of an encoder 37 includes a co-processor architecture as described in FIG. 3. Details of this embodiment will be discussed later herein.

As described above, a SIF frame is sent from the DFU 42 to the memory controller 134 which temporarily stores the frames of digitized pixel data in the VCDU memory 35. When the encoder 37 is ready for a frame, it retrieves the frame from the VCDU memory 35. As the frame is retrieved from the VCDU memory 35, this operation frees space in the VCDU memory 35 allowing subsequent frames to be stored.

Figure 1:
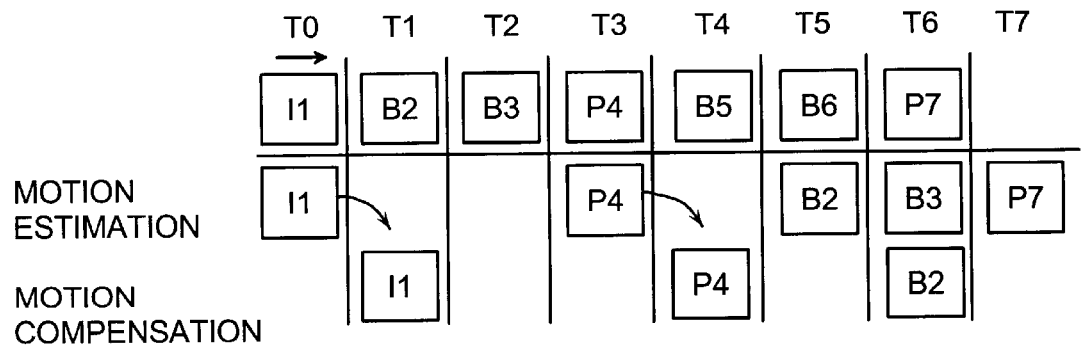
FIG. 1 is a timing diagram used to illustrate the problems of providing real-time two-pass compression in the prior art.

At times during the processing of the incoming video stream however, the system, for various reasons, is unable to keep up with the video stream. In the preferred embodiment of the invention described in FIG. 3, typical reasons for the system being unable to keep up with the incoming video stream are because the CPU 12 (FIG. 1) has been delayed or because the co-processor hardware has taken too much time.

In either case where the system is unable to keep up with the incoming video stream, the VCDU memory 35 becomes full and therefore is unable to store any additional frames as it has not yet been relieved by the encoder 37 of the data from previous frames in the video stream. Accordingly, the memory controller 134, unable to store the incoming frame in VCDU memory 35, drops the frame allowing the system time to process the data already stored in the VCDU memory 35. A mechanism for determining which frame to drop and how to later recreate this frame is described below.

I.) Frame Dropping

Figure 5A:
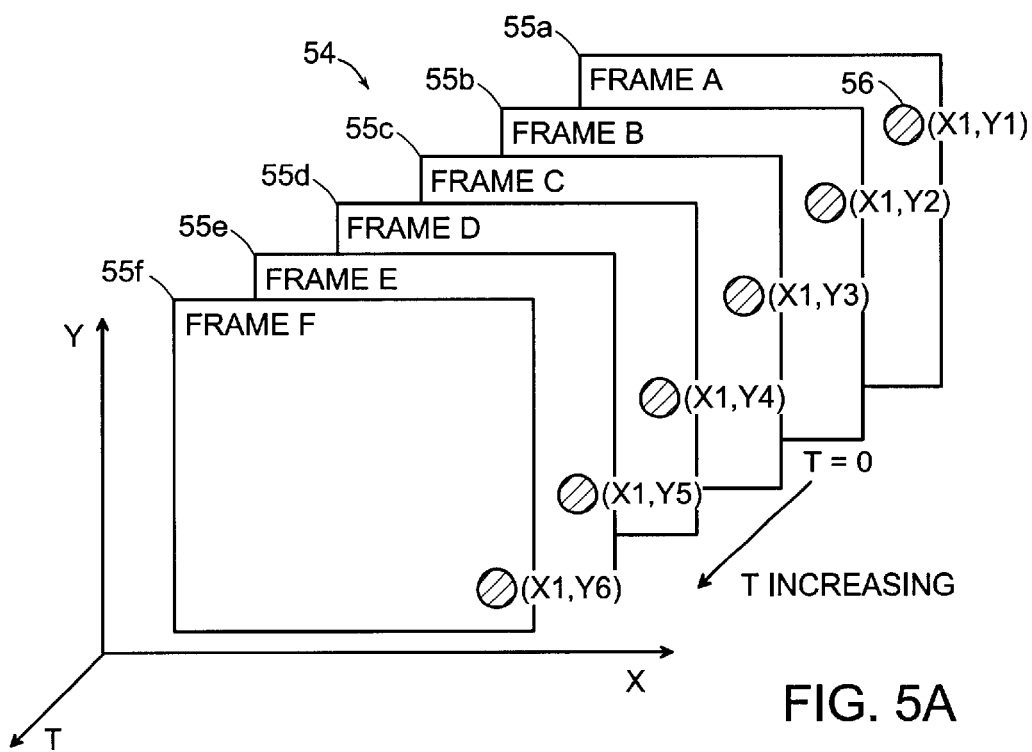
FIG. 5A provides an illustrative example of video frames being provided to the Video Compression Decompression unit of FIG. 2.

Referring now to FIG. 5A, a series of frames 54 in a video stream is shown to include a succession of frames as they are received by the video port 32. The series of frames is provided in increasing temporal order, with frame A 55a being the frame received at time t=0 and frame F 55f being the frame received at time t=5. Included in each of the frames is a frame image element 56, which corresponds to an object, such as a ball, appearing in an actual video segment. The frame image element 56 is designated at different (x,y) coordinates in each frame, thus indicating motion of the frame image element 56.

At time t=0, data corresponding to frame A 55a is received at the video port 32 and passed through the DFU 42 to the memory controller 134. The memory controller 134 assigns an index value to frame A 55a and stores the frame in VCDU memory 35. The index value assigned by the memory controller 134 indicates the order in which frame A 55a was received by the VCDU 24 in relation to the remaining frames in the frame series 54. At time t=1, data corresponding to frame B 55b is received at the video port 32, partially compressed by the DFU 42, assigned an index value by the memory controller 134, and stored in VCDU memory 35 by the memory controller 134. At time t=2, data corresponding to frame C 55c is received at the video port 32, assigned an index value, and eventually stored in VCDU memory 35 by the memory controller 134. Also at time t=2, 10 the data corresponding to frame A 55a is retrieved from VCDU memory 35 by the encoder 37.

Here, for illustrative purposes, it will be assumed that VCDU memory 35 has sufficient storage space to retain data corresponding to three video frames. At time t=3, data corresponding to frame D 55d is received at the video port 32, partially compressed, assigned an index value and eventually stored in VCDU memory 35.

At time t=4, data corresponding to frame E 55e appears at the video port 32. At this point in time however, the data corresponding to frame A 55a is still being encoded by encoder 37 while the data corresponding to frames B 55b, C 55c and D 55d are stored in VCDU memory 35. VCDU memory 35 therefore, is currently full as frame E 55e is received at the video port 32. Frame E 55e is partially compressed by the DFU 42 and assigned an index value by the memory controller 134. Having nowhere to store frame E 55e, Memory controller 134 "drops" the frame.

At time t=4+, encoder 37 has completed encoding frame A 55a, and retrieves frame B 55b from VCDU memory 35. At time t=5, video port 32 receives data corresponding to frame F 55f which is partially compressed by the DFU 42 and assigned an index value by memory controller 134. As frame B 55b has been retrieved by the encoder 37, VCDU memory 35 is no longer full and memory controller 134 is able to store the data corresponding to frame F 55f in VCDU memory 35.

It should be noted that by dropping the frame at the input to the encoding process, the encoder 37 will encode the input video stream, minus the dropped frame, in the previously dictated GOP pattern, i.e. IBBPBBP. In this way the process by which the video stream is encoded is not varied for a sequence in which a frame was dropped.

Because frame E was dropped from the video stream, problems may occur when the encoded video is decompressed and viewed. One method in which the dropped frame may be handled is to insert accurate time stamp information into the resulting MPEG stream and simply not encode the missing frame. In a decoder which references the time stamps in the video stream, the missing frame would be handled correctly. At the time in the video during which the frame would be viewed, no frame would be displayed. In this way, the audio would remain synchronized with the video.

In a decoder which does not reference time stamp information or on a decoder which requires the audio and video clocks to be locked together, such as those decoders conforming to the VideoCD standard, however, the time stamp information would be nominal. The encoded video would be a single frame shorter and since the time stamp information would not be referenced, the video will not be synchronized with the audio. Accordingly, a synthetic frame should be inserted into the video stream to synchronize the video with the corresponding audio.

Synthetic frames may be B frames or P frames. A synthetic B frame is defined as being identical to the reference frame nearest to where in the video stream the original frame was dropped. A synthetic P frame is identical to the reference frame which precedes it in the video stream. Insertion of the synthetic frame into the MPEG video stream will be discussed later herein.

Figure 5B:
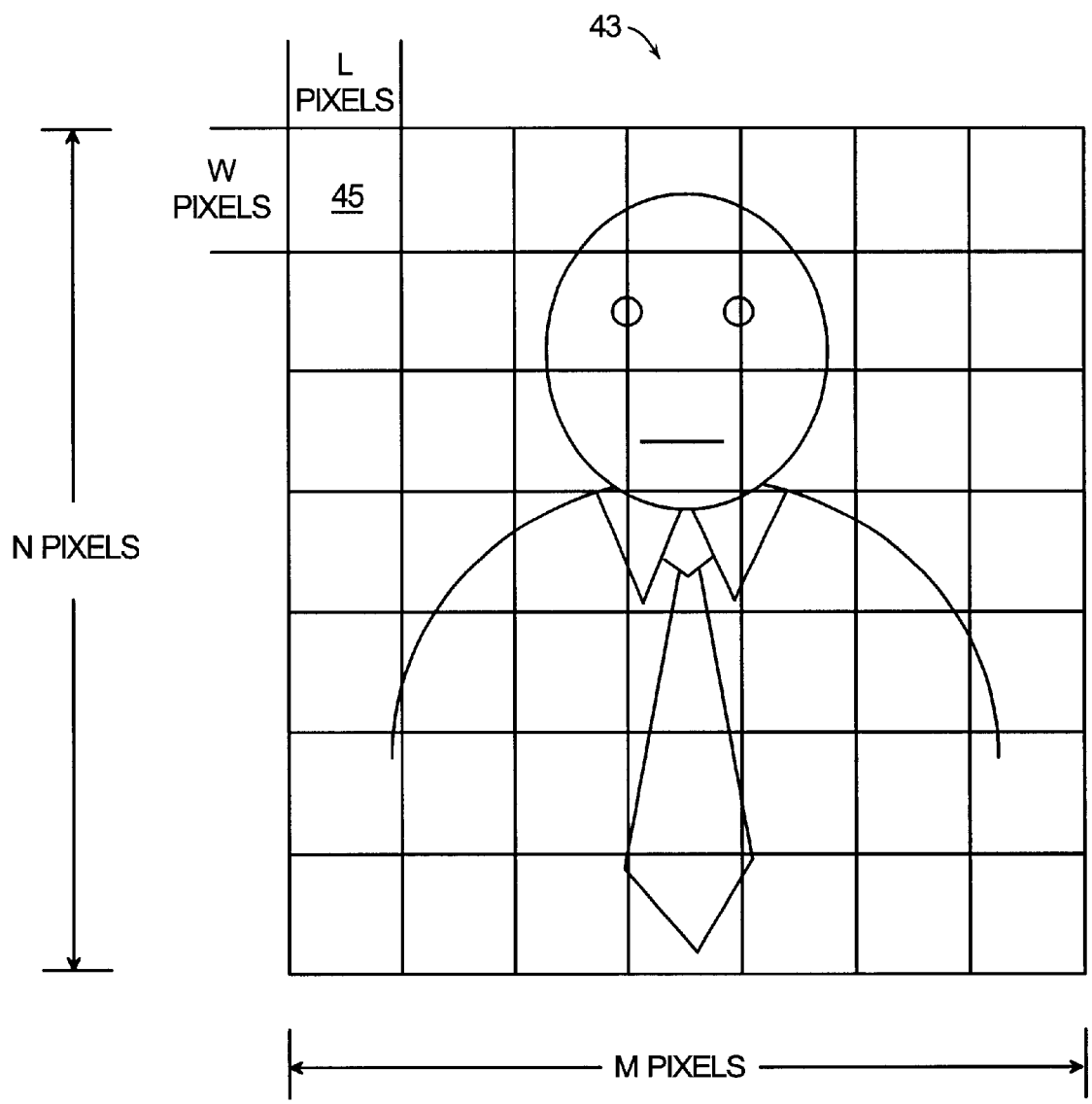
FIG. 5B is an illustration of a frame of data apportioned into macroblocks.

The frames that are stored in VCDU memory 35 are partitioned into a 2D matrix of groups of pixels, referred to as macroblocks. Referring to FIG. 5B, a frame of M×N pixels 43 illustrating a head and shoulders, which is typical of a teleconferencing application, is shown partitioned into such a matrix of macroblocks 45 each comprising L×W pixels.

II). Motion Estimation

Suffice it to say that once the video frame data that can 'fit' in VCDU memory has been subdivided into macroblocks, the CPU 12 signals the motion estimation unit 44 of the VCDU to begin motion estimation on the frame data. Macroblock based motion estimation is performed by comparing a particular macroblock in a current frame, sampled at a first time, with similarly sized macroblocks in a reference frame, sampled at a second time. In the preferred embodiment, the second sample time is prior to the sample time of the current frame.

Motion estimation covers a set of techniques used to extract the motion information from a video sequence. The MPEG standard represents motion information by providing one or two motion vectors per macroblock, depending upon the type of motion compensation; forward predicted, backward predicted, or average. The present invention implements motion estimation in the manner described below.

Each pixel in a particular frame can be modeled as a moving object in the three dimensional, horizontal, vertical and time space. A correlation procedure, performed at consecutive discrete time instances, or frames, provides information about the flow of the pixel between successive frames. Even the most efficient flow computation requires a significantly complex hardware implementation.

Motion estimation is performed on P and B frames. I frames are always intra-coded and thus never reference other frames. Motion estimation is performed by comparing an original reference image to the current input image. Motion estimation is accomplished by performing block match operations on square pixel regions of the input image. The idea is to find the block position within a larger region for a P or B frame which best minimizes error in luminance data from the reference frame.

Figure 6B:
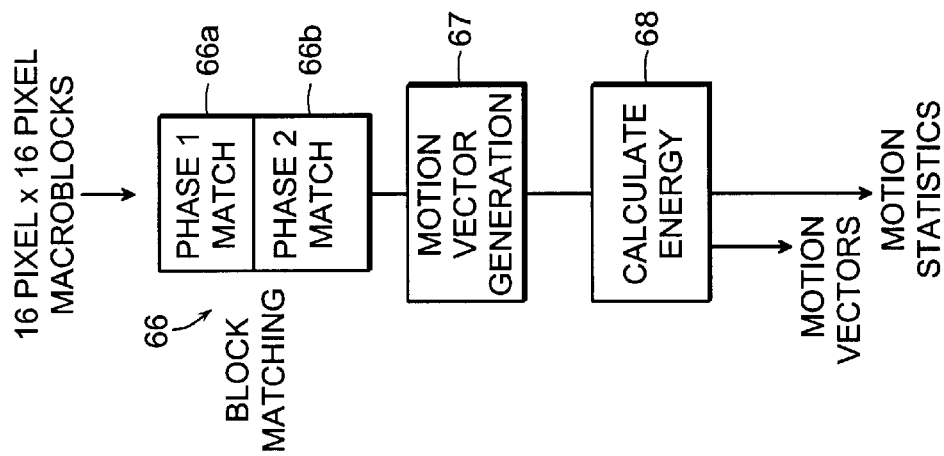
FIGS. 6A, 6B and 6C provide an illustrative example and a flow diagram, respectively, of the motion estimation process provided in the flow diagram of FIG. 3.
Figure 6A:
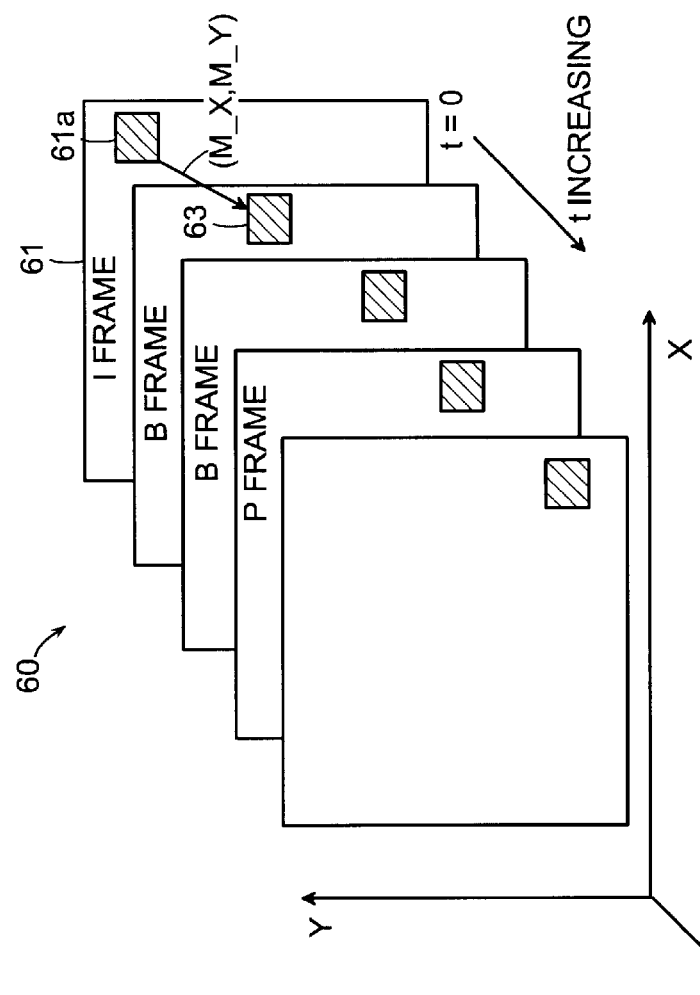

Referring briefly to FIGS. 6A and 6B, the motion estimation process will be described with reference to a series of frames 60. Each frame of the series 60 includes pixels designated via (x,y) coordinates. The series of frames is provided in increasing temporal order, with frame 61 being the frame input at time t=0. Each frame is apportioned into 16 pixel×16 pixel macroblocks. Each pixel comprises 8 bits of luminance data, and 8 bits of $C_b$ and $C_r$ data, where, as mentioned above, the chrominance data is shared between 4 luminance pixel values.

A given macroblock on which motion estimation is to be performed is shown shaded as macroblock 63. As mentioned above, I frames and P frames are the only frames which serve as reference frames. When the best match is found, its location is stored for the purposes of motion compensation. As shown in FIG. 6A, the B-frame in which macroblock 63 resides uses I frame 61 for purposes of calculating motion estimation.

As seen in FIG. 6B, motion estimation is shown to include 3 discrete steps; a block matching step 66, a motion vector generation step 67 and an energy calculation step 68. Block-matching techniques are used to identify macroblocks in the preceding (and/or succeeding) frames which have the best match of pixel values to the macroblock of interest in the current frame. Typically, in block-matching techniques, the motion vector is obtained by minimizing a cost function measuring the mismatch between a block and each candidate block in the other frames. The macroblock matching procedure may be performed using a series of adder circuits or other methods apparent to those in the art.

During block matching, as mentioned above, the basic premise is to find the block position within a larger region for a P or B frame which best minimizes error in luminance data from the reference frame. The size of the 'outer' square block in which the search is conducted is programmable. The size of the 'inner' block that is matched is varied based on the mode that is selected.

There are 3 modes supported by the motion estimator 44 (FIG. 3). These include sub-sampled search, full search, and half-pixel search. Sub sampled search uses sub-sampled luminance data to perform a block match over an 8 pixel by 8 pixel area. Full search uses the full resolution luminance data and matches 16 pixel by 16 pixel areas. Half pixel search uses the full resolution luminance data and matches to half pixel boundaries by interpolating luminance values at the half pixel positions.

For example, the block matching algorithm for the full search finds the value of i,j which produces the minimum error. The error is defined in Equation I below as:

$$E_{ij} \sum \sum \left( \left| P_{x,y}^{pixels-1} - R_{x+1,y+j}^{pixels-1} \right| \right) \quad \text{EQUATION 1:}$$
$$\scriptsize x=0 \; y=0$$

In Equation 1, the constant Pixels refers to the number of pixels comprising the group of pixels used in a particular search method. For example, when using the full search method, the constant Pixels has a value of 256 and when using a sub-sampled method it has a value of 64. Variables P and R refer to the luminance values of pixels at position (x,y) in a current frame and position (x+i,y+j) in a reference frame respectively. When the best matching macroblock is identified, its location is treated as the prior location of the current macroblock for the purposes of motion compensation and for applying a filter on the video data.

After a matching macroblock is found, the motion estimation procedure continues to calculate the coordinates of a motion vector which, when added to the coordinates of any pixel in the matching, reference macroblock, will generate the coordinates of a corresponding pixel in the current macroblock. Because the motion estimation procedure is performed on a macroblock basis, all further calculations which would otherwise be performed on a pixel by pixel basis are performed on a macroblock basis. For example, every pixel comprising a macroblock will be presumed to have moved in the same direction and by the same amount. Therefore this method represents a coarse approximation which is much faster and requires less computation power than the pixel-wise calculation of optical flow or motion estimation.

It should be noted that the present invention should not be limited to the above searching techniques, as other searching techniques known to those of skill in the art, such as telescopic searching or hierarchical full searching would prove equally effective.

The motion estimation procedure of the preferred embodiment uses a hierarchical search technique consisting of a phase I coarse search followed by finer grained searches. During phase I (66a) the first pass motion match is performed in sub-sampled space, using 8×8 pixel compares. That is, the raw input frame data is decimated by 2 both horizontally and vertically (i.e. only every other row and every other column is used in the match process). This sub-sampled raw input data is compared against a reference frame's sub-sampled raw data. Upon completion, the motion estimation process has a clue as to the general area to determine the best match.

During phase II of the motion estimation process, the entire raw frame data is compared against the reconstructed reference frame to find the best match, using 16×16 pixel compares. The macroblock in the earlier frame which is the best match to the macroblock in the current frame is the one which has the lowest error value using one of the above techniques.

At step 67 a motion vector is calculated which identifies the relationship between the present macroblock and the previous, matched, macroblock. For example, motion vector (m_x, m_y) will identify the change in position of the pixels between macroblock 61a and macroblock 63.

The motion vector is a value which, when added to the coordinates of any pixel in the matching macroblock will provide the coordinates of the current macroblock. Because the motion estimation procedure provides vectors on a macroblock basis, all further calculations that would otherwise be performed on a pixel by pixel basis are performed on a macroblock basis. Accordingly, this motion estimation method requires less computational power than other pixel-wise approximation techniques.

Figure 6C:
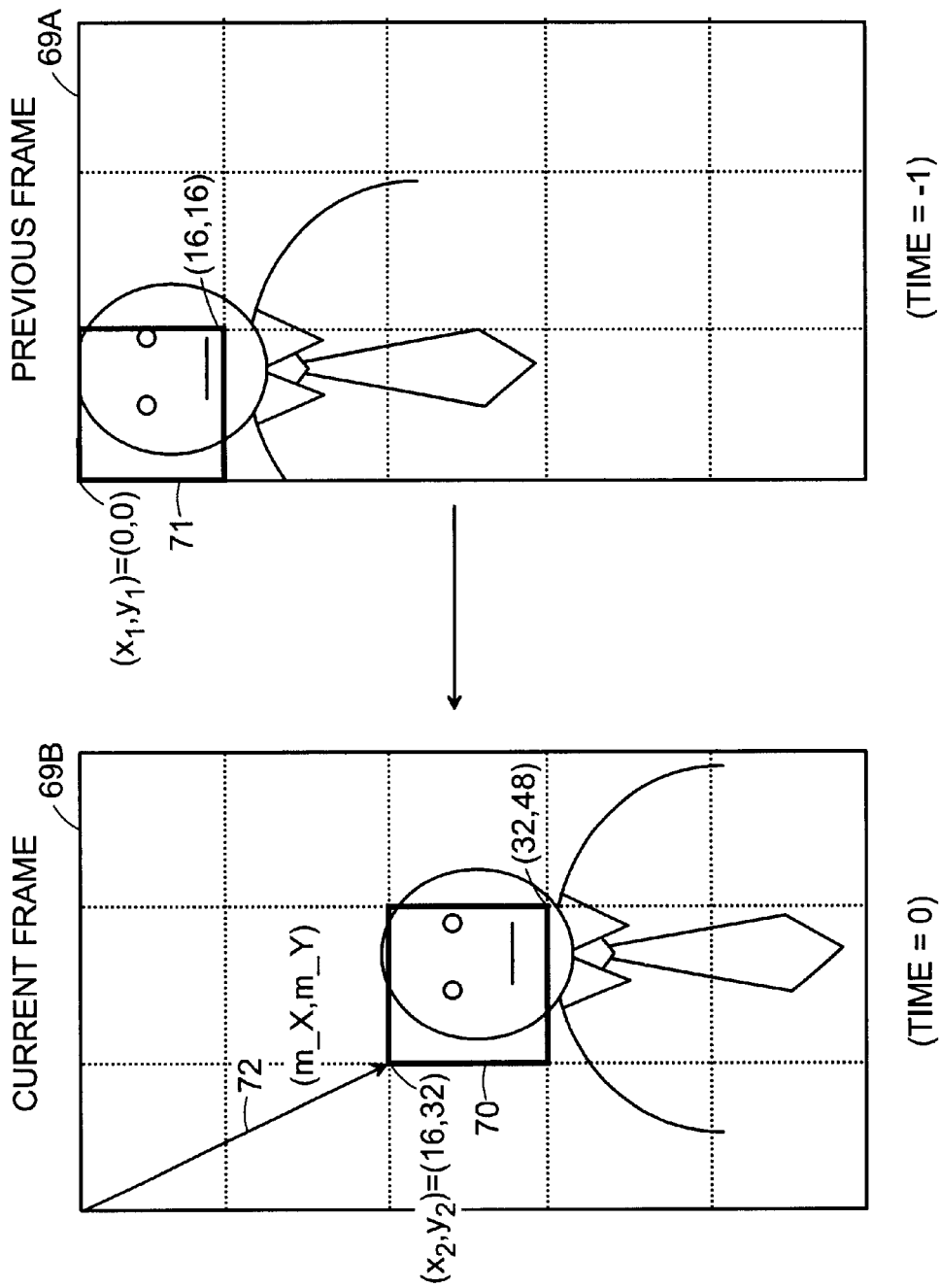

For example, referring now to FIG. 6C, an example will be provided to demonstrate the generation of motion vectors. Two temporally consecutive video frames, 69a and 69b, are shown for illustration purposes. Also shown is a macroblock 71 whose pixels have moved from a first position at time −1, to a second position at time 0. Thereafter these pixels comprise macroblock 70. If the motion of the macroblock 71 from the first to the second position is represented by a vector (m_X, m_Y) 72, specifying the shift in the X and Y directions, the reference macroblock, 71 can be motion compensated simply by adding vector 72 to it. Therefore, corresponding pixels from each macroblock are constructively aligned such that the filtering process occurs appropriately.

Referring still to FIG. 6C, macroblock 71 has specifically moved from location (0,0) to location (16,32) and is thereafter referred to as the current macroblock 70, or alternatively as the macroblock of interest 70. For illustration purposes, assume that the reference macroblock 71, which for illustration purposes is shown at position (0,0) and sampled at time −1, contains approximately the same pixel values as the current macroblock 70, which is sampled at time 0. In order to filter the two macroblocks in relation to each other, macroblock 71 must be constructively shifted, i.e. motion compensated, such that each of its pixels lines up with a corresponding pixel in macroblock 70. This is done mathematically by adding the motion compensation vector 72 to each pixel's coordinates in macroblock 71.

For example, in this illustration the motion compensation vector 72 is calculated by subtracting the coordinates of one of the pixels comprising macroblock 71 from a corresponding pixel comprising macroblock 70:

$$(m\_X, m\_Y) = (x_2 - x_1, y_2 - y_1)$$
$$= (16-0, 32-0)$$
$$= (16, 32)$$

Thereafter, adding motion compensation vector 72 to any pixel coordinates in macroblock 71 yields the coordinates for the motion compensated pixel, i.e. the corresponding pixel in the macroblock of interest 70. The motion compensation method is performed as follows:

determine location of pixel in macroblock 71 = (16, 16)

calculate location of motion compensated pixel =

$(x + m\_X, y + m\_Y) = (16 + 16, 16 + 32) = (32, 48)$

It should be noted that it is necessary to calculate motion estimation once for each macroblock, as opposed to once for each pixel as required by the prior art.

Referring back again to FIGS. 6A and 6B, after the motion vectors have been computed at step 67, the AC and DC energies are computed for each macroblock for each encoding method at step 68. The AC and DC energy are, in effect, a characterization of the amount of change between the reference frame and the current frame. This energy data will be used by the CPU for the purpose of allocating bits during frame encoding.

For I, P, and B frames, both Intra_AC and Intra_DC energy is computed using the formulas shown in Equations 2A and 2B below, with P representing the pixels in the associated frame. The intra-coded characterization measures the amount of change within the input block itself without reference to any previous reference frame.

$$\text{Intra\_DC} = \sum \sum P_{i,j}^{15} \Big/ 64 \quad i = 0 \ j = 0 \qquad \text{EQUATION 2A:}$$

$$\text{Intra\_AC} = \qquad\qquad\qquad\qquad\qquad \text{EQUATION 2B:}$$
$$\sum \sum \left( \left| P_{i,j}^{15} \stackrel{15}{=} \left( \left( \text{Intra\_DC} = 128 \right) >> 8 \right) \right| \right)_{i=0\ j=0}$$

For P and B frames, Forward DC and Forward AC energy components are calculated using the formulas provided below in Equations 3A and 3B, with P representing the pixels in the associated frame, and Rf representing the pixels in the previous reference frame. This forward predicted characterization measures the amount of change of the current frame relative to a previous frame.

$$\text{Forward\_DC} \stackrel{15}{=} \Big| \sum \sum (P_{i,j} - Rf_{i,j}) \Big|_{i=0\ j=0} \qquad \text{EQUATION 3A:}$$

$$\text{Forward\_AC} \stackrel{15}{=} \sum \sum (|P_{i,j} - Rf_{i,j}|)_{i=0\ j=0} \qquad \text{EQUATION 3B:}$$

The Backward DC and AC components and Average AC and DC components are calculated for the B frames, where P represents the pixel value of the associated frame, Rf represents the pixel value of a previous reference frame, and Rb represents the pixel value of a future reference frame, using Equations 4A–4D below. The backward-predicted characterization measures the amount of change of the current block relative to a previously calculated reference frame which follows the current frame during the display sequence. The average characterization measures the amount of change of the current block relative to a forward and backward reference frame.

$$\text{Backward\_DC} \stackrel{15}{=} \Big| \sum \sum (P_{i,j} - Rb_{i,j}) \Big|_{i=0\ j=0} \qquad \text{EQUATION 4A:}$$

$$\text{Backward\_AC} \stackrel{15}{=} \sum \sum (|P_{i,j} - Rb_{i,j}|)_{i=0\ j=0} \qquad \text{EQUATION 4B:}$$

$$\text{Average\_DC} \stackrel{15}{=} \qquad\qquad\qquad\qquad \text{EQUATION 4C:}$$
$$\Big| \sum \sum (P_{i,j} - (Rb_{i,j} + Rf_{i,j} + 1) >> 1) \Big|_{i=0\ j=0}$$

$$\text{Intra\_AC} = \qquad\qquad\qquad\qquad\qquad \text{EQUATION 4D:}$$
$$\sum \sum \left( \left| P^{15} \stackrel{15}{=} (Rb_{i,j} + Rf_{i,j} + 1\_ >> 1) \right| \right)_{i=0\ j=0}$$

The results of the motion estimation stage of the process are thus motion vectors and AC and DC information, all of which are stored in a data structure in off-chip memory 35 (FIG. 2). When the VCDU has completed the motion estimation process, the VCDU generates an interrupt signal which is sent to the CPU 12 to indicate that the data is now available for use.

As indicated in FIG. 3, the array of data structures are sent via the PCI bus 20 (FIG. 2) to the I/O device 18 (FIG. 2) and subsequently to memory 14 (FIG. 2) using a Direct Memory Access (DMA) transfer.

The CPU 12 then performs scene characterization by evaluating the motion estimation data and determining how each macroblock will be encoded and quantized to maximize compression. The basic goal of scene characterization is to select the best encoding scheme for each macroblock so that picture quality is maximized without exceeding the maximum specified bit transmission rate.

III). Scene Characterization

The CPU determines how each macroblock is to be encoded. Note that all I frame macroblocks are always encoded as intra-coded. P frame macroblocks may be encoded as either forward-predicted or intra-coded. B frame macroblocks may be encoded as intra-coded, forward-predicted, backward-predicted, or averaged. Thus the P and B frame macroblocks may be either Intra-coded, using spatial compression techniques, or differentially coded, using the motion estimate techniques. The tradeoff as to whether to differentially code or intra-code the macroblock is based on the energy content of the macroblock. If there is a high energy value, then there has potentially been a large change in the image between the previous frame and the current frame, and intra-coding would be the best choice to capture the updated image. If the energy value is low, then the change between macroblocks is minimal, and inter-coding, (also referred to as differentially coding), which uses the least amount of bits, would be the optimal selection.

Figure 6D:
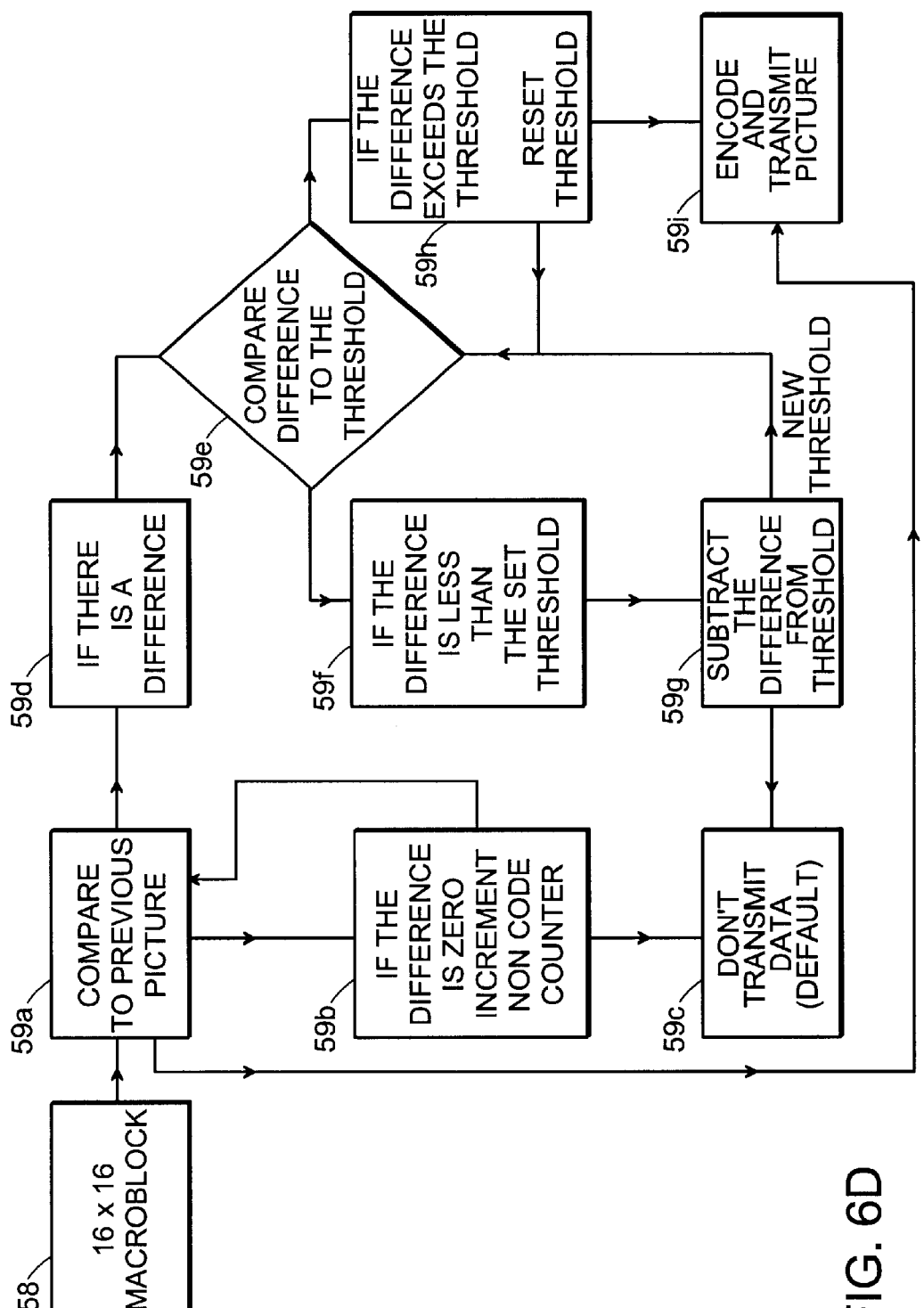
FIG. 6D is a block diagram showing, in general, the logical flow of video data in the present invention.

In addition to determining how the macroblock is to be encoded, the CPU also determines whether the macroblock will be encoded. Referring now to FIG. 6D the logical flow 57 of determining whether to encode each macroblock 58 is shown to include sending each macroblock 58 to a comparison module 59a, which compares that image block to the same block on the previous image, and calculates the difference value. Comparison module 59*a* also compares the current value of the so-called non-code counter with a preset value. The non-code counter keeps track of how many cycles have passed since the last time this particular macroblock was "coded" and transmitted to the final image destination. There are three possible situations which can arise. First, if the difference between the present block and the previous block is zero, and if the non-code counter is below the set point, the image data is sent to logic module 59*b* which then increments the non-code counter and sends the macroblock image data to the default dump 59*c*. In other words, the default is that no transmission is necessary because the image block of the present picture is the same as the previous picture, and in addition the number of consecutive non transmits of this particular macroblock has not yet exceeded the maximum allowed.

Second, if the non-code counter is at the set point for this particular macroblock of data, in other words this macroblock has not been encoded for a large number of consecutive cycles, then comparison module 59*a* sends the macroblock image data to the encode and transmit module 59*i*.

The third possible case for comparison module 59*a* is that a difference in the current image block versus the previous block exists. In this case the macroblock image difference value (which is also known as an error vector) is transmitted to logic block 59*d*, where the difference is quantified. Logic decision block 59*e* compares the difference value to a set threshold value. If the difference value is less than the set threshold value, logic block 59*f* transmits the calculated difference value to the adaptive threshold calculation module 59*g*. Module 59*g* subtracts the calculated difference value from the current threshold value and transmits the new (lower) threshold value back to logic decision block 59*e* for use the next time this particular macroblock is evaluated. Module 59*g* also sends the image data to the default dump 59*c*. It can be seen that in logic decision block 59*e*, the value of the threshold declines from the preset point by whatever the difference value is between the present macroblock and the previously transmitted macroblock. Thus there is a tendency for the threshold point in block 59*e* to decline from the set point toward zero as any information differences occur in the macroblocks.

The other possible decision path from block 59*e* occurs in the case where the difference value does exceed the current threshold value for the particular macroblock of image data. This image data goes into reset block 59*h*, which does two things. First, block 59*h* resets the threshold back to its fixed set point, and transmits the new threshold to block 59*e*. Second, block 59*h* transmits the macroblock image data to encode block 59*i* which encodes and transmits the picture represented by that particular macroblock of data.

Thus, it is apparent that a clean image, i.e., one which has a difference of zero from the prior macroblock of that same spot in the previous image, does not result in the transmission of any data, thereby increasing the available transmission bandwidth for image data transmission for sections of the image that do need to be transmitted in order to still keep a nice clean image.

In the case where there is a difference between the two macroblocks of image data, the system will either not transmit, or it will encode and transmit the picture element (thereby bringing the picture up to the current state, cleaning up the picture and getting rid of any defects that may have accumulated in the picture from the past) depending on whether the difference is less than the threshold value or not.

One key aspect of the present invention is that if the image difference is less than the set threshold, the system adaptively resets the threshold value to a lower level. That lower level is automatically set by default rule to the current threshold level minus the difference vector for the current macroblock.

Thus dirty macroblocks automatically increase the rate at which that macroblock is refreshed via encoding and transmitting. On the other hand, clean macroblocks (i.e., ones in which very little activity occurs and in which very little dirt has accumulated) have a slower rate of threshold decline, and thus a lower rate of encoding and transmitting. That clean macroblocks are transmitted less frequently is completely in agreement with the requirements of the human visual system. That is, a visually pleasing image may be achieved while encoding and transmitting less than the full data representation of an image.

Thus a method has been described for making an optimal decision as to which specific macroblocks should be encoded. The next step is to determine how to encode each macroblock; i.e. whether to use spatial or temporal compression techniques. There are a variety of tradeoffs that must be considered. Scene characterization is used to determine the type of encoding and the number of bits that should be allocated for each frame.

During scene characterization, all of the macroblocks of the frame are organized in monotonically decreasing order from those having the most energy to the least. Those macroblocks with the highest energy coefficients will require more bits for encoding the macroblock to ensure that the high frequency components are captured. The bit rate control is provided by assigning a quantization value MQUANT to each macroblock. MQUANT scales the amount of quantization that occurs for each macroblock during the DCT process. The greater MQUANT is, the fewer the non-zero DCT frequencies that need to be encoded and the fewer bits are necessary to encode the quantized frequency amplitudes. Thus, larger values of MQUANT translate into fewer encoded bits that need to be transmitted. The downside is that larger values of MQUANT can degrade picture quality.

In order to fully utilize the resources (bits) allocated to each frame in a video sequence during compression, a value for MQUANT is calculated for each macroblock. Here, this calculation is based on an analysis of each macroblock within each frame. The analysis results, in summary, in the assignment of a scalar weighting value to each macroblock according to its so called "Perceptual Visual Weight" (PVW). Here, PVW is a scalar weighting which is calculated to represent the perceptual importance of any particular scene type to the human visual system (HVS). The use of PVW is based on the recognition that human viewers tend to concentrate their attention to certain regions of interest or certain types of video sequences. Once the PVW value for each macroblock is determined, bit allocation may be done in an intelligent manner.

The PVW weighting process is based on the calculation of one of three picture statistics. As will be discussed in more detail below, the statistics chosen are based on the frame type being analyzed. The first statistic calculated is the weighted mean absolute difference of pixel data within a macroblock. The mean absolute difference statistic $S_1$ at pixel location (m,n) of a macroblock is calculated according to equation 5A given below as:

Equation 5A:

$$S_1 = \sum_{i=0}^{M-1} \sum_{j=0}^{N-1} W(i,j)|p(m+1, n+j) - \mu(m,n)|$$

where:

$$\mu = \frac{1}{M*N} \sum_{i=0}^{M-1} \sum_{j=0}^{N-1} p(m+1, n+j)$$

and represents the mean pixel value of a local pixel region (e.g. macroblock) M×N and W(i,j) is a weighting function typically chosen to be:

$W(i,j) = 1 \forall i,j$

The $S_1$ statistic proves a measure of how smooth the pixel surface is or how complex the local region is. Large values for $S_1$ may indicate the presence of an edge or texture region within the macroblock.

Once the $S_1$ values are calculated for each macroblock in a frame, further processing using these values is performed in order to compute the PVW of the macroblock. It should be noted that the use of $S_1$ alone in calculated the PVW is only valid for I-frames since the $S_1$ statistic does not provide any temporal component. As will be discussed below, in order to calculate the PVW for B or P type frames, additional statistics need to be determined.

Figure 7:
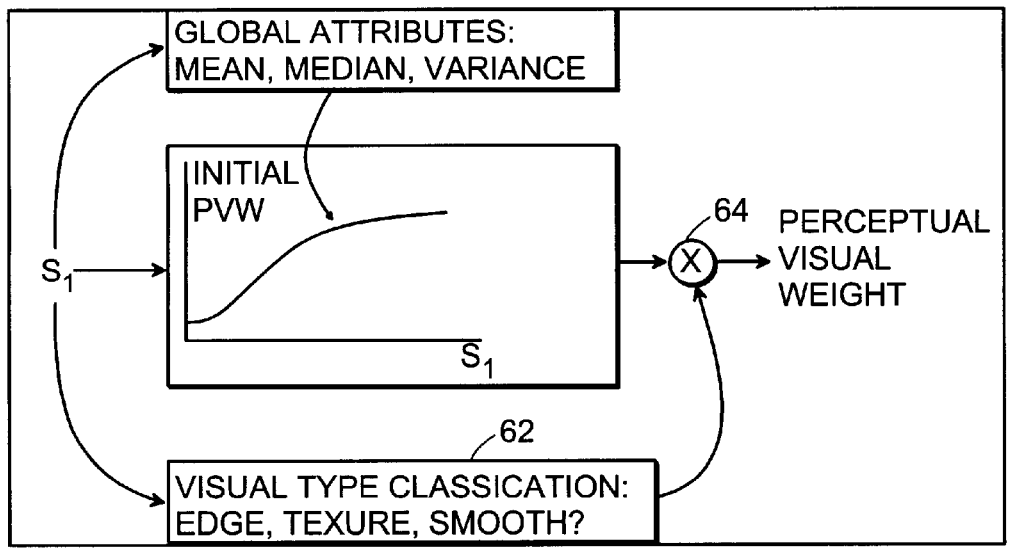
FIG. 7 is a block diagram of the process used to determine the perceptual visual weight of an I-coded frame or macroblock.

Referring now to FIG. 7, the PVW process (for an I-frame) is shown to include a mapping between the global statistics (e.g., mean, median, and variance) for the $S_1$ values as related to an initial PVW value for each macroblock. Visual type classification process 62 is coupled to scaling operator 64, such that each initial PVW value is scaled by a factor which is dependent upon the visual type classification of the macroblock. The scaled value thedn serves as the PVW value for the particular macroblock. As will be discussed below, this value is used to calculate the resource allocation (bit assignment) for that macroblock.

Figure 8:
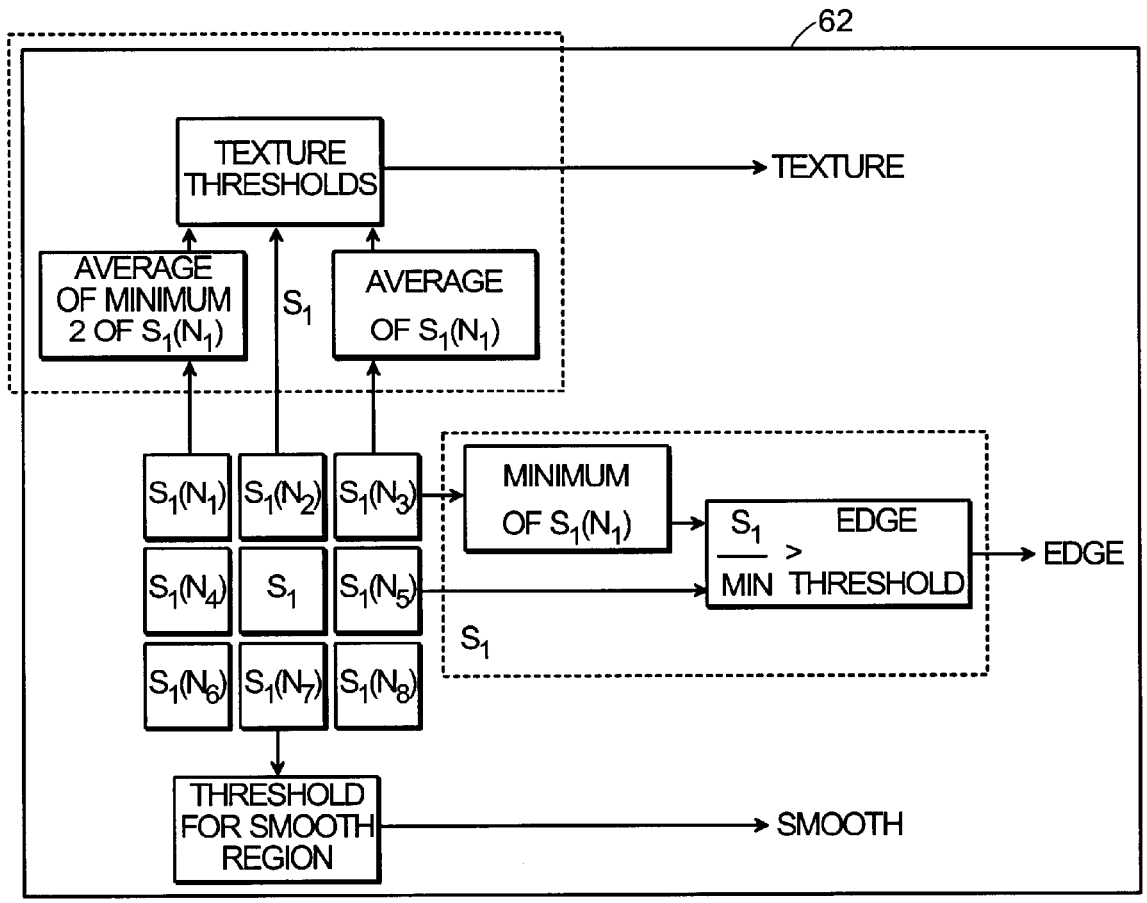
FIG. 8 is a diagram of the process used to determine the visual classification of a macroblock.

Referring now to FIG. 8, the visual type classification process 62 (FIG. 7) is shown to include three processes used to determine the visual type classification of any particular macroblock. The process is based in part on a comparison of the macroblock of interest to its immediate neighboring macroblocks. That is, the $S_1$ values for each of the neighboring macroblocks are used to provide inputs to two of the three (texture and edge) classification determinations.

To classify a particular macroblock as a texture region, the average of the minimum two neighboring $S_1$ values is calculated. Additionally, the average value of all neighboring $S_1$ values are also calculated. These values, plus the $S_1$ value of the macroblock of interest are then used to detect a texture region.

To classify a region as an edge region the minimum $S_1$ value of all neighboring macroblocks is determined. The $S_1$ value for the macroblock of interest is then divided by the minimum value. This value is then compared to a threshold value to determine if the macroblock should be classified as an edge type macroblock.

Similarly to classify a region as a smooth region, the $S_1$ value of a macroblock is compared to a threshold value defined as the maximum value which $S_1$ may be and still indicate a smooth region. It should be understood that the choice for the threshold values described above constitute no part of the invention and thus should not be seen as a limitation thereto.

Generally, consecutive frames in a video sequence are highly correlated in terms of the information content of successive frames. As a result, motion compensation may be used to enhance the compression ratio by removing these temporal redundancies. As described in detail below, each picture or frame is divided into small regions called macroblocks, and for each region or macroblock, a match is located from the other frames which bear the most resemblance to that region. The displacement in spatial coordinates between the region and the matches found in the other frame are called motion vectors. The motion information or motion vectors by themselves are too elementary for immediate usage in calculating the PVW value for a motion compensated frame. Thus, in order to reduce the motion vector information into a more usable form, the average pixel variation (i.e. spatial displacement) of each macroblock is computed according to equation 6A shown below.

Equation 6A:

$$S_3 = \sum_{i=0}^{M-1} \sum_{j=0}^{N-1} |DFD(m+i, n+j)|$$

The resultant $S_3$ values for each macroblock may then be used as described previously with respect to the $S_1$ values in order to calculate the PVW value for each macroblock.

Figure 9:
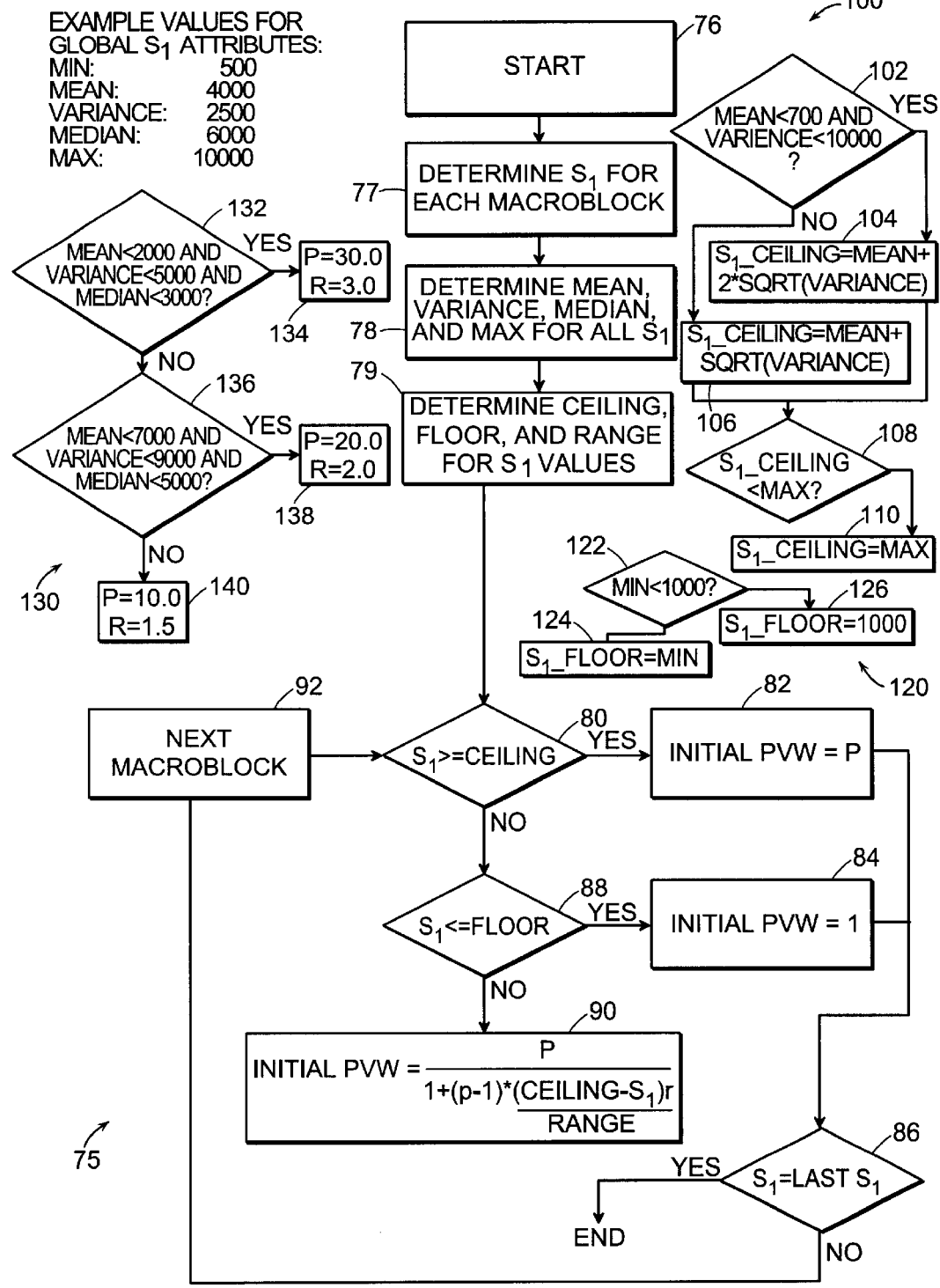
FIG. 9 includes flow charts for the determination of an initial perceptual visual weight for the process of FIG. 7.
Figure 10:
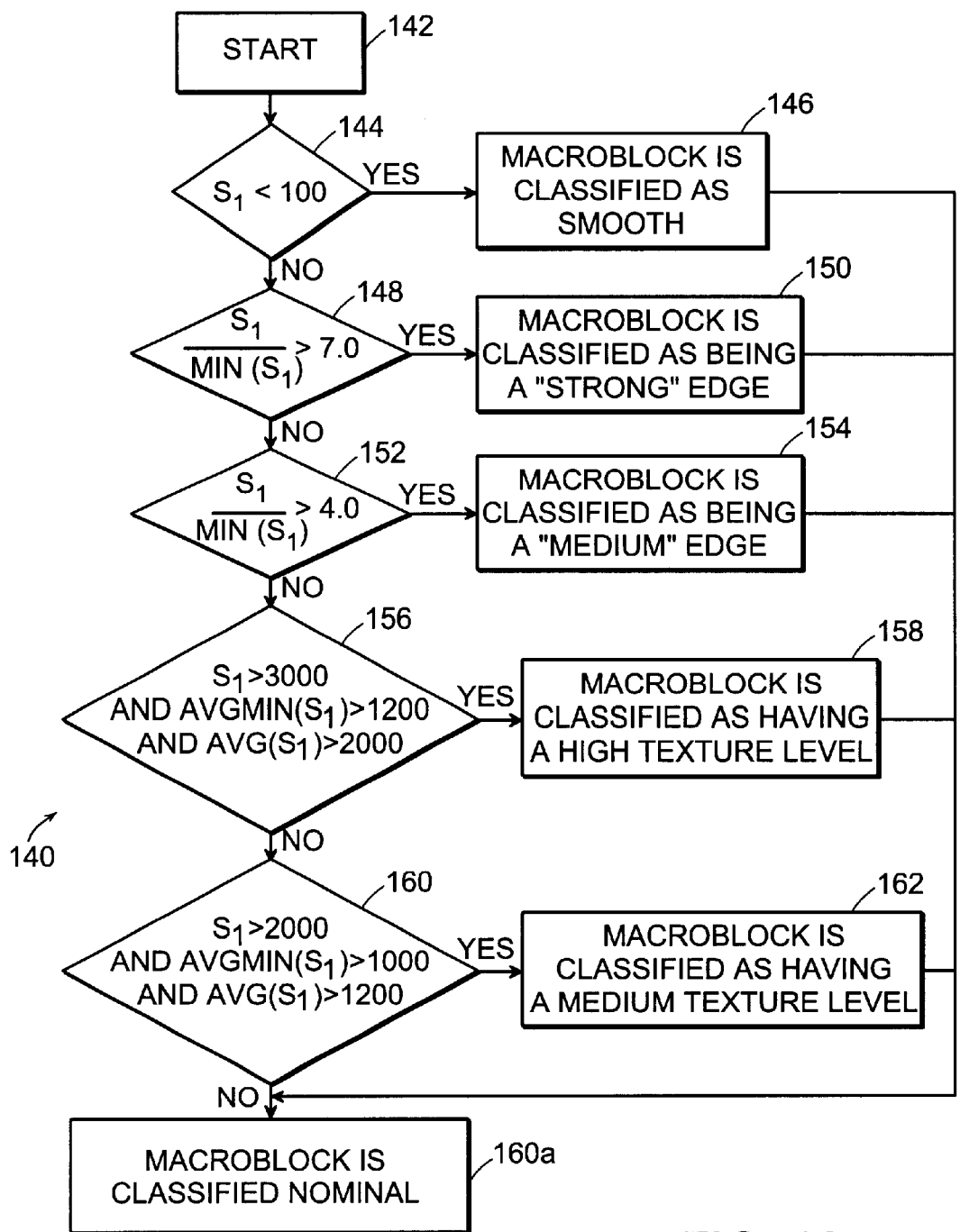
FIG. 10 is a flowchart corresponding to the visual classification process of FIG. 8.

The processes of FIGS. 7 and 8 for determining the perceptual visual weight will now be discussed in more detail while referring to FIGS. 9, 10 and 11. Referring first to FIG. 9, the determination of the initial PVW for a particular macroblock (I-type) is performed according to the process as shown in flowchart 75. For purposes of illustration, arbitrary values for the global $S_1$ attributes have been chosen such that the minimum is 500, the mean is 4,000, the variance is 2,500, the median is 6,000, and the max is 10,000. Using these values, the peak PVW (p) and rate values (r) may be determined according to flowchart 130. At decisional block 132 of flowchart 130, the mean, variance and median values are examined to determine if they are below certain chosen values, here 2,000, 5,000, and 3,000 respectively. It should he understood that these and other threshold values discussed herein are solely for illustration purposes and should be seen as a limitation of the present invention. If the mean, variance and median are all below the given values, then the peak PVW value is set, in block 134, to have the value 30. Additionally, in block 134 the rate value is chosen to be three. If the mean, variance, and median do not meet the requirements of decisional block 132, traversal through the process moves to decisional block 136 where the mean, variance, and median are compared against three new values, here 7,000, 9,000, and 5,000 respectively. If the mean, variance and median satisfy the conditions as shown, then at block 138 the peak PVW value is set to be 20.0 and the rate is chosen to be 2.0. If the conditions are not met as shown in decisional block 136, processing moves to block 140 where the peak PVW value is set to a value of 10.0 and the rate set to a value of 1.5.

Other values associated with the global $S_1$ characteristics of the frame being considered also need to be calculated before the initial PVW value for a particular macroblock may be obtained. The additional values are determined according to flowcharts 100 and 120 and produce the values for the $S_{1\_}$ ceiling and the $S_{1\_}$ floor. As shown in flowchart 100, processing begins at decisional block 102 where the mean and variance are compared against the chosen values of 700 and 10,000 respectively. If the values match the criteria, then at block 104 the $S_{1\_}$ ceiling is set to be the mean value plus two times the square root of the variance value. From there, processing proceeds to decisional block 108 where the $S_{1\_}$ ceiling value is compared against the max value associated with the global $S_1$ characteristics. If the criteria are satisfied, then the $S_1$ ceiling is set to be the maximum value (e.g. 10000 as given above). If at decisional block 102 the mean and variance do not meet selected criteria, then the $S_{1\_}$ ceiling value is calculated to be the mean value plus the square root of the variance as shown in block 106. From this point, processing moves to decisional block 108 where the calculated $S_{1\_}$ ceiling value is compared against the max value associated with the global $S_1$ attributes. If the calculated $S_{1\_}$ ceiling value is less than the maximum value, the $S_{1\_}$ ceiling value is set to be the maximum value as shown in block 110.

In order to determine the $S_{1\_}$ floor value, flowchart 120 begins at decisional block 122 where the minimum value associated with the global $S_1$ attributes is compared against the chosen threshold value of 1,000. If the criteria are met, then the $S_{1\_}$ floor value is set to be 1,000, as shown in block 126. If the criteria are not met, then the $S_{1\_}$ floor value is set to be the minimum value associated with the global $S_1$ attributes as shown in decisional block 124 (e.g. 500 as described above).

Still referring to FIG. 9, the process for determining the initial PVW value for an I-coded frame is accomplished by the process according to flowchart 75. The processing starts at block 76 and moves to block 77 where the determination of the $S_1$ value is performed for each macroblock. From there, processing moves to block 78 where the mean, variance, median, max, and min statistics are calculated for all $S_1$ values of the entire frame as described above. Processing then moves to block 79 where the ceiling, floor, and range of $S_1$ values are determined as previously described in connection with flowcharts 100, 120, and 130. After block 79, each macroblock is analyzed according to the steps beginning at decisional block 80. For a particular macroblock, its $S_1$ statistic value is compared against the calculated ceiling value and if the $S_1$ statistic value is greater or equal to the ceiling value, processing moves to block 82 where the initial PVW value is set to be peak value p as determined in flowchart 130. If at decisional block 80 the $S_1$ statistic value is not greater than or equal to the calculated ceiling value, processing moves to step 88 where the $S_1$ statistic is compared against the calculated floor value. If the $S_1$ value is less than or equal to the floor value, processing moves to block 84 where the initial PVW value is set to the value of 1.0. If however, at decisional block 88 the $S_1$ value is determined not to be less than or equal to the floor value, processing moves to block 90 where the initial PVW value is set according to the formula given in block 90. Note that blocks 86 and 92 provide for a continuing loop of the comparisons and value settings of blocks 80, 82, 84, 88, and 90, with processing ceasing when the last macroblock or last $S_1$ value has been reached for a particular frame.

As described previously with regard to FIG. 7, each of the initial PVW values is scaled depending on the visual type classification for the particular macroblock. As also discussed previously, the process for determining the visual type classification is shown in FIG. 8. The process for determining visual type classification will now be discussed in more detail with reference to flowchart 140 of FIG. 10. The processing of flowchart 140 begins with step 142 and moves to decisional block 144 where the $S_1$ value for the macroblock under consideration is compared against a chosen value or threshold. If the $S_1$ value is less than the chosen threshold, processing moves to block 146 where the macroblock is classified as being "smooth". If the $S_1$ value does not meet the criteria of decisional block 144, processing moves to decisional block 148 where the $S_1$ value of the macroblock under consideration is divided by the minimum $S_1$ value of all the macroblocks in the frame. The resulting value is compared against another threshold, here chosen to be the value 7.0. If the calculated value is greater than the threshold value, processing moves to block 150 where the macroblock is classified as being a "strong edge".

If the criteria of decisional block 148 are not met, processing moves to decisional block 152 where the $S_1$ value divided by the minimum of all $S_1$ values is again checked against a threshold, here chosen to be 4.0. If that condition is met, processing moves to block 154 where the macroblock is classified as being a "medium edge". If the criteria of decisional block 152 are not satisfied, processing moves to decisional block 156 where: the $S_1$ value of the macroblock under consideration is compared against a threshold, here chosen to be 3,000, the average of all the minimum $S_1$ values is compared against another threshold, here chosen to be 1,200, and the average of all the $S_1$ values for the frame are compared against a third threshold here chosen to be 2,000. If all three conditions are met, then processing moves to block 158 where the macroblock is classified as having a high texture level. If the criteria of decisional block 156 are not met, processing moves to decisional block 160 where the same comparison as done in decisional block 156 are performed with the choice of different thresholds.

In decisional block 160 the $S_1$ value for the macroblock of interest is compared against the value 2,000, the average minimum $S_1$ value for the entire frame is compared against the value 1,000, and the average of all $S_1$ values for th e frame is compared against the value 1,200. If those conditions are not satisfied, at step 160a the macroblock is classified as nominal. Otherwise, if those conditions are satisfied, the processing moves to block 162 where the macroblock is classified as having a medium texture level.

Figure 11:
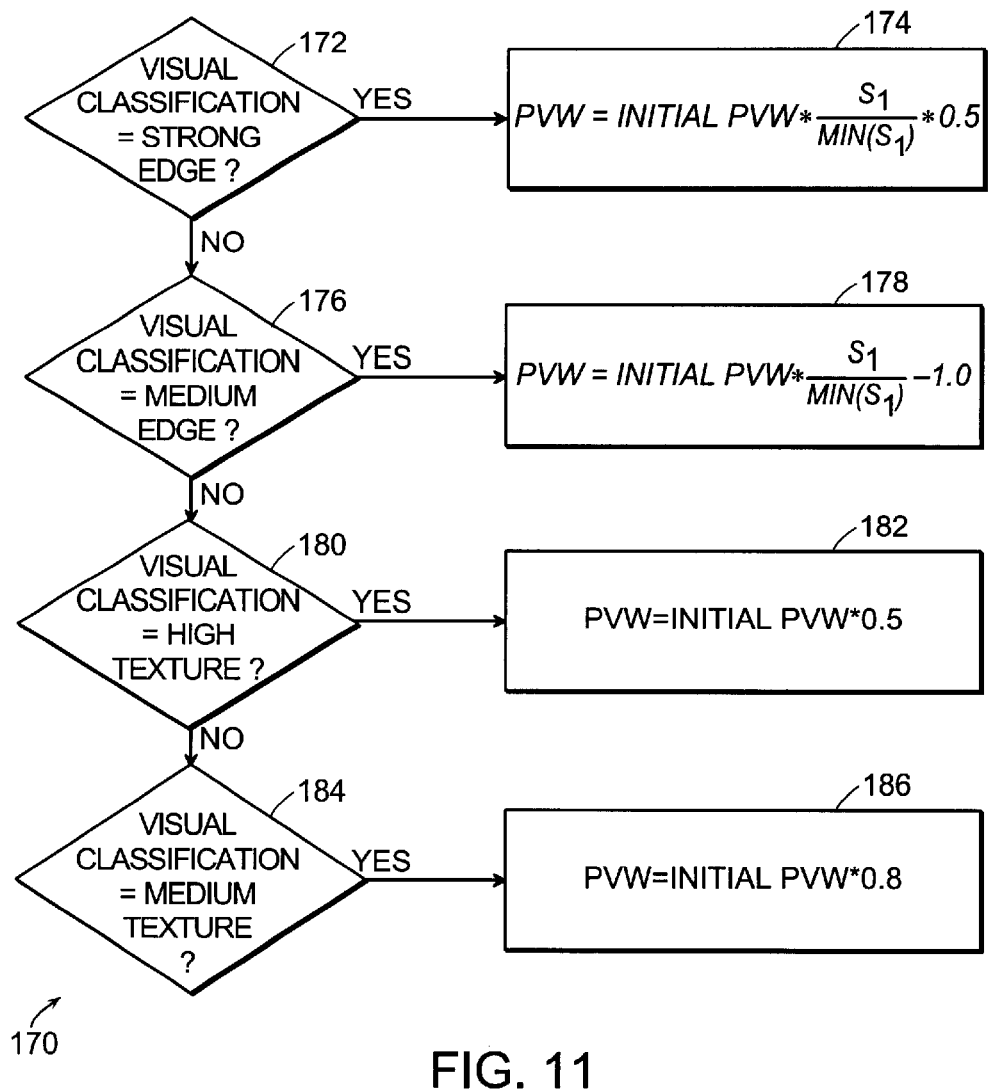
FIG. 11 is a flowchart for determining the final perceptual weight for the process of FIG. 7.

Once an initial PVW value and a visual type classification for each macroblock has been calculated, the scaling process 64 (FIG. 7) is performed according to flowchart 170 of FIG. 11. As shown, the final PVW value is scaled depending upon the visual classification of the macroblock. In particular, at decisional block 172 the visual classification is checked to determine if the macroblock is classified as a strong edge. If it is, processing moves to block 174 where the final PVW value is set according to the formula given in block 174. If the macroblock is not classified as a strong edge, processing moves to decisional block 176 where the visual classification is checked to determine if the macroblock is a medium edge. If the macroblock is classified as a medium edge, processing moves to block 178 where the final PVW value for the macroblock is set according to the formula given in block 178. If the visual classification is neither a medium edge nor a strong edge, processing moves to decisional block 180 where the visual type classification is checked to determine if the macroblock has a high texture level. If it does, processing moves to block 182 where the PVW value is set to be the initial PVW value times 0.5. If the macroblock does not have high texture, then processing moves to decisional block 184 where the visual classification of the macroblock is checked to see if it has medium texture. If it does, processing moves to block 186 where the final PVW value is set to be the initial PVW value times 0.8.

The processes described above in connection with FIGS. 7–11 describe the determination of the PVW values for interceded frames (or macroblocks). Very similar procedures are followed for the determination of PVW values for both P frames and B type frames. The difference being that an additional statistic, the $S_3$ or temporal information statistic is available for P and B type frames. Thus the $S_3$ statistic may be used in place of the $S_1$ statistic when calculating the PVW for P and B coded frame or P and B macroblocks within a frame containing a mix of types.

Figure 12:
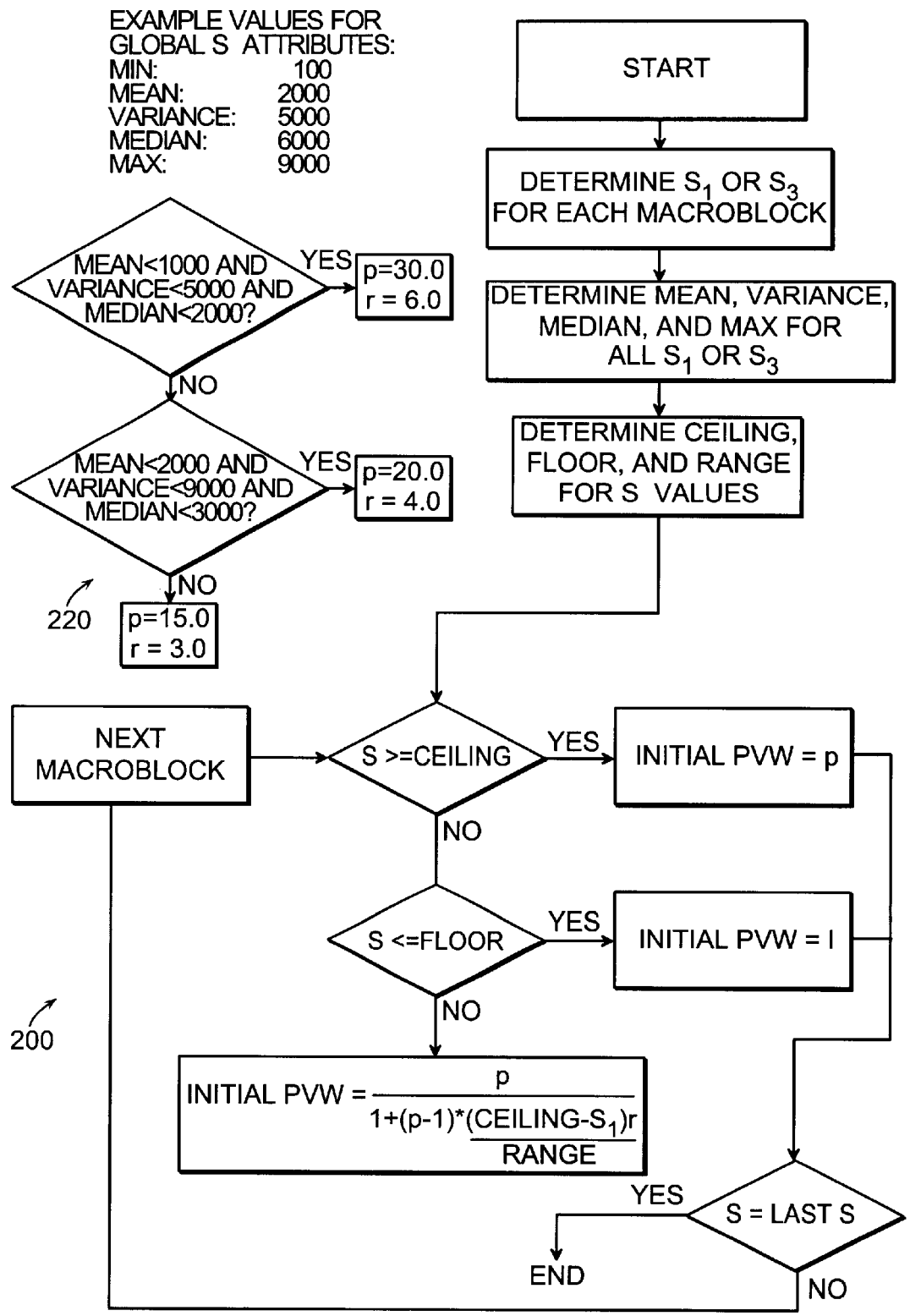
FIG. 12 includes flowcharts for the determination of initial perceptual visual weight values for the process of FIG. 15.

Referring now to FIG. 12, flowchart 200 shows the process used for determining the initial PVW for a P coded frame. For purposes of illustration, example values are shown in the upper left hand corner of FIG. 12 for the global S attributes of the entire frame. Note that the S attributes will be based on the calculated $S_3$ values for each macroblock having temporal attributes and/or the $S_1$ attributes of any I-type macroblocks within the P or B type frame. Here, the min value is 100, the mean is 2,000, the variance is 5,000, the median is 6,000 and the max value is 9,000. Flowchart 220 of FIG. 12 is similar to flowchart 130 of FIG. 9 except for the substitution of the different values associated with the global S attributes of the P encoded frame. Similarly, flowchart 200 is similar to flowchart 75 of FIG. 9 with the substitution of $S_3$ values in the place of $S_1$ values where appropriate for the P coded frames.

Figure 13:
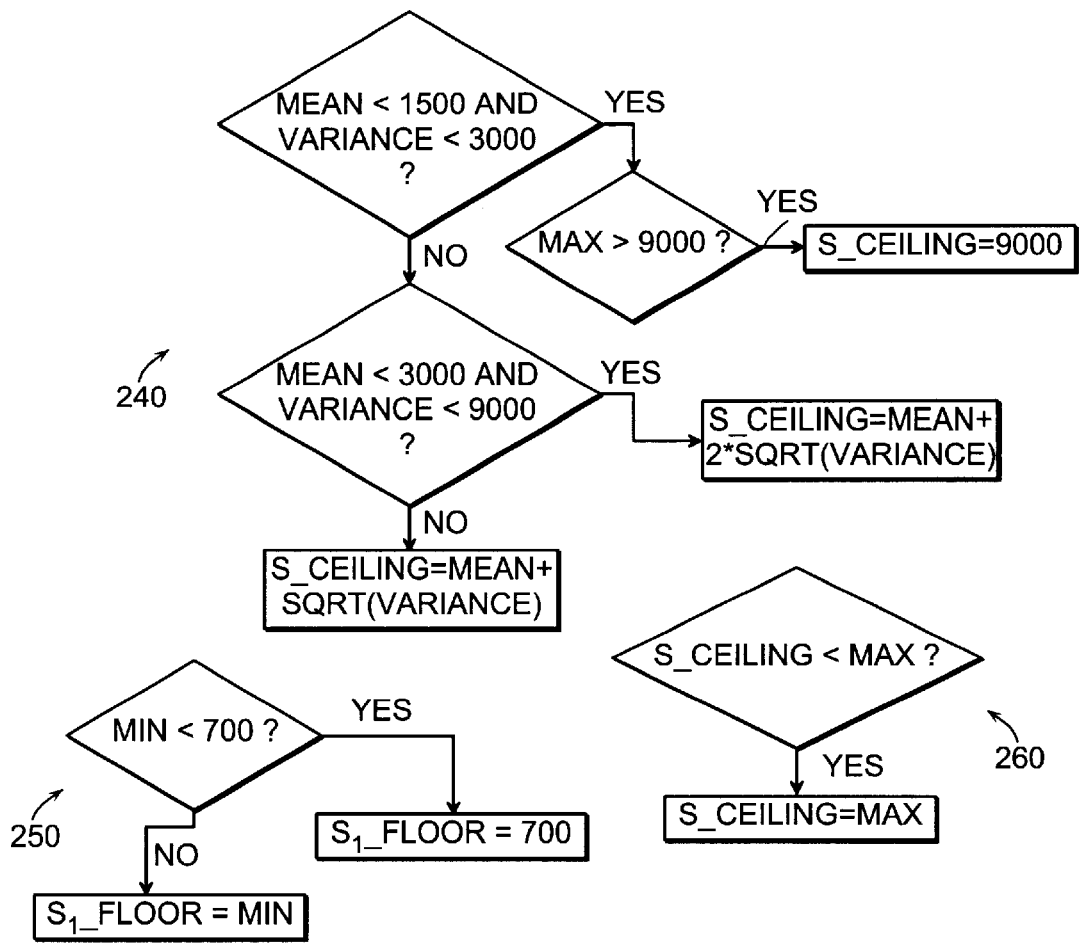
FIG. 13 includes flowcharts for the determination of initial visual weight values for the process of FIG. 12.

Referring now to FIG. 13, flowcharts 240, 250, and 260 depict the determination of the ceiling and floor values associated with the P coded frame. Note that flowchart 240 and 250 are similar to flowcharts 100, and 120 respectively of FIG. 9 with the substitution of different values associated with the P coded frames. Flowchart 260 of FIG. 13 is an additional step for P coded frames wherein the S_ceiling value is set to be equal to the max value associated with the $S_3$ statistics if the calculated S_ceiling value is less than the max value associated with the P coded statistics. Note too that the flowchart 200 of FIG. 13 is the identical process followed for determining PVW values for B coded frames as well as P coded frames.

Figure 14:
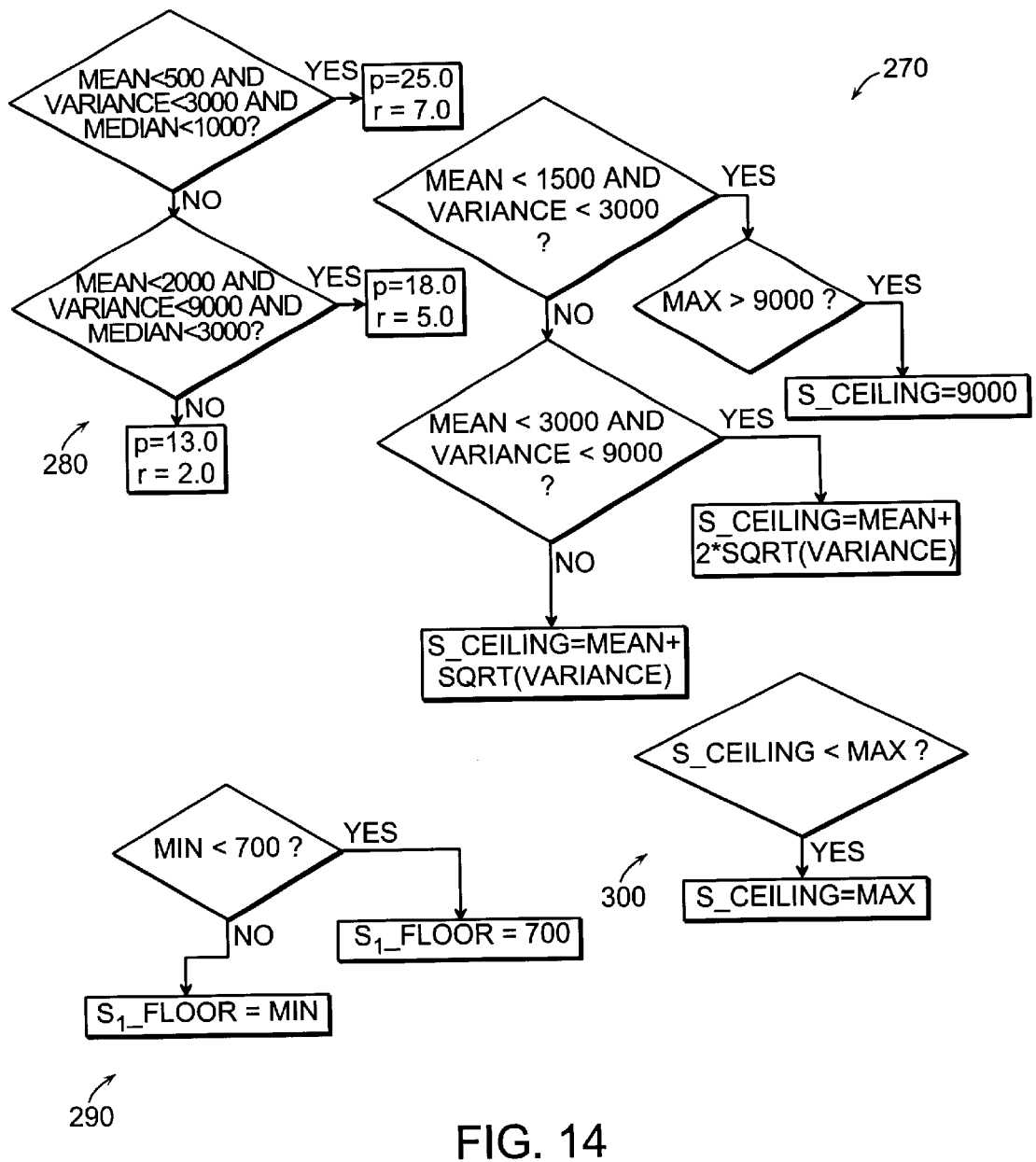
FIG. 14 includes additional flowcharts for the determination of initial visual weight values for the process of FIG. 12.

Referring now to FIG. 14, global S attributes are given to be min=50, mean=1,000, variance=4,000, median=2,000, and max=7,000. Flowchart of 280 of FIG. 14 is similar to flowchart 220 of FIG. 12 and represents the calculation of peak (p) and rate (r) values for the global S attributes of a B coded frame. Similarly, flowchart 270, 290 and 300 are similar to flowcharts 240, 250, and 260 (FIG. 13) respectively with the substitution of the B coded statistic values in place of the P coded statistic values.

Figure 15:
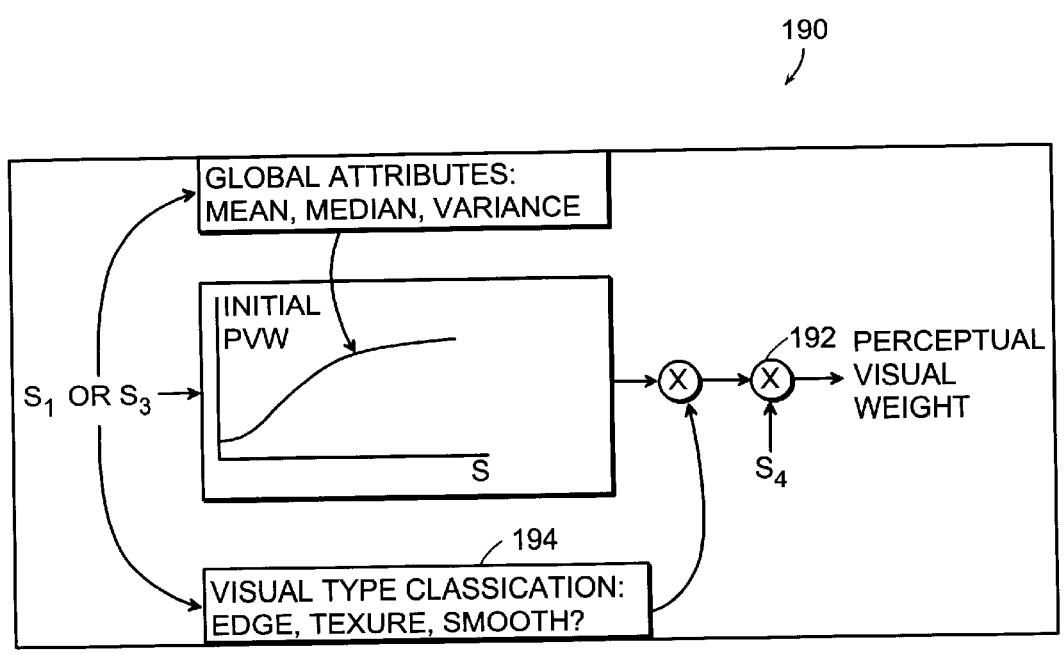
FIG. 15 is a block diagram for a process for determining the perceptual visual weight for P and B-type frames and macroblocks.

Referring now to FIG. 15, a process for determining final perceptual visual weight values for P and B type frames is shown in process 190. Note that process 190 is similar to the process of FIG. 7 with the addition of an additional scaling step 192 which takes as its input, the initial PVW value scaled by the visual type classification, as well as the $S_4$ frame statistic (described below).

A further method of analyzing a video frame includes examining a local cluster of motion vectors. This analysis provides improved picture characterization which may then be used, for example, in the compression scheme disclosed herein. In addition to the utility provided by producing a more effective compression technique, the method described below to analyze a local cluster of motion vectors is also useful in providing characterization of video frames or sequences for such purposes as, for example, indexing and quick searching. According to a preferred embodiment of the present invention, a so-called differential motion information statistic is calculated for each macroblock as follows.

Figure 16:
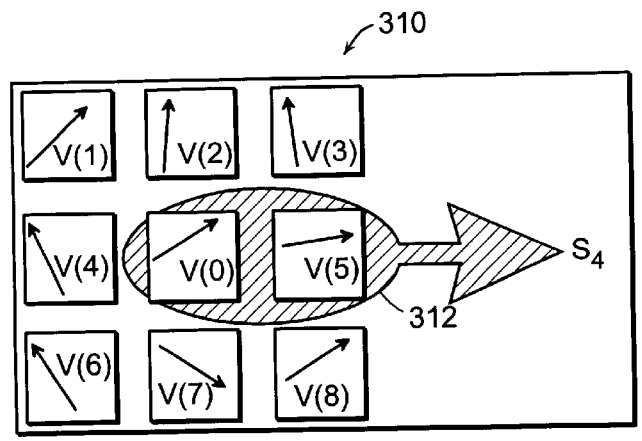
FIG. 16 is a block diagram of depicting motion vectors associated with various macroblocks of an image.

Referring now to FIG. 16, a group 310 of nine macroblocks including their corresponding motion vectors is shown. A motion vector for each macroblock is defined to be the average displacement in x and y coordinates for a particular macroblock. That is, an x-y displacement for each pixel in the macroblock of interest is calculated as compared to its found match in a succeeding or preceding frame. The values are then averaged to produce a motion vector for the macroblock of interest. The macroblock of interest (i.e. the motion vector of the macroblock), here shown as macroblock 312, is compared to each motion vector of the neighboring macroblocks. The comparison performed is a difference calculation between the macroblock of interest and the neighboring macroblocks and is calculated as shown in equation 7.

$$d=|v_{\tilde{y}}(i)-v_{\tilde{y}}(0)|+|v_{\tilde{x}}(i)-v_{\tilde{x}}(0)|$$ Equation 7:

The resulting eight difference values for the eight neighboring macroblocks are then sorted in increasing order and according to the preferred embodiment of the present invention the third smallest value of the difference calculation is chosen to be the differential motion information for that particular macroblock it should be noted that if the number of neighboring motion vectors (macroblocks) is smaller than three either due to boundary conditions or the absence of motion vector information for I frames (and macroblocks), the largest value of the differential vector will be chosen to be the differential motion information for that particular macroblock.

Once the differential motion information for each macroblock of a particular frame is determined, this information is used in the process as shown in FIG. 12 to calculate the perceptual visual weight for P-type and B-type frames. Note that the process of FIG. 12 is similar to the process shown in FIG. 7 and thus it should be understood that the process for determining visual type classification, as shown in block 194, is the same as that used for visual type classification of FIG. 6 (i.e., block 62). Thus, it can be seen that the differential motion information (statistic $S_4$) is used to scale the initial PVW value in order to determine the actual PVW for a particular macroblock.

The differential motion information for a video frame provides an indication as to the type of motion occurring in the frame. For example, frames with large differential motion values near the outer perimeter of the frame may indicate a zooming in or out sequence. Similarly frames with large differential motion information at the opposite edges may indicate a panning sequence. Thus, it can be seen that in addition to the utility in scaling the PVW value for particular macroblocks, the differential motion information may be used to classify the frames in a video sequence. As mentioned earlier, this information may be useful in indexing a video sequence for quick scanning and indexing.

Once the PVW values for each macroblock have been determined as described above, according to the preferred embodiment of the present invention, a distribution of the resources (bits) available for the entire frame may be allocated to each macroblock according to equation 8 below.

Equation 8:

Here S is the amount of resources allocated to the frame, s(k)

$$s(k) = \frac{PVW(K)^\alpha}{\sum_1 PVW(1)^\alpha} S$$

represents the resources for the $k^{th}$ region of the frame, and PVW(k) represents the perceptual visual weight of the $k^{th}$ region of the frame (as described above) where $\alpha$ is chosen to be 1. Thus it can be seen by determining which parts of a frame are more important to the human visual system a more intelligent allocation of resources can be applied to each picture frame. The results of the intelligent allocation of resources become apparent during the decompression of the compressed images. That is, the resulting images are of a much higher visual quality even though the same amount of resources have been used to compress the images.

The quality improvement is achieved by specifying the resources per segment of the video sequence or image rather than for the entire frame. The high level characteristics, $S_1$ and $S_3$, represent the spatial complexity of a particular macroblock whereas statistic $S_4$ indicates the temporal complexity of a picture, if both spatial and temporal complexity is at the high end as is in scenes with high motion activity, the coding resources (i.e. allocation of bits) will not necessarily have to increase to match. This is true since temporal masking effects of the human visual system are likely to render the coding artifacts imperceptible. If only spatial complexity reaches the high end of the spectrum, it may be necessary to temporarily increase the bit allocation over a short span to maintain constant visual quality throughout the sequence.

Once the bit allocation for each macroblock has been determined, that information may be used as a basis for establishing a quantization value to be used during the compression of the individual frames. According to the preferred embodiment of the present invention, the quantization selection process is based on a non-parametric model built during a training phase. The training phase includes performing the same functions on sampled video data as would be performed during real time compression of video data. That is, temporal and spatial redundancies are removed from video frames and the discrete cosine transform is performed as would be done during a real time compression (described elsewhere herein).

Figure 17:
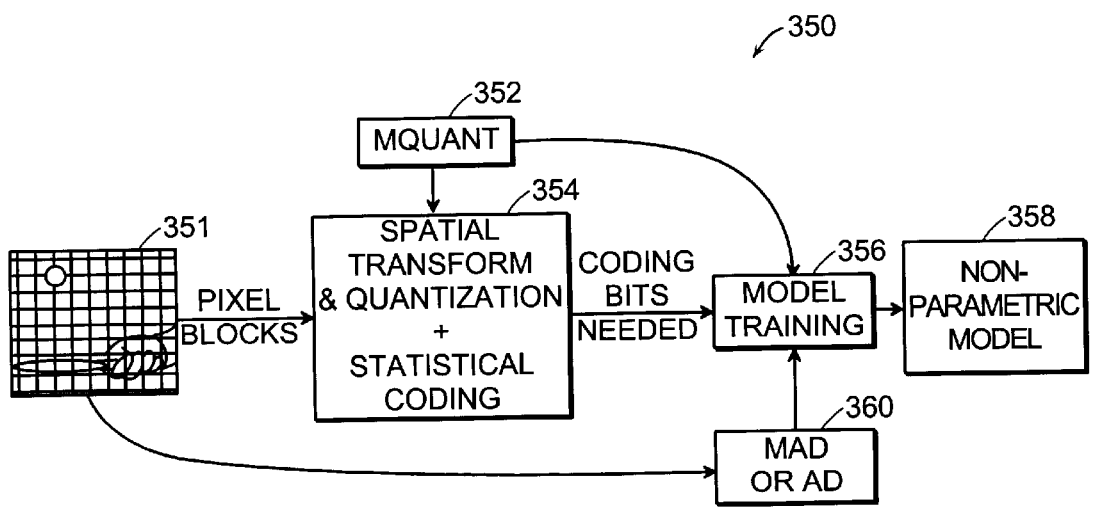
FIG. 17 is a block diagram of the process used to build a non-parametric model for determining quantization values.

Referring now to FIG. 17, the derivation of non-parametric model 358 is shown as being the result of a model training phase 356 which takes as its input the number of bits needed to code a particular macroblock using a certain quantization level. Also input to the model training, as shown by block 360, is the characterization of the macroblock under consideration as described previously. This characterization according to the preferred embodiment corresponds to the $S_1$ and $S_3$ values discussed above with respect to providing the perceptual visual weighting values.

In order to provide a complete model of the coding system, each macroblock of the sample image will undergo a spatial transformation and quantization a repeated number of times varying the MQUANT (quantization level), in order to provide a relationship between the AC energy components ($S_1$ or $S_3$ values), the particular MQUANT variable, and the resultant number of bits needed to code the particular macroblock. As an example, consider Table I below where four samples have each been exposed to process 350 while varying the quantization value from 1 to 4.

TABLE I

| MQUANT | 1 | 2 | 3 | 4 |
|---|---|---|---|---|
| Sample #1 | 650 | 500 | 250 | 200 |
| Sample #2 | 600 | 450 | 400 | 300 |
| Sample #3 | 500 | 350 | 300 | 200 |
| Sample #4 | 400 | 300 | 150 | 100 |
| Average | 537.5 | 400 | 275 | 200 |

Sample resource determinations for AC=1000

It should be noted that the MQUANT values of 1 to 4 are chosen here for simplicity of illustration and should not be seen as a limitation of the present invention. In the preferred embodiment of the present invention, the actual number of quantization levels available range from 1 to 31. In examining Table I, it can be seen that when sample one (i.e. macroblock one) is subjected to process 350 with a quantization value of one, the amount of actual resource bits necessary to code (compress) the particular macroblock is 650. Similarly, sample one exposed to process 350 of FIG. 17 using quantization level of two results in a bit consumption of 500. Other values are shown for quantization levels 3 and 4 and for samples 2–4 with the average values for each of the required bit consumptions, to code the particular macroblocks, is given as the last value in each column. Note that Table I are values for particular samples where the macroblock data characterization, has for example, an AC characterization of the value 1,000.

Using the data from Table I, a non-parametric model as given by Table II may be constructed. Table I shows only a single entry for illustration purposes for the AC value equal to 1,000. Table II includes values for the MQUANT variable or the quantization level from 1–3 with associated resource boundaries given per quantization level.

TABLE II

| MQUANT | 1 | 2 | 3 |
|---|---|---|---|
| Resource Boundary | 468.75 | 337.5 | 237.5 |

Non-parametric Model (1-entry, AC=1000)

Note that the values given for each resource boundary represent the midpoint between the average values for the given quantization levels. That is, for example, the value 468.75 is midway between the average values of 537.5 and 400. Likewise the value given for the quantization level two of 337.5 is midway between the value 400 and 275 of Table I. Once the table, such as Table II, has been constructed for a wide variety of sampled images, this model may be used during the compression process as will be discussed below.

Figure 18:
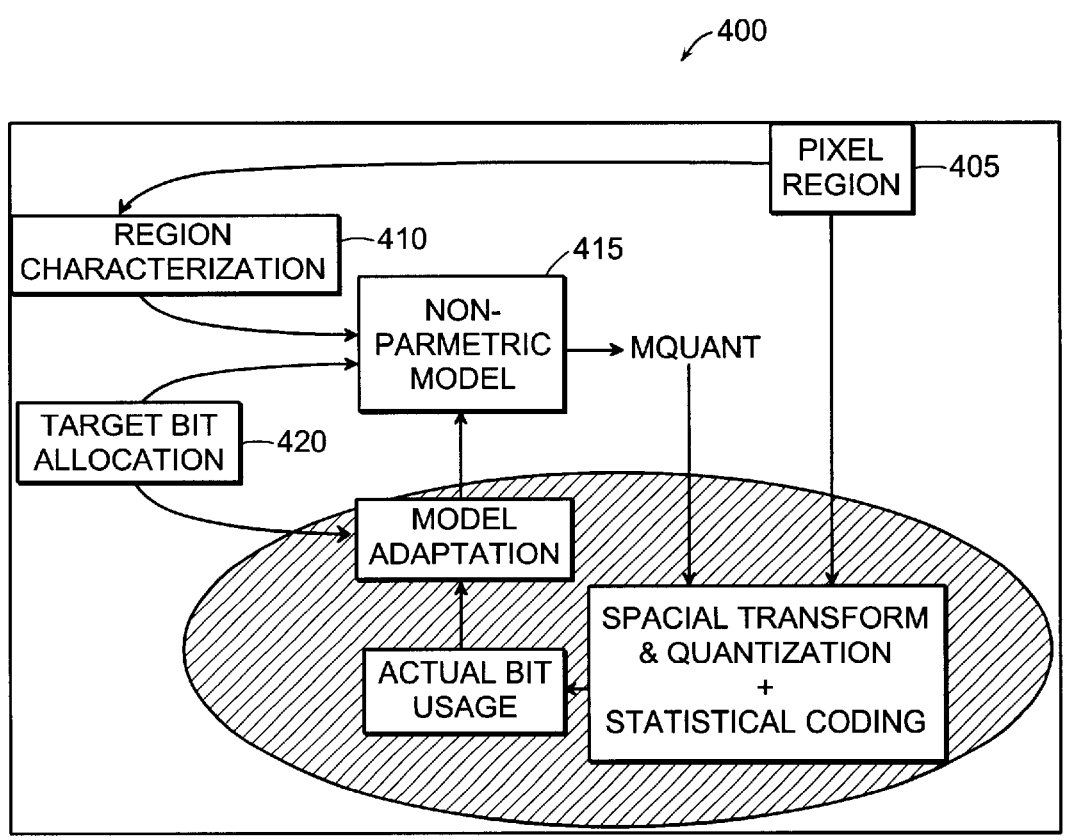
FIG. 18 is block diagram of the usage of the non-parametric model of FIG. 17.

Referring now to FIG. 18, the quantization level determination, during a real time compression of video data, as shown by process 400, is provided as an output from the non-parametric model 415. The non-parametric model takes as its input, the region characterizations of the macroblock being considered, the target bit allocation 420 (which, as described above, is calculated for each macroblock depending on the macroblock statistics) and the perceptual visual weight accorded to that particular macroblock. As an example, consider the case when the region characterization of the pixel region 405 has resulted in a value for the AC characteristics of 1,000. Also consider that for pixel region 405 the target bit allocation has been calculated to be 380. In order to determine the proper quantization level to properly compress and encode this macroblock, the non-parametric model as shown in Table II is used as follows. An entry in Table II is found corresponding to the AC value as calculated for pixel region 405 which is, in the example, the value 1,000. Reading across Table II at the entry of 1,000 the value of 380 is compared against the values associated with the quantization levels for that particular AC value. Here the value of 380 is greater than 468.75 and less than 337.5 which falls between the values of MQUANT 1 and MQUANT 2 resulting in a choice for the quantization level for this particular macroblock of MQUANT equal to 2.

According to the preferred embodiment of the present invention and as shown in FIG. 16, the non-parametric model may adapt to real time compression by calculating a scaling value depending upon how the actual resource consumption compares to the total allocated resource for a particular macroblock or frame. That is, the chosen MQUANT value via the non-parametric model may result in an actual resource consumption (after compression) which is less than the target bit allocation. As a result, additional bits may be available for the compassion of future frames or macroblocks.

To ensure full usage of the allocated resources, future resource allocation may be scaled to use all of the bits of the target bit allocation such that a higher fidelity is achieved during the decompression phase. Here the scaling factor is given by an adaption ratio which is calculated to be the allocated resource minus the actual resource consumption divided by the allocated resource. Thus, for example, if a previous frame has been given a total allocated resource of 100,000 bits and the actual resource consumption given by the non-parametric model calculates to be 80,000 bits, there will be 20,000 additional bits resulting in an adaption ratio of 0.2. Then in a subsequent picture of the same type having a total target allocated resource of 150,000 bits may be scaled by multiplying the value of 150,000 by 1.0 plus the adaption ratio or 1.2 resulting in an actual allocated resource of 180,000 bits. It should be noted that scaling may be done on a per frame or per macroblock or per several macroblock basis.

Thus it can be seen that although no explicit mathematical relationship may be determined in order to set the quantization level for efficient compression, the non-parametric model, according to the preferred embodiment of the present invention, provides a vehicle for effectively assigning quantization levels depending on resources and frame characterization, such that the most efficient allocation of bit resources to particular frames is achieved.

Referring again briefly to FIG. 3, after the CPU has completed the above scene characterization process, it constructs macroblock templates in memory for each frame, where each template describes the quantization of each macroblock and how each macroblock is to be encoded. The encoding decision is stored in the Code Block Pattern (CBP) field of each macroblock template. The encodings for the decode selection are shown below in Table III:

TABLE III

| CPB | Encode type |
| --- | --- |
| 0 0 0 | skip macroblock |
| 0 0 1 | " |
| 0 1 0 | intra-code macroblock |
| 0 1 1 | " |
| 1 0 0 | differential code-forward only |
| 1 0 1 | differential code-backward only |
| 1 1 0 | differentially code-bi directionally |
| 1 1 1 | " |

Although every macroblock in an I frame is intra-coded, not every macroblock in a P or B frame is differentially coded. A macroblock in a P frame or a B frame may be Intra-coded if the best motion match indicates a large energy difference between the present frame and the matched frame. The implication given by the large energy change is that there is a large change in the image which is being portrayed. Thus, it is in the interest of accuracy to capture this change through intra-coding the macroblock, rather than using differentially coding techniques.

The encoding/decoding decisions and the quantization values are loaded into macroblock templates in system memory 14 (FIG. 2) when the CPU has completed its analysis of the frame. The CPU notifies the VCDU that the encoding data is present, and copies the macroblock templates using a DMA write over the PCI bus to VCDU memory 35 (FIG. 2).

Note that, at this point, although complex computational tasks have been performed on the input video data, only two DMA transactions have occurred over the PCI bus. The complex hardware motion vector generation was performed in hardware in the VCDU. A subset of the data, merely the energy coefficients and the motion vectors, were forwarded to the CPU for its analysis. The CPU determined, via an analysis in software, the optimum encodings and quantization levels for the macroblocks; i.e. which tactic should be taken for compressing the block. The tactics dictated by the CPU are then executed, in hardware, by the VCDU. By allowing the policy making decisions to be implemented in software, an opportunity exists for fine-tuning the selection criteria without affecting the VCDU hardware. When the decision process was completed, only a small portion of data, the encoding selection and the quantization value for each macroblock, need to be transferred over the PCI bus to the VCDU. Thus, a large portion of the video compassion process has been completed with only a minimal impact on the PCI bus.

When the CPU completes the scene characterization process 46 by writing data to VCDU memory 35, the motion compensation/quantization unit 48 can begin its function.

IV.) Motion Compensation

It is in the motion compensation/quantization unit 48 that each of the macroblocks is compressed and encoded. There are two methods that can be used to compress the macroblock; either spatial compression of temporal compression.

A. Spatial Compression

Spatial compassion is performed with reference only to the pixels in the macroblock itself, rather than with reference to the macroblock in preceding or succeeding frames.

Figure 19:
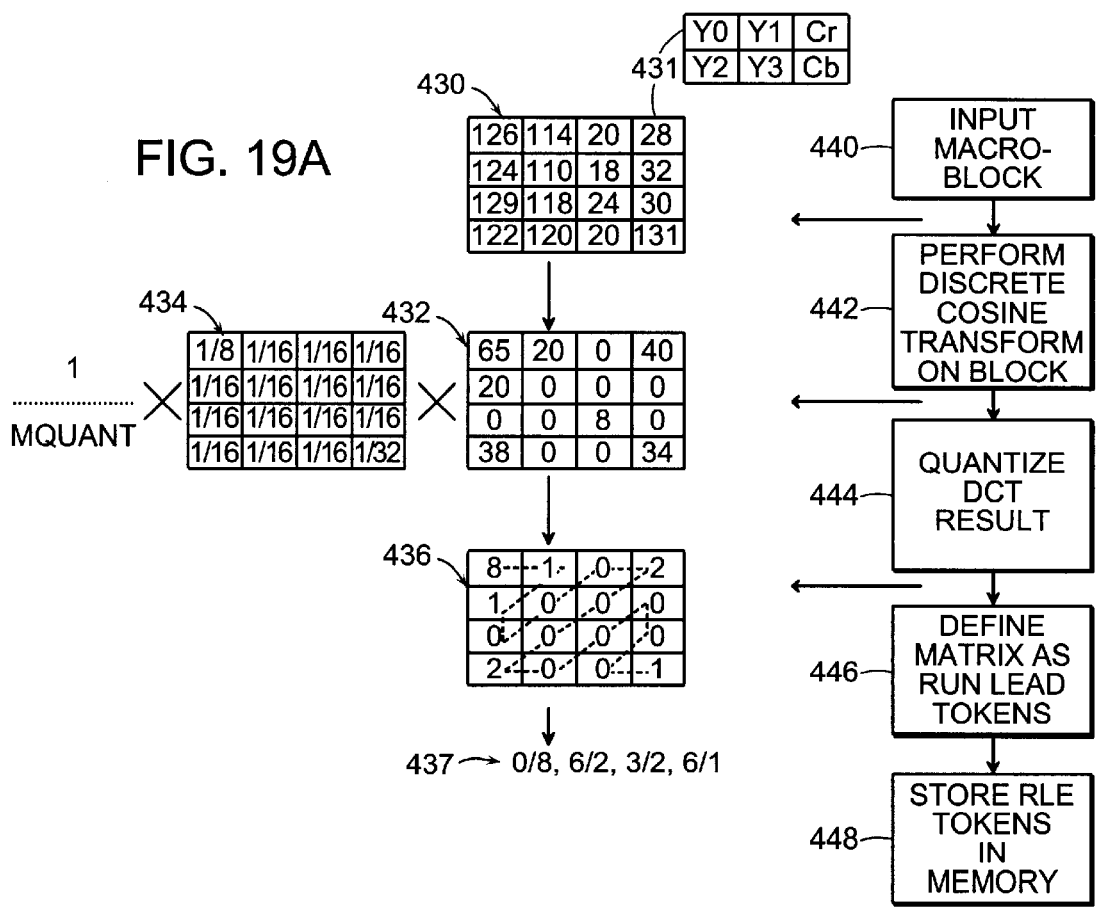
FIGS. 19A and 19B provide an illustrative example and a flow diagram, respectively, of the intra-coding procedure used in the motion compensation process of FIG. 3.

Referring now to FIGS. 19A and 19B, a flow diagram of the spatial compression process will be described with reference to permutations of an example 4×4 pixel block 430. At step 440 (FIG. 19B) the input luminance and chrominance data is retrieved from VCDU memory and apportioned into 6 blocks of 8×8 pixels, such as shown in block 431. At step 442, a Discrete Cosine Transform (DCT) is applied to the block of pixels to provide image enhancement, restoration, and facilitate encoding of the image.

The general purpose for performing the forward and inverse Discrete Cosine Transform is to compress or decompress the video image by transforming 8×8 pixel blocks from a time domain into a frequency domain for compassion, or visa versa for decompression. Application of the DCT removes spatial redundancies in the 8×8 block. Spatial redundancies refer to the correlation among neighboring pixels. The redundancy manifests itself as data, in other words, there are 64 pixels that must be included as data if no compression were employed. If all the pixel values were equal, using a transform, only 1 coefficient would be required to represent the block. There is no average number of coefficients required, but in order to please the eye, usually only a few coefficients are used rather than the original 64.

The DCT is a two-dimensional transform. The algorithms used to perform the forward and inverse transforms are provided below in equations 9A and 9B respectively:

Equation 9A:

$$F(u, v) = 1/4 C(u) C(v) \sum_{x=0}^{7} \sum_{y=0}^{7} f(x, y) x \cos\left[\frac{2(x+1)u\Pi}{16}\right] \cos\left[\frac{2(y+1)v\Pi}{16}\right]$$

Equation 9B:

$$f(x, y) =$$

$$1/4 C(u) C(v) \sum_{u=0}^{7} \sum_{v=0}^{7} C(u) C(v) F(u, v) x \cos\left[\frac{2(x+1)u\Pi}{16}\right] \cos\left[\frac{2(v+1)v\Pi}{16}\right]$$

Procedures available for the application of a DCT to the pixel block are well known to those of skill in the art. The preferred embodiment of the invention implements DCT using hardware capable of performing both DCT and IDCT (Inverse DCT) in substantially the same amount of time. This high speed approach to performing either the forward or inverse transform employs the same minimum hardware for both operations. This is a major improvement over prior art techniques which are only optimum in one direction. The exact implementation will be discussed in further detail below.

Referring again to FIGS. 19A and 19B, the results of applying the DCT of Equation 9A on block 430 are shown in block 432. The block 432 comprises the remaining DC values of the pixels, after the transform. At step 444, quantization is performed on the block. Quantization applies an element-wise division to each DCT resultant coefficient to filter high energy coefficients to those which the Human Visual System (HVS) can distinguish.

As shown in FIG. 19A, each element of the DCT block is divided by a fixed value in a corresponding location of Quantization Matrix 434. The element is also divided by the MQUANT value, provided for that block during the scene characterization process in the CPU. The results of this operation are shown in the Quantized Coefficient Matrix 436. The coefficients in the quantized coefficient matrix are then translated, at step 446 into Run/Level (RLE) Tokens, which are used to define the block for entropy coding.

The RLE tokens are determined by traversing the macroblock in a zig-zag pattern (shown via dashed lines in macroblock 436 of FIG. 19A). The token is determined by: (the distance to the next macroblock entry/the value of the next macroblock entry). Example RLE tokens 437 from macroblock 432 are shown in FIG. 19A. After the RLE tokens have been generated at step 448 they are stored in VCDU memory 35 for later encoding by the CPU 12.

For quantization purposes, in the example of FIG. 5A, the MQUANT value used is a '1'. However, the MQUANT value may range from 1 to 31. It can readily be seen that, by varying the MQUANT value, the range of values in the Quantized Coefficient Matrix 436 may be either increased, or decreased. Consequently, varying the MQUANT value controls the number of RLE tokens that are used to define each block. Thus, it can be seen that selecting the appropriate MQUANT value directly controls the allocation of bits to a block, and consequently a frame. The present invention, by assigning MQUANT values via software, retains the flexibility to dynamically update the bit allocation method during operation of the CPU.

While spatial compression techniques provide the most accurate representation of the frame at a given time, they typically require more storage of bits than inter-coding techniques. Using inter-coding techniques, changes between subsequent frames are encoded, rather than encoding the frames themselves, at a reduced bit rate. An inter-coding technique known as temporal compression is used to encode the relative differences between the frames, as will be described below.

B. Temporal Compression

Temporal compression compresses uses differential coding to compress a frame by identifying the frame relative to a past or previous frame. The VCDU motion compensation and quantization unit 48 (FIG. 3) performs temporal compression by locating a reference macroblock from another picture, and encoding the difference between the current and reference macroblocks, instead of encoding the macroblock from scratch using intra-coding techniques.

Figure 20:
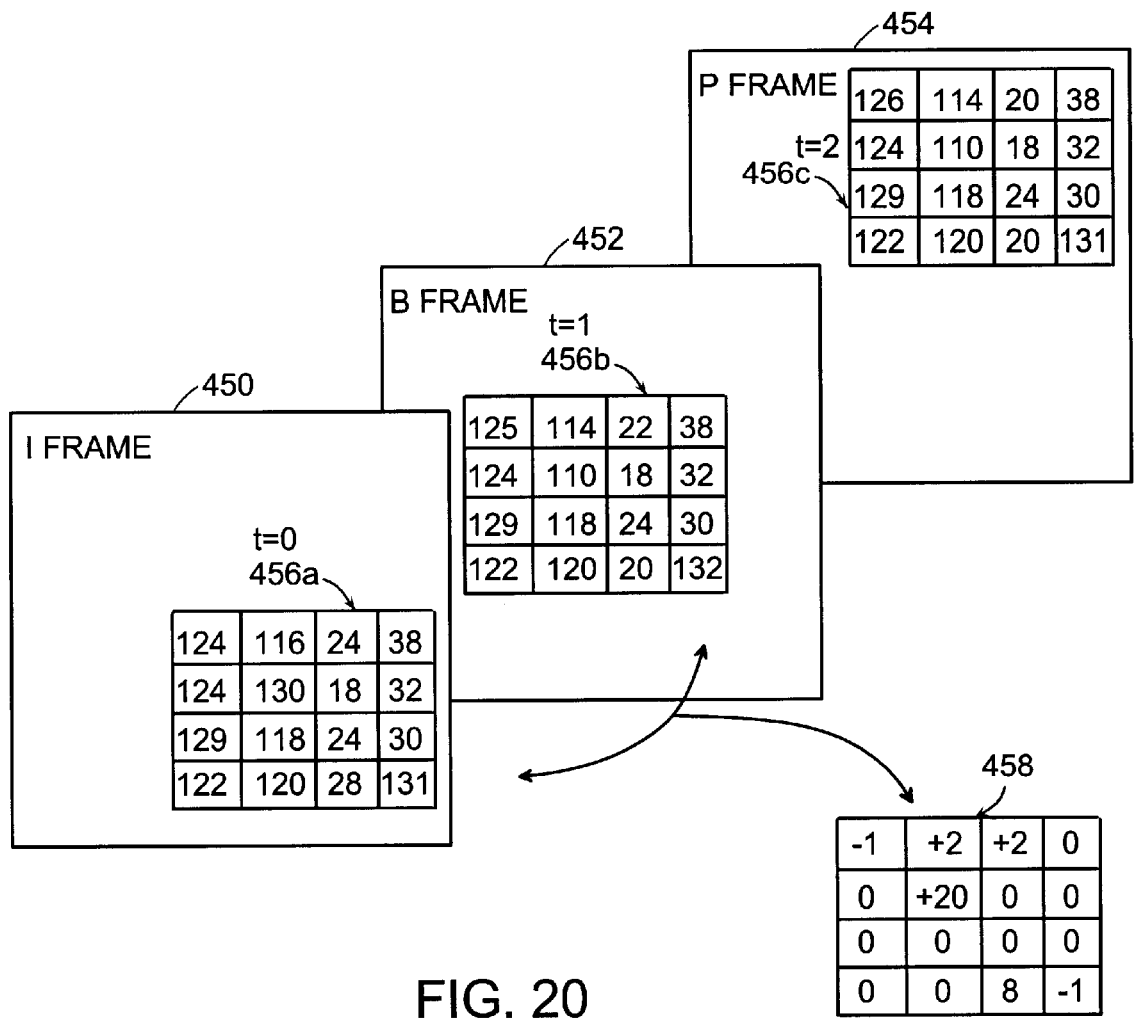
FIG. 20 provides an illustrative example of one step of a differential encoding procedure used in the motion compensation process of FIG. 3.

For example, referring now to FIG. 20, a series of 3 frames is shown, I frame 450, B frame 452 and P frame 454. (Note that, while it is understood that generally there are two B frames between reference frames, only one has been shown here for purposes of ease of explanation).

To differentially code a macroblock, the values of the macroblock are compared against the 'matched' previous or future frame. The matching is accomplished via motion compensation; i.e. the motion vector is used to obtain the values each of the pixels in the corresponding location of the matched macroblock, and the current value of the pixel is subtracted from the pixel value of the matched macroblock. For a bi-directional compensation, the average of the selected forward and backward pixels is determined, and the value of the current pixel is subtracted from the average. An example of the process used to calculate backward error coefficients is shown in FIG. 20, with macroblock 456b matching the previous macroblock 456a, resulting in the differential error macroblock 458.

The differential error macroblock 458 is then transformed into a frequency domain using the DCT techniques described with reference to FIGS. 19A and 19B. The result is then quantized using the assigned MQUANT value provided by the CPU. The quantized coefficient matrix is then used to generate RLE tokens, which are stored in VCDU memory 35 (FIG. 2).

Figure 21:
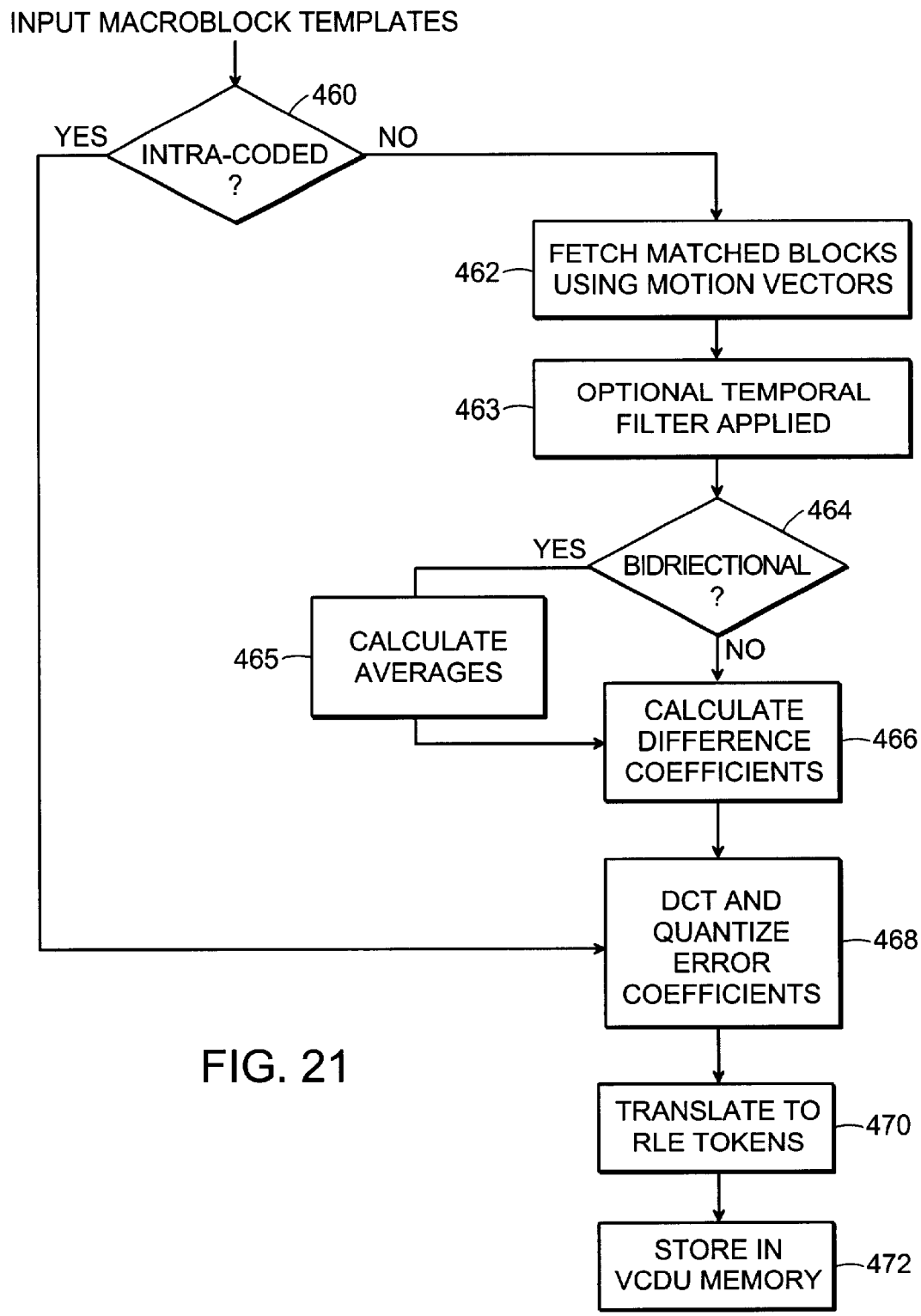
FIG. 21 is a flow diagram illustrating the entire flow of the motion compensation process of FIG. 3.

Referring now to FIG. 21, a flow diagram is provided to illustrate the processes undertaken by the motion compensation/quantization unit 48 of FIG. 3 to perform either spatial and temporal compression.

As described above, when the CPU has completed its policy making decisions of determining the encoding type of each macroblock and the MQUANT for each macroblock, it forwards this tactical data in the form of macroblock templates via a DMA operation over to VCDU memory. When the VCDU has received the macroblock templates, at step 460, the CBP field is evaluated to determine whether the macroblock should be skipped, inter-coded or intra-coded. If, at step 460 it is determined that the macroblock should be skipped, then the codings for the reference frame for this macroblock are fetched and used as the codings for the macroblock. If it is determined that the macroblock is to be intra-coded, the process proceeds to step 468, where the macroblock is transformed, quantized and encoded as described above with regard to FIG. 19B.

If it is determined that the macroblock is to be inter-coded, at step 462 the matched, reference macroblock(s) are fetched from VCDU memory 35 using the motion vectors provided during the ME process.

At step 463 a temporal filter is optionally applied to the reference macroblock(s) to remove noise components that could interfere with the accuracy of the video compression process. A loop filter such as that provided in Equation 10 is applied to the raw pixels comprising the reference macroblock.

$$\bar{P}(x,y,t)=a\bar{P}(x+m\_x,y+m\_y,t-1)+(1-a)p(x,y,t) \quad \text{Equation 10}$$

Where p(x,y,t) indicates the corresponding original or raw pixel data from macroblock 456a (FIG. 20), and P(x+m_x,y+m_y,t) indicates the pixel data from macroblock 456b (FIG. 20), filtered by filter P, a linear filter with the constant 'a' representing the pole of the linear filter, and having a value of less than 1. Also, at time t−1 refers to the consecutively earlier frame and time t refers to the sample time of the current frame.

Whereas the linear filter of Equation 10 has typically been implemented using a pixel-based motion vector calculation, which is very time and computation intensive, the method of the preferred embodiment allows it to be directly implemented using the macroblock-based approximation. This method is much faster because it operates on 16 pixel by 16 pixel blocks, or rather 256 pixels at a time. The macroblock method has the added time savings of not having to calculate the difference between each pixel's value nor having to compare it to a threshold value, as is done in prior art implementations.

The filter described in the above equation is only one embodiment of a filter which can be used with the present invention. The above mentioned filter is provided by way of example and therefore a person of ordinary skill in the art could implement filter equations other than the one shown in the preferred embodiment.

There are a number of other alternative methods available for reducing the number of times that the filter is applied to the current frame. These methods have the advantage of increased performance, yet may result in visual impairment of the frame data. One such method is where filtering is performed only on the to-be-motion-compensated pixels. For the majority of teleconferencing applications, the image is of head and shoulders. Therefore, the typical motion compensated macroblocks to be filtered comprise only approximately 30 to 50 percent of the total blocks. In this embodiment, macroblocks which have not changed position, i.e. where the motion vector is (0,0) are not filtered. Accordingly, this method saves considerable compute operations. This feature is especially useful for software only encoders because of the reduced memory consumption needs.

A second method for reducing the number of applications of the filter, is by filtering only those macroblocks wherein the sum total difference of pixel values of the macroblock of interest and the matching macroblock are greater than a specified threshold value. This method has all of the benefits discussed with respect to the preferred method except that it is slightly more time consuming due to the threshold comparison calculation.

A third method for reducing the number of applications of the filer is by filtering only those macroblocks wherein the cumulative difference of pixel values of the macroblock of interest and the matching macroblock are less than a specified threshold value.

It should be noted that, when using the temporal filtering method, the filtered reference block may be averaged with the current macroblock to provide a new, "pseudo-reference" for use in motion compensation difference calculation. By weighting the reference block with values from the current block, the difference values will be minimized, thereby reducing the number of bits required for encoding the frame.

The above described methods of pseudo-temporal filtering present many advantages over the prior art solutions. First, because motion compensation is performed on the macroblock before the filter is applied, the number of artifacts introduced is greatly reduced as compared with those introduced by the non-linear Ideal Filter method. Also, each pixel comprising a macroblock is filtered, unlike the prior art where pixels are filtered only if they differ from the prior frame's pixels by a set threshold. Further, since there is no need to check pixel differences against a threshold, the method of the preferred embodiment may be included in the motion compensation phase of video compression. Lastly, since motion compensation is performed on a macroblock level rather than a pixel level, no extensive pixel based optical flow computation is needed.

After the optional temporal filtering step, at step 464 it is determined whether the CBP bits indicated that the macroblock was to be encoded using bi-direction prediction methods. If so, at step 465 the average coefficients for each pixel in the macroblock is generated by using adding the forward coefficient to the backward coefficient at the corresponding pixel location, and then dividing the sum by 2.

If at step 464 it was determined that the encoding method was not bidirectional, or after the average has been calculated at step 465, the process then progresses to step 466, where the difference between the reference macroblock and the selected macroblock at each coefficient are calculated for each coefficient of the macroblock.

The progress advances to step 468, where the macroblock is transformed using the DCT method described above with regard to FIG. 19B. In addition, at step 468, the DCT resultant coefficients are quantized. At step 470, the resulting quantized coefficient matrix is translated into a sequence of RLE tokens, which are stored, at step 472 in VCDU memory 35.

V.) Encoding Frames

Referring again to FIG. 3, after the RLE tokens are stored in VCDU memory, they are ready to be encoded into bit stream data. This function is performed by the Encode and buffer controller 50. After the RLE tokens have been stored in VCDU memory, the VCDU indicates to the CPU, via an interrupt, that the tokens are ready for encoding. The RLE tokens are sent, via DMA, over the PCI bus and stored in memory 14. The encode and buffer controller is a software routine which executes on CPU 12 (FIG. 1), fetching the RLE data from memory as required.

The RLE tokens are encoded using a compact code such as that provided using Huffman enclosing techniques. A compact code is one with an average word length that is less than or equal to the average length of all other uniquely decodable codes for the same set of input probabilities; that is, it is a minimum length code. A Huffman code can be constructed by first ordering the input pixel types according to their frequencies. Code words are generated by assigning unique sequences of bits to each token type, where the shortest sequence of bits is assigned to the token type with the highest frequency, and the longest unique sequence of bits is assigned to the token type of lowest frequency. In addition, a short code is never prepended to a large code to allow for matches to be detected as they are input.

An example of a good Huffman code sequence is provided below in Table IV, where Token Type refers to types of tokens in order of decreasing frequency.

TABLE IV

| Token Type | Huffman Code |
| --- | --- |
| 1 | 011 |
| 2 | 00101 |
| 3 | 00011 |
| 4 | 0000101 |

The Huffman encoding technique is the preferred encoding method of this invention, because it provides a minimum number of bits/RLE token ratio, thus allowing for maximum compression. However, it should be understood that other encoding techniques could similarly be used in the present invention, since the present invention does not rely on a particular type of coding technique to achieve its result. For example, other types of encoding techniques that could he used, and that are well known to those of skill in the art include B-codes, where the coder for the information bits is simply an up-counter, and shift codes.

A number of advantages are obtained by providing the encoding process via software. One main advantage is that it allows the CPU to keep track of bit usage in the overall image. Because all of the compressed image must be stored in memory, and because there is typically a fixed memory size on any computer, there is similarly a fixed number of bits available to encode a sequence of video images. If the CPU keeps track of the number of bits that have already been used for the video sequence (i.e. the 'fullness' of the memory), it can use this information to tailor the use of bits in subsequent sequences of video images to ensure that the appropriate frames are allocated a higher number of bits; i.e. frames which have large energy components and hence indicate a large change in the video image. As explained above, the bit stream allocation is controlled via the MQUANT variable value. Thus, the memory fullness information can be fed directly to the scene characterization unit 46, which controls the MQUANT variable for each macroblock.

At this point note that only those frames that were originally stored in the VCDU memory have been encoded. That is, no provisions have been made for those dropped frames. At this point in the compression process, the bit stream must be adjusted to compensate for the dropped frames.

VI.) Insertion of Synthetic Frames Into MPEG Bitstream

Once the frames have been encoded and the actual MPEG bitstream has been generated, the indices of the frames appearing in the final bitstream are examined by the system. When the indices indicate that a frame was dropped, a synthetic frame is inserted into the bitstream to compensate for the dropped frame. In the preferred embodiment, examination of the indices and insertion of the synthetic frame are performed by the CPU.

Figure 22A:
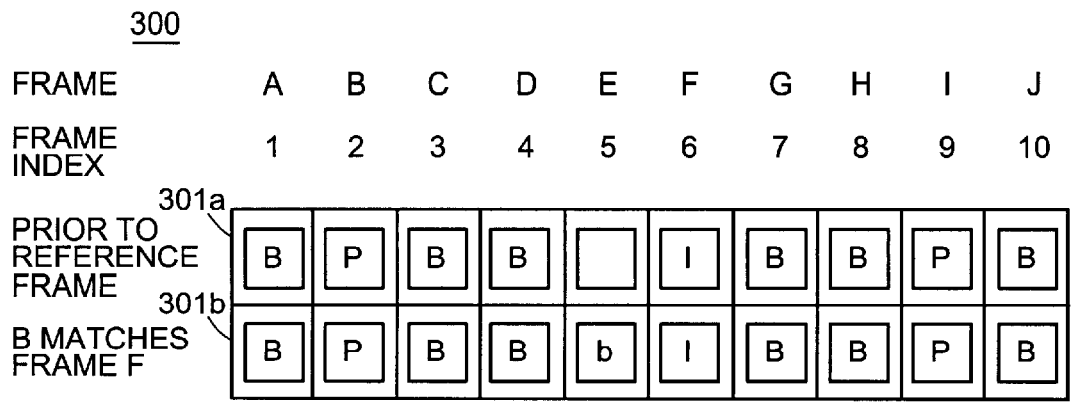
FIGS. 22A–22C provide examples of a "synthetic" B frame being inserted into the Group of Pictures to provide for a dropped frame.
Figure 22B:
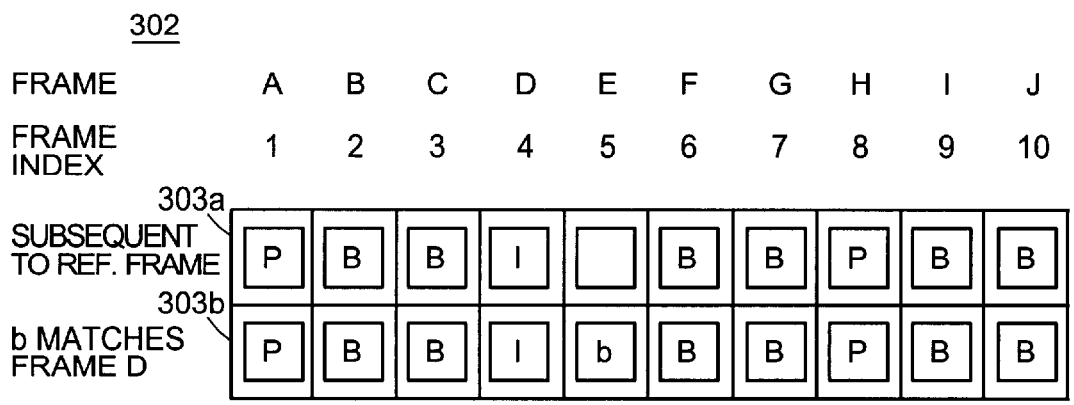
Figure 22C:
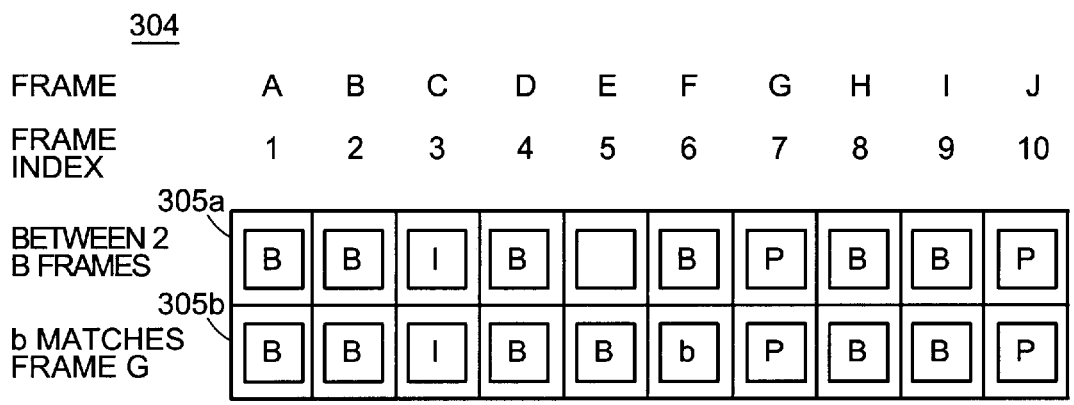

Referring now to FIGS. 22A–22C, insertion of a synthetic B frame is depicted in three different cases; where the dropped frame temporally occurs prior to a reference frame, where the dropped frame temporally occurs subsequent to a reference frame, and where the dropped frame temporally occurs between two B frames. In FIGS. 22A–22C, the inserted synthetic B frame is designated as b. Also included in each of these figures are a frame designator A–J as well as the frame index value assigned to each of the frames by the memory controller 134 (FIG. 4).

Referring now to FIG. 22A, a GOP pattern diagram 300 is shown to include a dropped frame GOP pattern 301*a* which results when a frame is dropped from the input video stream and an inserted frame GOP pattern 301*b* which results when a synthetic frame is inserted into the resulting MPEG bitstream to compensate for the missing frame. Here the dropped GOP pattern 301*a* results where the dropped frame E would have been encoded as an I frame. Because the E frame was dropped, frame F was encoded as an I frame instead.

After the frames have been encoded, it is determined by the system that a frame corresponding to an index 5 is missing from the MPEG bitstream. This may be determined by discovering a discontinuity in the frame indices of the remaining frames. Accordingly, a synthetic frame is inserted into the bitstream resulting in the inserted frame GOP pattern 301*b*. To avoid temporal artifacts, the location in the bitstream at which the synthetic frame is inserted is carefully determined. Reference will be made to FIG. 5A in concert with FIGS. 22*a*–22*c* to demonstrate how the location is determined.

Referring back to FIG. 5A, as described above, each frame in the series of frames 54 includes a frame image element 56. The motion of the frame image element 56 will be utilized to illustrate difficulties encountered in determining the appropriate location for the synthetic frame within the MPEG bitstream.

For illustrative purposes therefore, frame A 55*a* of FIG. 5A corresponds to frame A, frame index 1, of FIG. 22A and is therefore encoded as a B frame. Frame B 55*b* corresponds to frame B, frame index 2, and here is encoded as a P frame. Frame C 55*c* corresponds to frame C, frame index 3, and is encoded as a B frame. Frame D 55*d*, corresponding to frame D, frame index 4, is encoded as an B frame while frame E 55*e* was dropped and therefore not encoded. Frame F 55*f*, corresponding to frame F, frame index 6, is encoded as an I frame. Frames G–J (not depicted in FIG. 5A) corresponding to frame indices 7–10, are also depicted in FIG. 22A and are shown as being encoded as a B, B, P and B frame respectively.

As may be seen in FIG. 5A, frame image element 56 is moving in a negative direction down the y axis. To provide an MPEG video stream without any temporal artifacts therefore, the frame image element 56 should appear to be falling during the video.

As described above, a synthetic B frame is identical to its nearest reference frame.

Therefore, to replace frame E 55*e* which was dropped, the nearest reference frame to where the dropped frame would have been located in the video stream is frame F 55*f* which is an I frame. Here, the synthetic B frame can be placed in the MPEG video stream prior to the reference frame, at the location where frame E 55*e* would have appeared had it not been dropped resulting in the inserted frame GOP pattern 301*b*.

Because the synthetic B frame is identical to frame F 55*f*, the frame image element 56, between frame indices 5 and 6 will appear not to move while the movement of the frame image element between frame indices 4 and 5 will appear faster because the location of the frame image element 56 in frame E 56*e* has been lost. This is acceptable however, because although the speed of the object corresponding to frame image element 56 will temporarily change the direction of the motion will not.

Referring now to FIG. 22B, a GOP pattern diagram 302 is shown to include a dropped frame GOP pattern 303*a* which results when a frame is dropped from the input video stream and an inserted frame GOP pattern 303b which results when a synthetic frame is inserted into the resulting MPEG bitstream to compensate for the missing frame. Here, dropped frame GOP pattern 303a results where the dropped frame, had it not been dropped, would have been encoded as a B frame directly following a reference frame. As a result, frame F is encoded as a B frame rather than frame E. Here, the reference frame closest in proximity to the dropped frame is frame D. The synthetic B frame is inserted into the MPEG bitstream immediately following frame D, which is the location the dropped frame would have occupied had it not been dropped, resulting in the inserted GOP pattern 303b.

Referring back to FIG. 5A, the motion of the frame image element 56 will again be utilized to illustrate determining the appropriate location to insert the synthetic frame within the MPEG bitstream.

Here, frame A 55a of FIG. 5A corresponds to frame A, frame index 1, of FIG. 22B and is encoded as a P frame. Frame B 55b corresponds to frame B, frame index 2 and is encoded as a B frame. Frame C 55c corresponds to frame C, frame index 3 and was encoded as a B frame. Frame D 55d, corresponding to frame D, frame index 4, is encoded as an I frame. Frame E was dropped while frame F 55f, corresponding to frame F, frame index 6, is encoded as a B frame. Frames G–J corresponding to indices 7–10 are encoded as a B, P, B and B frame respectively.

As may be seen in FIG. 5A, frame image element 56 is moving in a negative direction down the y axis. To provide an MPEG video stream without any temporal artifacts therefore, the frame image element 56 should appear to be falling during the video.

As described above, a synthetic B frame is identical to its nearest reference frame. Therefore, to replace frame E 55e which was dropped, the nearest reference frame to where the dropped frame would have been located in the video stream is frame D 55d which is an I frame. Here, the synthetic B frame can be placed in the MPEG video stream after the reference frame, at the location where frame E 55e would have appeared had it not been dropped resulting in the inserted GOP pattern 303b.

Because the synthetic B frame is identical to frame D 55d, the frame image element 56, between frame indices 4 and 5 will appear not to move while the frame image element 56 will appear to drop more quickly between frame indices 5 and 6. As described above, this acceptable however, because the direction of the movement of the frame image element 56 will not change.

Referring now to FIG. 22C, a GOP pattern diagram 304 is shown to include a dropped frame GOP pattern 305a which results when a frame is dropped from the input video stream and an inserted frame GOP pattern 305b which results when a synthetic frame is inserted into the resulting MPEG bitstream to compensate for the missing frame. Dropped frame GOP pattern 305a results when the dropped frame would have been encoded as a B frame immediately following a B frame.

Here, frame F is encoded as a B frame rather than the dropped Frame E. The closest reference frame is either frame C or frame G. When it is determined that the frame corresponding to frame index 5 is missing from the MPEG bitstream, inserted frame GOP pattern 305b results when a synthetic frame is made identical to frame G and inserted directly before it. Because in this case the dropped frame occurs between two B frames the synthetic frame could not be inserted into the MPEG bitstream in the same location the dropped frame would have occurred as this would result in "motion stutter". Motion stutter occurs when an object momentarily appears to be moving backward.

To describe the concept of motion stutter, the frame index values for the frames will be used. If the dropped frame is made identical to frame G, frame index 7, the frame index pattern corresponding to the resulting GOP pattern would be 123476789. Accordingly, the frame image element 56 would appear to move backward during the 4767 portion of the pattern. To avoid this motion stutter, the synthetic frame is inserted prior to frame G resulting in the frame index pattern 123467789.

Motion stutter will be described more fully by referring back to FIG. 5A. Again, the motion of the frame image element 56 will be utilized to illustrate determining the appropriate location for the synthetic frame within the MPEG bitstream.

Here, frame A 55a of FIG. 5A, is encoded as a B frame corresponding to frame A, frame index 1 of FIG. 22C. Frame B 55b corresponds to frame B, frame index 2 and is encoded as a B frame. Frame C 55c corresponds to frame C, frame index 3 and is encoded as an I frame. Frame D 55d is encoded as a B frame while frame E 55e was dropped and therefore has not been encoded. Frames F 55f, is encoded as a B frame while frames G–J, indices 7–10, are encoded as a P, B, B and P frame respectively.

As may be seen in FIG. 5A, frame image element 56 is moving in a negative direction down the y axis. To provide an MPEG video stream without any temporal artifacts therefore, the frame image element 56 should appear to be falling during the video.

As described above, a synthetic B frame is identical to its nearest reference frame. Therefore, to replace frame E 55e which was dropped, the nearest reference frame to where the dropped frame would have been located in the video stream is frame G, frame index 7, which is a P frame.

Here, unlike the prior examples, the synthetic B frame cannot be placed in the MPEG video stream at the location where frame E 55e would have appeared had it not been dropped as this would cause "motion stutter". Since the synthetic B frame is identical to frame G, it would appear to a viewer that frame image element 56 dropped quickly, from the y-axis value of y3 to the y-axis value of y6, momentarily bounced up again to a y-axis value of y5, and then back down again to a y-axis value of y7 if the frame image element 56 is inserted between the frame D 55d and frame F 55f. Accordingly, the synthetic frame is placed adjacent to the reference frame it copies, resulting in the inserted GOP pattern 305b. In this way, no "motion stutter" appears to a viewer.

In each of the above examples, insertion of the B frame resulted in a GOP pattern which includes three successive B frames. There may be a situation in which it is undesirable to increase the number of B frames occurring in succession within the GOP. In cases such as this, the synthetic frame can be coded as a P frame and placed directly after the frame it references.

Referring now to FIGS. 23A–23C, insertion of a synthetic P frame is depicted in three different cases; where the dropped frame temporally occurs prior to a reference frame, where the dropped frame temporally occurs subsequent to a reference frame, and where the dropped frame temporally occurs between two B frames. In FIGS. 23A–23C, the inserted synthetic P frame is designated as p.

Referring now to FIG. 23A, a GOP pattern diagram 310 is shown to include a dropped frame GOP pattern 311a which results when a frame is dropped from the input video stream and an inserted frame GOP pattern 311b which results when a synthetic frame is inserted into the resulting MPEG bitstream to compensate for the missing frame. Here, the dropped frame GOP pattern 311a results where the dropped frame E would have been encoded as an I frame. Because the E frame was dropped, frame F was encoded as an I frame instead.

After the frames have been encoded, it is determined by the system that a frame corresponding to a frame index 5 is missing from the MPEG bitstream. Accordingly, a synthetic frame is inserted into the bitstream resulting in the inserted frame GOP pattern 311b. The location in the bitstream at which the synthetic frame is inserted is determined carefully.

Referring back to FIG. 5A, as described above, each frame in the series of frames 54 includes a frame image element 56. The motion of the frame image element 56 will be utilized to illustrate difficulties encountered in determining the appropriate location for the synthetic frame within the MPEG bitstream.

For illustrative purposes therefore, frame A 55a of FIG. 5A corresponds to frame A, frame index 1, of FIG. 23A and is therefore encoded as a B frame. Frame B 55b corresponds to frame B, frame index 2, and here is encoded as a P frame. Frame C 55c corresponds to frame C, frame index 3, and is encoded as a B frame. Frame D 55d, corresponding to frame D, frame index 4, is encoded as an B frame while frame E 55e was dropped and therefore not encoded. Frame F 55f, corresponding to frame F, frame index 6, was encoded as an I frame. Frames G–J (not depicted in FIG. 5A), frame indices 7–10, are also depicted in FIG. 22A and are shown as being encoded as B, B, P and B respectively.

As may be seen in FIG. 5A, frame image element 56 is moving in a negative direction down the y axis. To provide an MPEG video stream without any temporal artifacts therefore, the frame image element 56 should appear to be falling during the video.

As described above, a synthetic P frame is identical to the reference frame which precedes it and is placed in the bitstream immediately following the reference frame. Therefore, to replace frame E 55e which was dropped, the nearest reference frame to where the dropped frame would have been located in the video stream is frame F 55f which is an I frame. Here, the synthetic P frame can be placed in the MPEG video stream immediately after the reference frame resulting in the dropped frame GOP pattern 311b. Here the synthetic P frame cannot be inserted at the location where frame E 55e would have appeared had it not been dropped because as a predictively coded frame it has a single reference frame which would occur prior to it in the bitstream.

Because the synthetic P frame is identical to frame F 55f, the frame image element 56, between frame indices 5 and 6 will appear not to move while the movement of the frame image element between frame indices 4 and 5 will appear faster because the location of the frame image element in frame E 55e has been lost. This is acceptable however, because although the speed of the object corresponding to frame image element 56 will temporarily change, the direction of the motion of the object will not.

Referring now to FIG. 23B, a GOP pattern diagram 312 is shown to include a dropped frame GOP pattern 313a which results when a frame is dropped and an inserted frame GOP pattern 313b which results when a synthetic frame is inserted into the MPEG bitstream to compensate for the missing frame. Here, dropped frame GOP pattern 313a results where the dropped frame, had it not been dropped, would have been encoded as a B frame directly following a reference frame. As a result, frame F is encoded as a B frame rather than frame E. Here, the reference frame closest in proximity to the dropped frame is frame D. The synthetic P frame is inserted into the MPEG bitstream immediately following frame D, which here, is the location the dropped frame would have occupied had it not been dropped, resulting in the inserted GOP pattern 313b.

Referring back to FIG. 5A, the motion of the frame image element 56 will again be utilized to illustrate determining the appropriate location to insert the synthetic frame within the MPEG bitstream.

Here, frame A 55a of FIG. 5A corresponds to frame A, frame index 1, of FIG. 23B and is encoded as a P frame. Frame B 55b corresponds to frame B, frame index 2 and is encoded as a B frame. Frame C 55c corresponds to frame C, frame index 3 and was encoded as a B frame. Frame D 55d, corresponding to frame D, frame index 4, is encoded as an I frame. Frame E was dropped while frame F 55f, corresponding to Frame F, frame index 6, is encoded as a B frame. Frames G–J corresponding to indices 7–10 are encoded as a B, P, B and B frame respectively.

As may be seen in FIG. 5A, frame image element 56 is moving in a negative direction down the y axis. To provide an MPEG video stream without any temporal artifacts therefore, the frame image element 56 should appear to be falling during the video.

To replace frame E 55e with a synthetic P frame, the nearest reference frame to where the dropped frame would have been located in the video stream is frame D 55d which is an I frame. Here, the synthetic P frame is placed in the MPEG video stream immediately after the reference frame, at the location where frame E 55e would have appeared had it not been dropped, resulting in the inserted GOP pattern 313b.

Because the synthetic P frame is identical to frame D 55d, the frame image element 56, between frame indices 4 and 5 will appear not to move while the frame image element 56 will appear to drop more quickly between frame indices 5 and 6. As described above, this is acceptable however, because the direction of the movement of the frame image element 56 will not change.

Referring now to FIG. 23C, a GOP pattern diagram 314 is shown to include a dropped frame GOP pattern 315a which results when a frame is dropped and an inserted frame GOP pattern 315b which results when a synthetic frame is inserted into the MPEG bitstream to compensate for the missing frame. Dropped frame GOP pattern 315a results when the dropped frame would have been encoded as a B frame immediately following a B frame. Frame F is encoded as a B frame rather than the dropped Frame E.

When it is determined that the frame corresponding to frame index 5 is missing from the MPEG bitstream, a synthetic P frame is inserted to compensate for the missing frame. Here, the closest reference frame is either frame C or frame G. Inserted frame GOP pattern 315b results when a synthetic frame is made identical to frame G and inserted directly after it in the bitstream. Here, because the dropped frame occurs between two B frames, the synthetic frame can not be inserted into the MPEG bitstream in the same location the dropped frame would have occurred as this would result in "motion stutter". Motion stutter occurs when an object momentarily appears to be moving backward.

To describe the concept of motion stutter, the frame index values for the frames will be used. If the dropped frame is made identical to frame C, frame index 3, and the synthetic frame is placed after the reference frame in the location the frame would have appeared had it not been dropped, the frame index pattern corresponding to the resulting GOP pattern would be 123436789. Accordingly, th frame image element 56 would appear to move backward during the 3436 portion of the pattern. To avoid this motion stutter, the synthetic frame is inserted subsequent to frame G resulting in the frame index pattern 123467789.

Motion stutter will be described more fully by referring back to FIG. 5A. The motion of the frame image element 56 will again be utilized to illustrate determining the appropriate location to insert the synthetic frame within the MPEG bitstream.

Here, frame A 55a of FIG. 5A, is encoded as a B frame corresponding to frame A, frame index 1 of FIG. 23C. Frame B 55b corresponds to frame B, frame index 2 and is encoded as a B frame. Frame C 55c corresponds to frame C, frame index 3 and is encoded as an I frame. Frame D 55d is encoded as a B frame while frame E 55e was dropped and therefore has not been encoded. Frame F 55f, is encoded as a B frame while frames G–J corresponding to indices 7–10, are encoded as a P, B, B and P frame respectively.

As may be seen in FIG. 5A, frame image element 56 is moving in a negative direction down the 7y axis. To provide an MPEG video stream without any temporal artifacts therefore, the frame image element 56 should appear to be falling during the video.

To replace frame E 55e which was dropped, the nearest reference frame to where the dropped frame would have been located in the video stream is either frame C 55c or G, frame index 7. Unlike the prior examples however, the synthetic P frame cannot be placed in the MPEG video stream at the location where frame E 55e would have appeared had it not been dropped, as this would cause "motion stutter". Motion stutter appears where an object appears, for a moment, to be traveling backward or more specifically for this example, to be traveling upward.

If the synthetic P frame was inserted into the MPEG video stream in the location where the dropped frame should have appeared, between frame D 55d and frame F 55f, and it was made identical to frame C, the y-location of frame image element 56 would travel from a location of y4 for frame D 55d, up to y3 for the synthetic P frame and back down to y6 for frame F 55f. Between frame D 55d and the synthetic frame therefore, it would appear that frame image element 56 was temporarily moving upward. Accordingly, the synthetic P frame is placed immediately after the reference frame it copies. Here, the synthetic P frame is made identical to frame G and is inserted immediately after frame G, resulting in the inserted GOP pattern 315b, thus preserving the temporal order of the frames. Conversely, the synthetic P frame can also be made identical to frame C and placed directly after frame C in the MPEG video stream. In either case, the dropped frame would be compensated for and no "motion stutter" would appear to a viewer, thus making it possible to synchronize the decompressed video with the corresponding audio.

As described above, there is often a fixed number of bits available to encode a sequence of video images. Because the synthetic frames, whether a B or a P frame, are extremely small in terms of a number of bits, a greater number of bits are available to encode nearby frames in a video sequence. Accordingly, these nearby frames may be encoded with greater quality.

An alternative embodiment for insertion of synthetic frames in place of dropped frames includes examining the indices of the frames within the MPEG bitstream and copying the frame which immediately preceded the dropped frame. In a co-processor architecture, the examination and insertion would be performed by the CPU. This embodiment would be especially effective in the case where the MPEG stream was composed only of I frames.

VII. Reconstruction of Frames

One object of the video compression art is to minimize the amount of storage required for the video image. Thus, the only time during which the entire, compressed video image is stored in the memory 14 is following the encoding process.

However, in performing the backward and bidirectional matching techniques during motion estimation, the reconstructed pixel data must be available to determine the best match in phase II of ME. The backward matching may look back 3 or 4 frames in time to locate the matched macroblock.

Referring again to FIG. 3, it can be seen that the present invention uses the results of the inverse quantization step of the DCT unit 52 to provide a reconstructed reference frame for the purposes of motion estimation. Note that the time required to perform the inverse DCT is matched to that required to perform the DCT described in FIG. 21. The results of the IDCT are multiplied by MQUANT and the Quantization matrix 434 (FIG. 19A). The results are used for the purposes of constructing motion vectors by the motion estimation unit 44. The entire reconstruction of the frames is implemented in hardware in the VCDU.

Therefore it can be seen that partitioning compression/decompression between hardware and software has many advantages. Because the algorithms used to generate encoding decisions are executed in software by the CPU, refining, improving or modifying these algorithms may be easily performed without changing hardware. In addition, because the encoding of the tokens is performed in software, the CPU has the ability of tracking the overall bit usage and tailoring encoding and quantization decisions based on the fullness of the memory.

In addition, because the main data manipulation phase of the compression process is handled in hardware in the VCDU, all high bandwidth data, with the exception of the final output image, is kept local to the video compassion unit 24. This arrangement minimizes bus traffic on the PCI bus, and therefore does not impede the overall performance of the computer system.

Finally, allowing the CPU to perform the above tasks allows the VCDU hardware to be a highly parallel, pipelined set of datapaths which are highly utilized and can be implemented on a single chip.

VIII. Pipeline

Thus, it can be seen from the description above that the present invention uses a two-pass approach when encoding frames. The entire frame is motion estimated prior to actually encoding it. The advantage of this method is that each macroblock encoding directive can be generated in view of the requirements of the overall picture. The result is high-quality compression which distributes encoded bits across a frame in proportion to the complexity of the local areas.

To implement this approach, frame processing is pipelined into a motion estimation stage (ME) and a motion compensation stage (MC). Accordingly two frames of data are actually processed simultaneously across these two stages. The MC stage will always process the frame that was completed in the previous ME stage.

One problem that is encountered when processing MPEG frames arises because bi-directionally encoded frames (B-frames) can only be encoded after the corresponding past and future reference frames have been processed. However, P and I frames can be encoded as soon as the frame is received. Providing real-time two-pass compression, therefore was a daunting task requiring either expensive, accelerated hardware or performance reducing decelerated cycle time, neither of which was a desirable alternative.

The method according to the present invention overcomes this problem by allowing B-frame calculations to be interspersed among reference P-frame or I-frame calculations during the earliest available slot in the pipeline. Such a method ensures that reference frames are always compressed as they are received, while bi-directional frames may be buffered and processed as soon as both the data and a slot in the pipeline become available.

Note that for purposes of explaining the timing diagram, logical function blocks will be designated using those reference numbers provided in the block diagram of FIG. 3.

Figure 24:
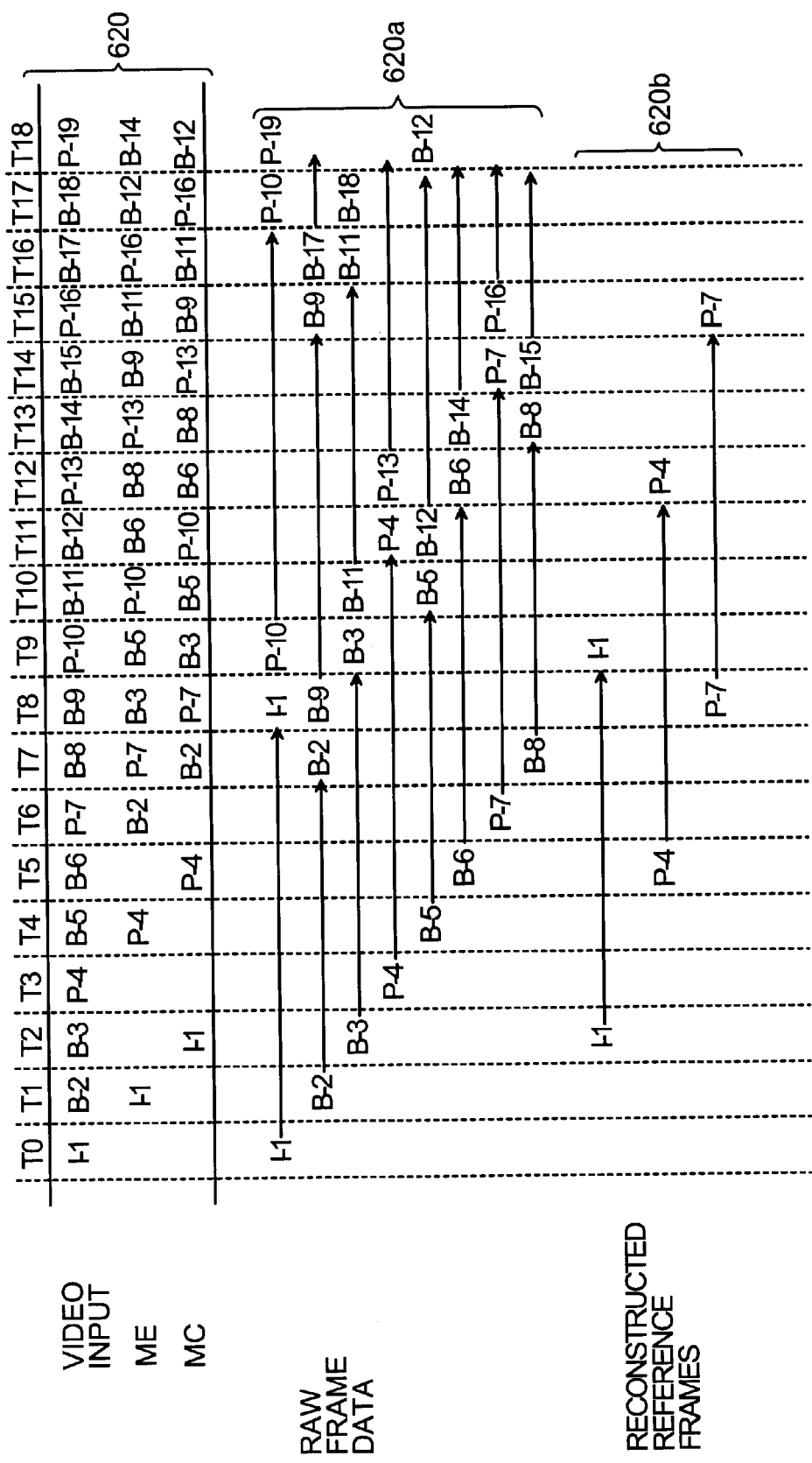
FIG. 24 is a timing diagram illustrating the pipelining of the motion estimation and motion compensation process of the present invention.

Referring now to FIG. 24, the advantages of the present invention can be seen by analyzing the utilization the ME and MC stages using a pipeline diagram. It can be seen that, after startup, each stage of the ME/MC pipe is in use at every cycle of time period Tn. Because no cycles are wasted, incoming frames can be processed using a two-pass method in real time.

At time T0, frame I-1 is input and stored in VCDU memory. At time T1, frame B2 is input and stored in VCDU memory. Also, the I-1 frame is fed to the ME unit 44 of the compression process for generating motion vectors and energy characteristics for each macroblock. At time T2, frame B-3 is input and stored temporarily in VCDU memory. Also, frame I-1 is fed to the MC unit 48, where each macroblock is intra-coded, DCT'd, quantized, and translated into RLE tokens. Frame B-2 can not be forwarded to the ME unit at Time T2, because it requires data from frame P4. Accordingly, frame B-2 remains stored temporarily in VCDU memory 35 (FIG. 2).

At time T3, frame P-4 is input and stored temporarily in VCDU memory. Neither B-2 or B-3 may be processed until P-4 is processed, so they remain stored in memory. At time T4, frame B-5 is input and temporarily stored in memory, while frame P-4 is fed to the ME unit 44. At time T5, the P-4 frame is input to the MC unit 48, and the B-6 frame is input and stored.

At time T6, the P-4 compression data is available, so both frames B-2 and B-3 can be processed where there is an available cycle. Therefore, at time T6, frame B-2 is fed to ME unit 44, while the P-7 frame is input and stored.

At time T7, frame P-7 frame is fed to the ME unit 44. During T7, frame B-2 is fed to the MC unit, while frame B-8 is input and stored. At time T8, frame B-3 is forwarded to the ME unit for processing, while frame P-7 is processed by the MC unit and frame B-9 is input.

The pipeline continues to input frames, processing the reference frames (I and P) as soon as they are received, and the B frames in order when there is an available cycle. In steady state operation, the pipeline remains full and performs both ME and MC operation during each interval.

The above pipelining of operations can be achieved provided sufficient frame buffering exists to capture frames and store them until they are used. As shown in FIG. 24, the pipeline illustrates an M=3 frame construction; i.e. a reference frame placed every 3 frames. Because the ME phase I operation requires raw data, the ME phase 2 and MC operations require reconstructed data, and because B frames may not be processed until the future reference frame is processed, various reference frames reconstructed frames, and raw B frames must be buffered until needed.

As shown in FIG. 24, the raw I-1 frame is needed for processing the first stage of the motion estimation process for both frames B-2 and B-3, and thus it must be stored until time T-8. Similarly, frame B-2 cannot begin processing unit frame P-4 has completed processing, and therefore must be stored until time T-6.

Timing diagram 620a illustrates shows that eight raw input frames should be buffered in order to keep up with real time execution to provide the required first pass motion estimation data for the reference and bidirectional frames. Five of these frames are B frame data, while 3 of the frames are reference frames.

Timing diagram 620b is used to illustrate which frames require storage after they have been encoded and reconstructed. Note that these frames are required for phase II of the ME process and for the motion compensation process, and consist of reference frames only. Thus the II frame reconstructed data is required for computing the motion compensation stage of the B-3 frame at time T9 and accordingly, must be stored until time T9. Thus, at time T8 a total of three reconstructed reference frames will be required to be stored in order to allow the VCDU to operate in real time.

The present invention is capable of processing the data (either ME or MC), faster than the 33 msec frame interval dictated by MPEG. However, because the specific implementation of the pipeline design involves transactions with the CPU via the PCI bus interface, a small uncertainty is introduced into when the ME and MC operations can occur relative to the real-time frame input rate. Thus, although only 8 frames (5 B frames and 3 reference frames) are required for buffering, to allow for pipeline smoothing, a circular FIFO of six raw B frames and a circular FIFO of four raw reference frames is provided in the VCDU memory 35. In addition, a FIFO of 3 reconstructed frames is stored in VCDU memory 35. These FIFO structures enable input frames to be captured in real-time even if the ME and MC units fall behind temporarily due to CPU interface delays.

It should be noted that the different analog video standards each have different transmission rates that will effect the ability of the pipeline to accommodate real-time input. In addition, it should also be noted that it may be desirable to increase the number of B frames between reference frames to provide increased compression of the video image. As a result, there may be a need for increased buffering of frames.

For example, the above construction of 10 buffered reference/B frames, and 3 buffered reconstructed frames is able to accommodate M=3 series frames in the NTSC SIF Standard. According to the NTSC SIF standard, 352 pixels by 240 lines are input non-interlaced at a rate of 29.97 frames/second. To store these frames to accommodate real time compression, two megabytes of the local DRAM are required. Coincidentally, the VCDU of the present invention is comprises 2 MBytes of memory.

However, as noted previously, the PAL SIF frames are input at a rate of 352 pixels by 288 scan lines at 25 frames per second. To provide real-time compression of these frames, just over two megabytes of local memory is required.

Because memory is typically sold in log 2 increments, to require slightly more than 2 megabytes of memory requires 4 megabytes of memory to be purchased. As a result, because memory is expensive, the above described system would have to be expanded to include 4 megabytes of memory on the VCDU board to support the PAL standard. Therefore, in order to accommodate both European standards and increase compression, one embodiment of the invention uses system memory to provide 'overflow' storage space to allow input frames of any standard to be compressed in real-time without increasing the expense of the VCDU board and by using existing data paths.

One feature that is typically offered by a video system is the ability to allow the CPU to monitor the frames as they are input as an analog video signal. In order to do so, as the frames are input a sampling of the frames are forwarding over the I/O interface from the VCDU board to the CPU for monitoring.

The present invention uses this existing data path to store input frames in a system memory of the CPU. Data is retrieved from system memory as it is required rather than storing input frames temporarily in the VCDU memory until they are needed. As a result, by utilizing the existing system memory, the present invention enables high performance, maximum compression of a variety of transmission standards while minimizing the cost of the VCDU hardware.

It should be noted that data is transferred using conventional transfer techniques dictated by the protocol of the bus to which the VCDU is connected. For example since here the bus is operated according to the Peripheral Component Interconnect (PCI®) protocol, one of skill in the art would readily be able to construct an interface according to the dictates of the standard. However, the performance of the transactions may be improved through the use of several techniques described in application Ser. No. 08/668,200 entitled "An Optimized Mechanism for High Bandwidth DMA in a PCI Environment" and incorporated herein by reference, which issued as U.S. Pat. No. 5,884,050 on Mar. 16, 1999.

As shown described in conjunction with FIG. 24, a VCDU size of two megabytes can accommodate ten raw SIF frames and three reconstructed SIF frames for the NTSC standard. However, to provide support for the PAL SIF standard of 352 pixels 288 lines in real time, only eight raw PAL SIF frames and three reconstructed frames are capable of being stored in two megabytes of memory. This leaves no leeway for extraneous events that may cause the VCDU system to lag behind the real time input. Accordingly, a method must be provided that allows the VCDU to maintain real time operation without an increase in the size of memory.

Figure 25:
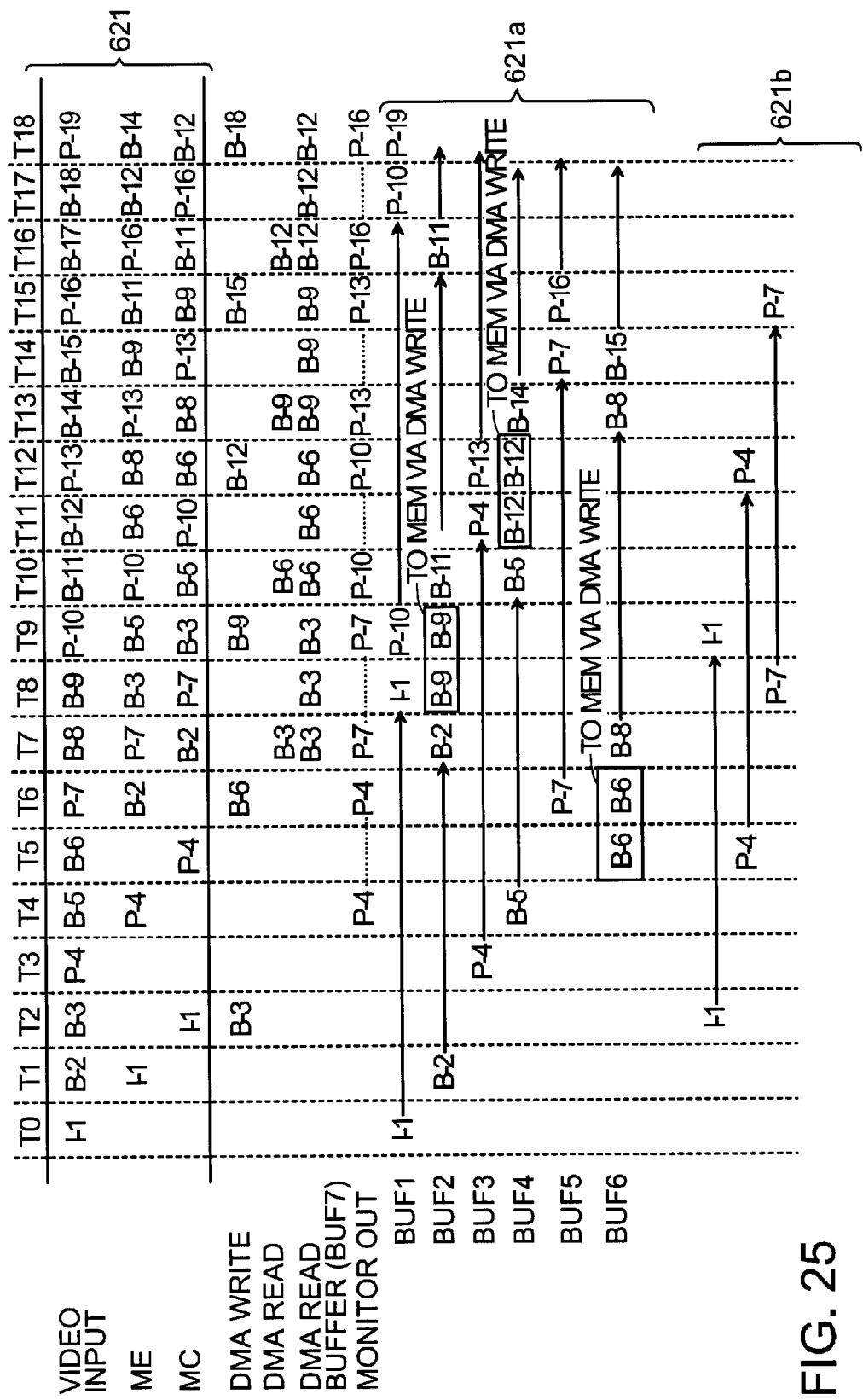
FIG. 25 is a series of timing diagrams illustrating the buffering of frames input to the VCDU and passed to and from system memory for buffering to support the PAL SIF standard.

Referring now to FIG. 25, a series of timing diagrams 621, 621a and 621b are shown to describe how the number of frame buffers may be increased to accommodate PAL SIF input.

In this embodiment VCDU memory comprises 7 buffers for storing 7 frames of data. One of the buffers is designated as a DMA read buffer here shown as Buf 7. During operation, as frames are input to the VCDU, some of the B frames are forwarded directly to system memory using direct memory access over the I/O bus. In addition, reference frames are also forwarded to the system memory for monitoring purposes. Since two frame DMAs occur every three frames in steady state, the frame monitoring channel should operate at a reduced display rate to avoid running out of reference frames.

In this embodiment of the invention, the forwarding of the B frames over the I/O to system memory has a higher priority than the forwarding of the reference frames for the monitoring operation. Accordingly, it can be seen in timing diagram 621, that the P frame P-4 is sent out for monitoring purposes in the first available cycle of either T4, T5, or T6.

As mentioned above, there are seven frames of raw data stored in the VCDU, one of which is stored in a DMA read buffer. The DMA read buffer, Buf 7, is used for storing data that is read from system memory following a DMA read operation. The other raw frame buffer contents include data that was received as a direct input to the VCDU, and not forwarded from memory.

Referring to timing diagram 621a the timing of the transfer of frames to system memory is shown. At time T0 the I-1 frame is buffered. It remains buffered until time T8, as described previously so that it may be used for the processing of other frames, in particular B frames, that require the reference data. Similarly, B-2, P-4, B-5, and P-7, along with B-8 are stored until they may be used or processed. However, at time T2 the B-3 frame is input, yet it may not be processed because the future reference frame P-4 has not been input. Accordingly, at some time between time T2 and T3, when the next available DMA slot is available for transfer on the I/O bus, the B-3 frame is forwarded over to system memory.

In the cycle prior to when the B-3 frame may enter the first stage of ME processing (T8), a DMA read is performed and the B-3 frame is retrieved from system memory and stored in the DMA read buffer. Frame B-3 remains in Buf 7 until the completion of MC operation at time T9. When that processing is complete, at time T10 the B-6 data is retrieved from memory and stored in Buf 7.

Timing diagram 621b again illustrates the contents and timing requirements for the reconstructed frame buffers as described in FIG. 24.

Accordingly, by using existing system memory resources and data paths, the VCDU may easily be modified to support real-time compression of PAL SIF input frames.

As mentioned above, in addition, the use of system memory resources may be further extended to support maximum compression; i.e. when there are greater than two B frames that are stored between each reference frame. As described previously, the raw B frame data is typically large, and thus increasing the B frame stream directly impacts the storage requirements and accordingly the expense of the compression system.

Figure 26:
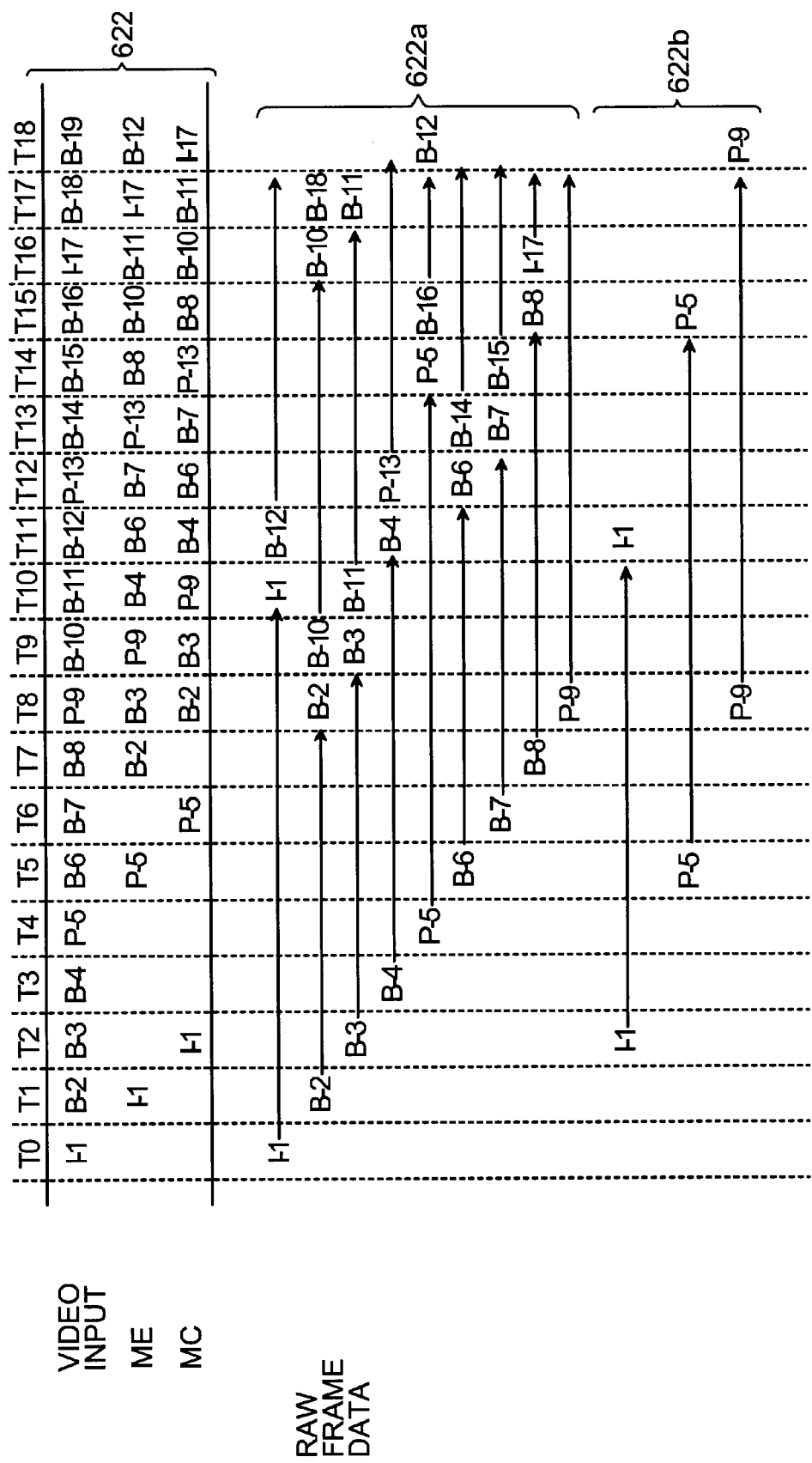
FIG. 26 is a series of timing diagrams illustrating the buffering of input frames for supporting IBBBP compression according to the NTSC SIF video standard.
Figure 27:
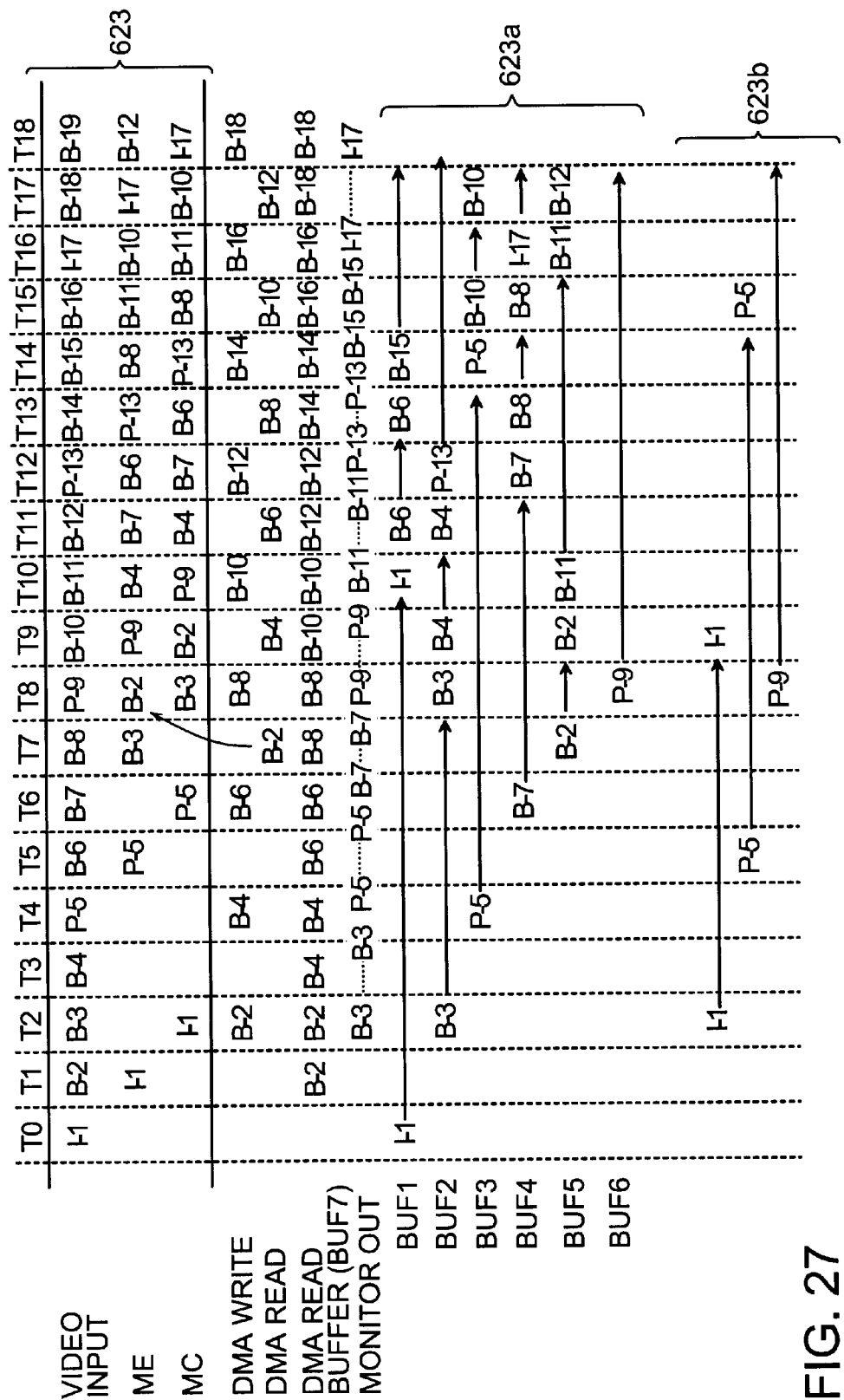
FIG. 27 is a series of timing diagrams illustrating the buffering of frames input to the VCDU and passed to and from system memory for buffering to support IBBBP compression according to the PAL SIF standard.

Referring now to FIGS. 26 and 27, a set of timing diagrams are provided to illustrate other embodiments of the invention that are capable of accommodating a large number of B frames interspersed between reference frames for supporting either the NTSC SIF or PAL SIF standard.

The embodiment described with reference to FIG. 26 supports the NTSC SIF standard for M=4 compression. Note that in this embodiment, the I-1 frame must be buffered until time T10 so that it may be used as a reference for the B-4 frame. In total, 3 raw reference frames and 6 raw B frames must be buffered to accommodated this compression level. As before, three reconstructed reference must also be buffered to provide the necessary data for second phase ME and MC processing.

As mentioned previously, there are room for ten raw frames and three reconstructed frames of NTSC SIF format data. Thus, since only nine frames need to be buffered to provide the support for the stream sequence of IBBBP, the above described video compression decompression unit is capable of providing the support without having to buffer a B frame externally in system memory.

However, in order to support PAL SIF the system memory resources must be utilized. Referring now to FIG. 27, an embodiment capable of supporting M=4 compression of PAL SIF frames is shown with reference to a series of timing diagrams 623, 623a and 623b. To compress PAL SIF frames at a compression level of M=4, seven buffers of raw frame data must be maintained in VCDU memory, while the other two pending frames are stored in system memory. As shown in timing diagram 623a, the first buffer initially stores the I-4 frame data. As described previously, this I-1 frame data must be maintained until time T10, where it is used during the first phase of ME processing for frame B-4.

As the B-2 data is input at time T1, it is stored in DMA write buffer, Buf 7. Note that the Buf 7 is used in the present embodiment as a temporary write buffer for sending data to memory, in contrast to a temporary read buffer in the embodiment described in conjunction with FIG. 25, though either alternative could be used in either embodiment subject to proper control logic implementation.

The B-2 data in timing diagram 623a is shown to be written to system memory somewhere between cycle T1 and cycle T2. This dashed line spanning the two cycles indicates the B2 reference frame will be sent over for storage in system memory in either cycle T1 or T2, or when the I/O bus becomes available for the transfer.

At time period T7, it is determined that the B-2 reference data will be needed at time T8 and thus the B-2 reference frame is read out of system memory, transferred over the I/O bus via DMA and stored in one of the raw frame buffers, here shown as stored in Buf 5. The B-2 data will remain held in this buffer for the period of T8 and T9, where it is used for ME and MC processing respectively. Similarly, as the B-4 frame was input at time T3, it was shipped off, as soon as possible, to system memory via DMA over the I/O bus. Later, when the B-4 frame may be processed, it is retrieved from system memory at time T9 via a DMA read operation and stored in available frame buffer slot.

Since only 7 raw frame buffers are required to implement this embodiment, there is one extra frame buffer space remaining for smoothing out operation if the video compression decompression unit should fall behind real video input rate. Accordingly, such an arrangement allows for real time processing of data in any format of any number of reference frames to be provided.

It can be envisioned that many other alternatives are available for implementing the basic inventive concept of storing, temporarily in an external memory; i.e. a memory external to the device, certain ones of the frames that will later be used by the reference by the compression unit and then thereafter retrieving the frames as required. Such an arrangement provides a distinct advantage because it minimizes the amount of memory that is required to be provided with the video compression and decompression unit and therefore it reduces the cost of the compression unit.

IX. Hardware Embodiment of the VCDU

Figure 28:
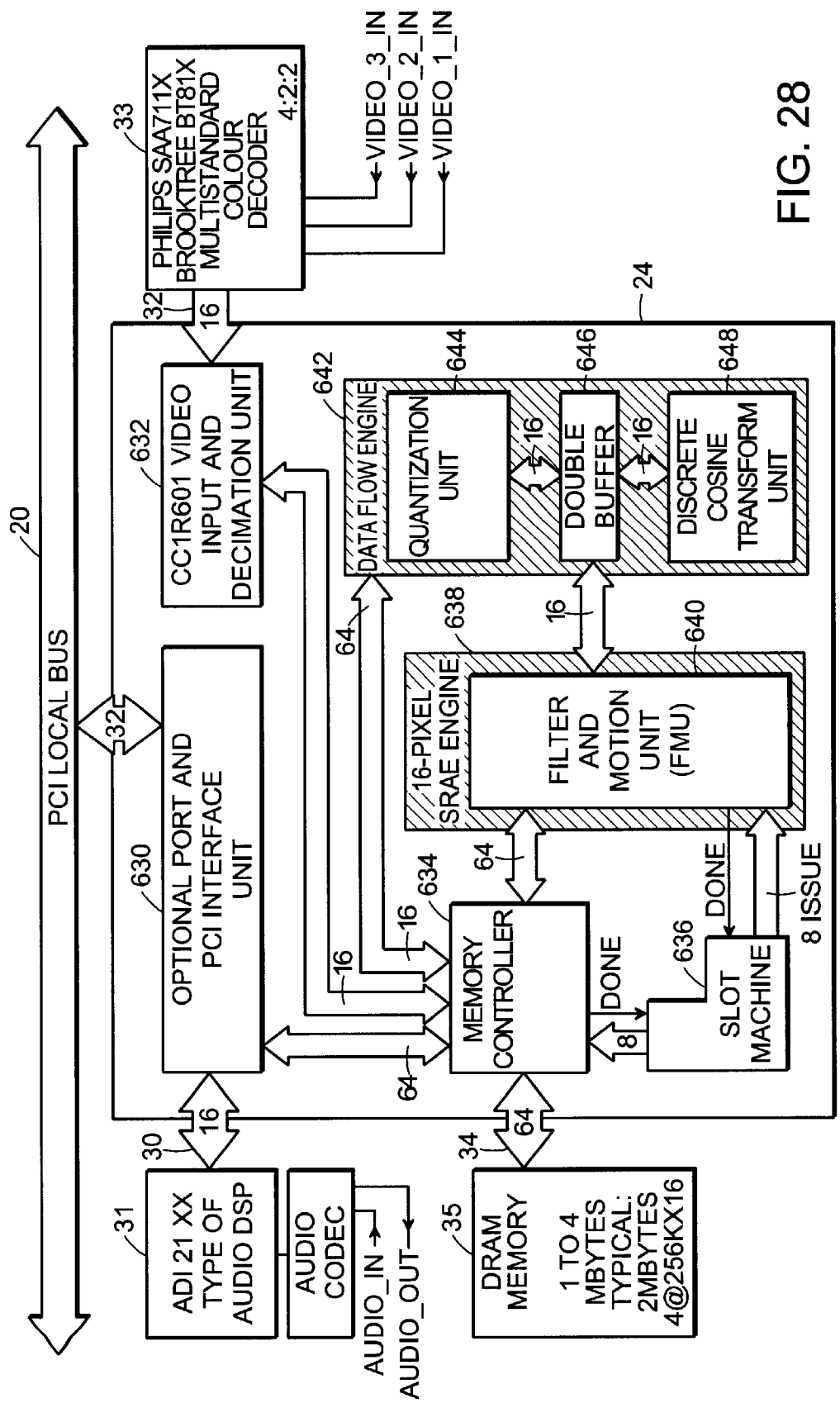
FIG. 28 is a block diagram illustrating the components of one embodiment of the Video Compression Decompression Unit of FIG. 2.

Referring now to FIG. 28, a block diagram of one embodiment of the VCDU 24 is shown. As mentioned with regard to FIG. 2, the VCDU 24 has three input ports; video port 32 which is a 16 bit port coupling a multi-standard color decoder 33 to the VCDU; memory port 34 which is a 64 bit port for coupling the VCDU to 1–4 Mbytes of dynamic RAM; and an audio port 30, which is a bit port for coupling an Audio digital signal processor 31 to the VCDU.

The VCDU includes a video port controller 632 which is coupled to the video port 32 for receiving pixels in real time. The video port controller 632 is coupled to a memory controller 634. The memory controller is coupled to external VCDU memory 35 for controlling transmission of data to and from various units in the VCDU.

The VCDU further includes a 16-Pixel Engine 638 comprising a Filter and Motion Unit (FMU) 640 for performing motion estimation processing. The FMU 638 is coupled to a data flow engine 642. The data flow engine includes a quantization unit 644, a double buffer 646 and a Discrete Cosine Transform Unit 648.

Coupled between memory controller 634 and the FMU 640 is a slot machine 636. The slot machine controls the basic data flow within the VCDU as will be described below.

The VCDU is controlled by a host based software driver. This driver initializes the VCDU and loads appropriate microstores at startup. The driver is also responsible for initiating the processing of a frame whether it is encode or decode. The VCDU uses a SLOT template to control the Filter and Motion Unit (FMU) 640 and the memory controller 634. The FMU 640 in turn controls the starting and synchronization of the dataflow engine 642. The starting and synchronization of the SLOT machine is the responsibility of the driver.

Encode requires a complete frame of video data to be available in VCDU memory 35 before starting motion estimation. Therefore, the SLOT machine is synchronized to the video input. The SLOT machine must also be notified how the next frame is to be encoded. This is accomplished by the driver writing to a SLOT_start register. This is the address of the starting microword in the SLOT store. The SLOT Machine will finish the previous frame then check to see if the video data is ready and if there is a valid SLOT starting address. If so, the SLOT machine will begin dispatching to the FMU 640 and the memory controller 634.

At the start of the motion estimation, the data is forwarded from VCDU memory 35 to the Filter and Motion Unit (FMU) 640. The FMU 640 performs motion estimation to provide motion vectors and energy characteristics, and stores the results in VCDU memory 35. The FMU also performs motion compensation by fetching encode decisions from the VCDU memory 35 (after they are generated by the CPU) and either intra-coding or inter-coding the macroblocks as described above.

The VCDU will issue an interrupt to the CPU after completing a "granularity's worth" of work. The granularity is programmable, though the target is slice based communication. Thus, the VCDU will produce a slice of Motion Estimation Statistics then will DMA it to the CPU. After the DMA is complete, the VCDU will issue an interrupt to the CPU. This interrupt serves two purposes; the first is to let the CPU know that a slice of ME data has been transferred, the second is to signal the CPU that the SLOT machine has consumed the slot starting address and is ready for a new one. In addition, the VCDU has a number of "shadow" registers (not shown) which must be updated every frame. These registers include video frame buffer pointers, and ME buffer pointers as well as REFerence_frame and CURrent_frame pointers.

Upon completion of ME and MC processing, the results are transmitted from the FMU 640 to double buffer 646. The double buffer 646 is a RAM storage device for buffering results and input data suppled to both the Discrete Cosine Transform Unit 648 and the Quantization unit 644. The double buffer includes two buffers 672 and 676 (not shown) to facility a fill/drain operation. The configuration and storage space of the double buffer 646 permit the decoupling of operations among the DCT 648, QNT 644 and FMU 640 units, allowing them to function semi-autonomously and simultaneously without stalls.

The Discrete Cosine Transform Unit 648 compresses either spatial or temporal redundancies in the pixel data depending upon the classification of the frames as described above. The frequency coefficients produced by DCT unit 648 are quantized by a divide and rounding operation in the Quantization unit 644 as discussed previously with reference to FIGS. 5A and 5B. The Quantization unit 644 encodes the results as RLE tokens. Resulting RLE tokens are transferred to VCDU memory 35 and later transmitted to the host CPU for final encoding.

As stated above with regard to FIG. 24, both motion estimation and motion compensation may be performed during the same cycle on different frames. Both tasks are performed by the FMU 640 unit, which is advantageously designed to use a minimal amount of hardware.

Figure 29:
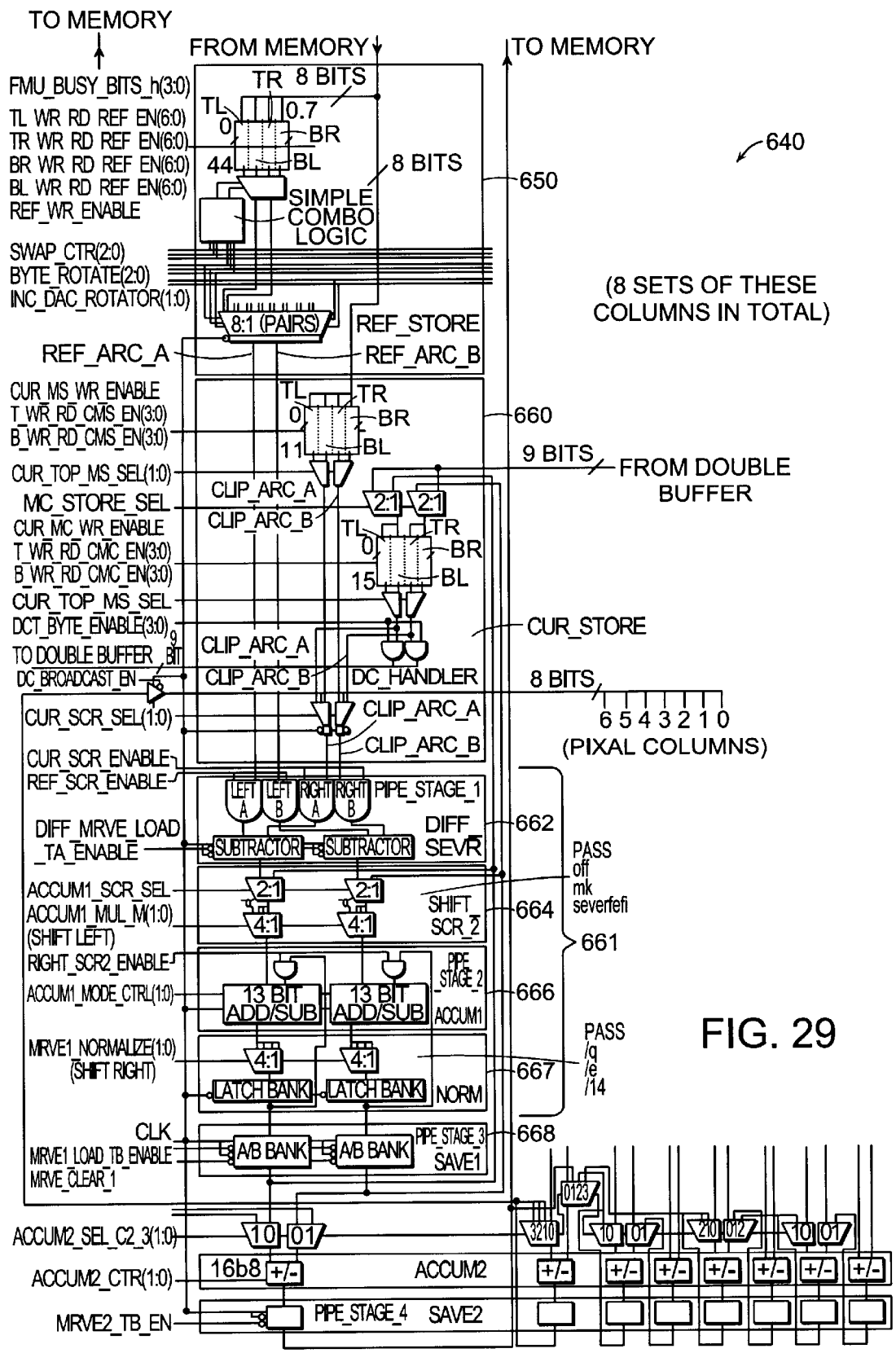
FIG. 29 is a block diagram illustrating one embodiment of the Filter and Motion Unit of the Video Compression/Decompression Unit of FIG. 28.
Figure 30A:
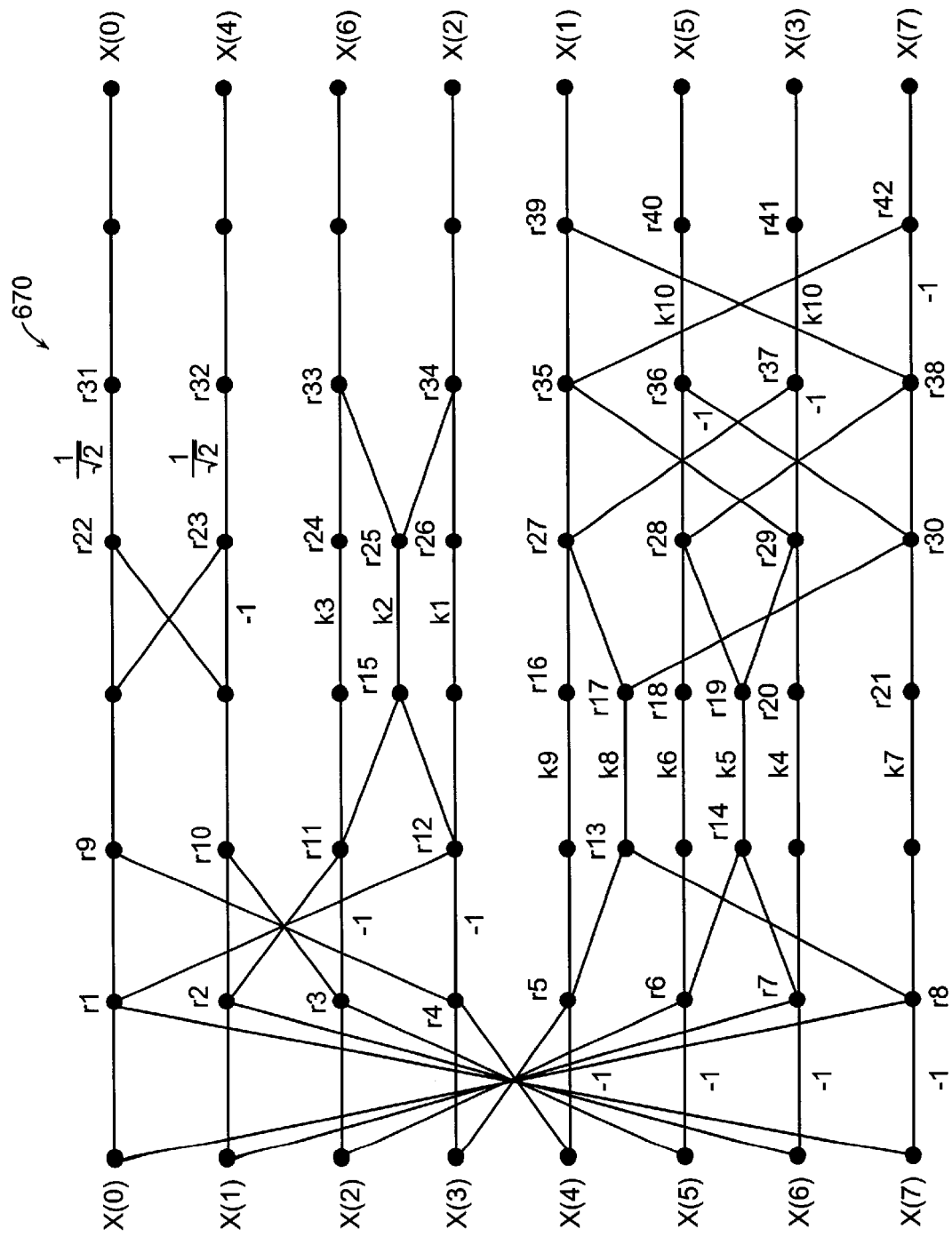
Figure 30C:
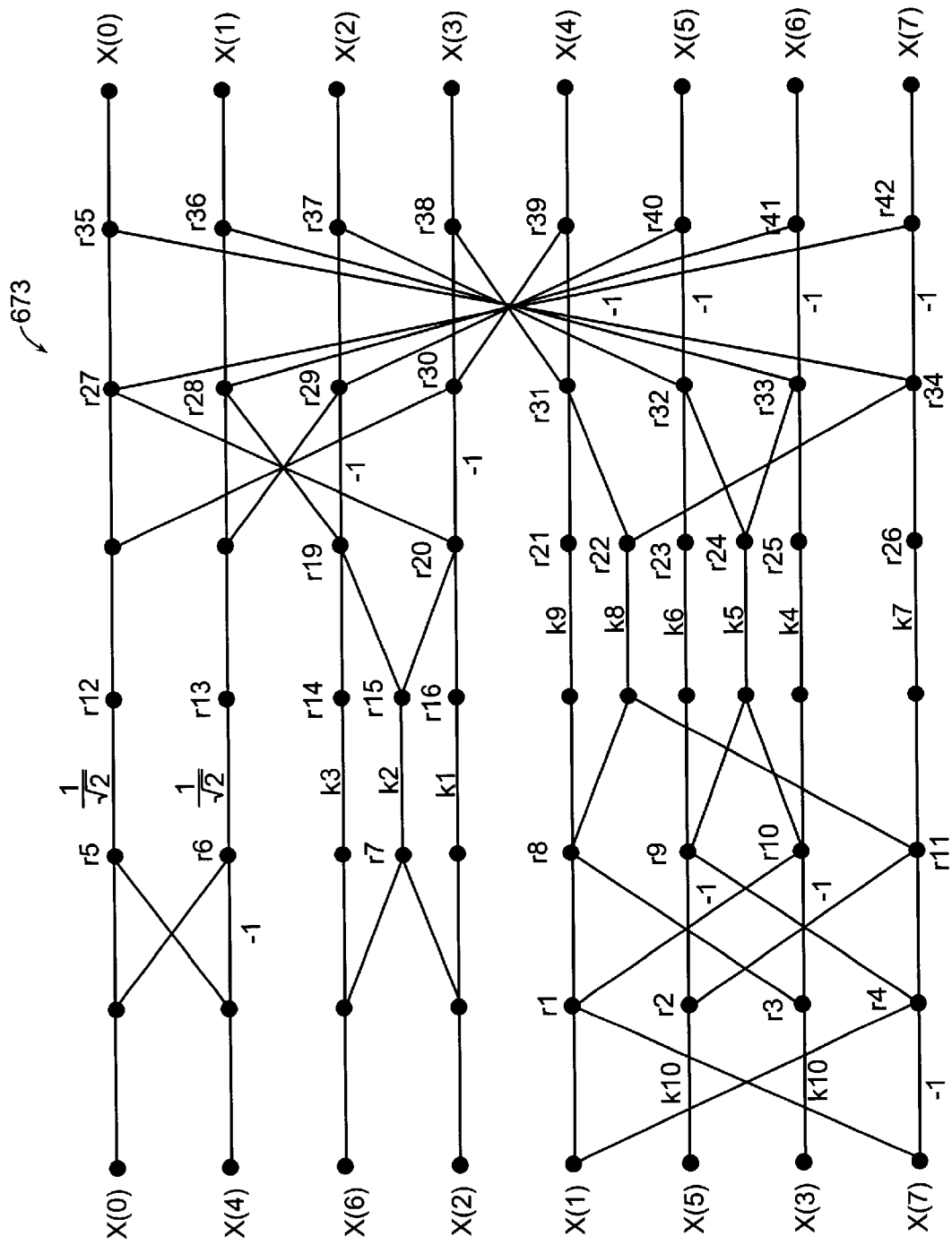

Referring now to FIG. 29, one implementation of an FMU unit 640 for use in the present invention is shown to include a reference store 650, for storing reference frame data, and a current store 660, for storing current frame data. All pixels required for either an ME search or an MC routine are pre-loaded by the memory controller 634 (FIG. 28).

To keep the FMU 640 operating, instead of stalled waiting for data, data path rams that store pixels for ME/MC processing are physically split into separate banks. The Reference store 650 is apportioned into three separately addressable banks, two that hold the search region used in ME, and a third that which stores the block regions of previous frames used in the MC. The current store 660 is apportioned into only two banks, one that stores the macroblock used in ME, and the second holds the block used in MC. By splitting the reference store and current store into banks, the MC banks can be loaded by the memory controller 646 while the FMU is performing motion compensation. Also, when executing search mode on a B frame macroblock, where the search region is small enough, the two ME banks of the reference store allow the memory controller 646 to load one bank for a backward search while the FMU is in forward mode, and visa-versa.

The FMU 640 also includes an arithmetic logic block 661 which includes differential unit 662 coupled to a shift unit 664. The output of the shift unit 664 is forwarded to a normalization unit 667, and the result is stored in register bank 668. The arithmetic logic block includes a differential unit 662 coupled to a shift unit 664 whose output is forwarded to a normalization unit 667, via logic 666, for storage in register bank 668. In the preferred embodiment the arithmetic logic 661 contains a series of adder circuits for calculating the cumulative difference between each pixel comprising the macroblock of interest in the current frame and a corresponding pixel within each macroblock of a reference frame. The macroblock in the reference frame which is the best match to the macroblock in the current frame is the one which has the smallest sum total of pixel differences. This is determined by minimizing the absolute value of the error as described previously with reference to Equation 1. The results stored in register bank 668 are forwarded to VCDU by memory controller 634.

As discussed previously, when the MC phase of compression is completed, the resulting macroblocks are forwarded to the DCT unit 648.

The definitions for the forward and inverse transforms have been provided above in Equations 9A and 9B. The nature of the two-dimensional DCT permits it to be decomposed into 2 sets of one-dimensional transforms. Referring briefly to FIGS. 30A–30D, the preferred method of the invention uses a spider diagram 670 (FIG. 30A) for implementing a 1-D 8 point forward transform. The 8×8 2-D DCT is performed by evaluating the eight 1-D row transforms, then evaluating these results through 8 column transforms. The spider diagram may be read left to right and by interpreting constants above a horizontal scaling line (k1–k10) as scaling factors, and where two lines meet at a vertex a summation occurs. The '−1' below a line indicates subtraction.

The order of operations is very important to developing an optimal solution. The key is to schedule the various operations so as to keep all functional units as busy as possible while minimizing the storage requirements of intermediate results, and performing the function as fast as possible. The schedule of operations 672 is provided in FIG. 30B.

The same techniques are employed for analysis and optimization of the Inverse DCT. The spider diagram 673 for the inverse DCT is provided in FIG. 30C. Similarly, the order of operations is important to developing the optimal solution and minimizing the control logic by allowing IDCT and DCT to be executed in parallel. One effective order of operations for the IDCT 674 is provided in attached FIG. 30D.

Figure 31A:
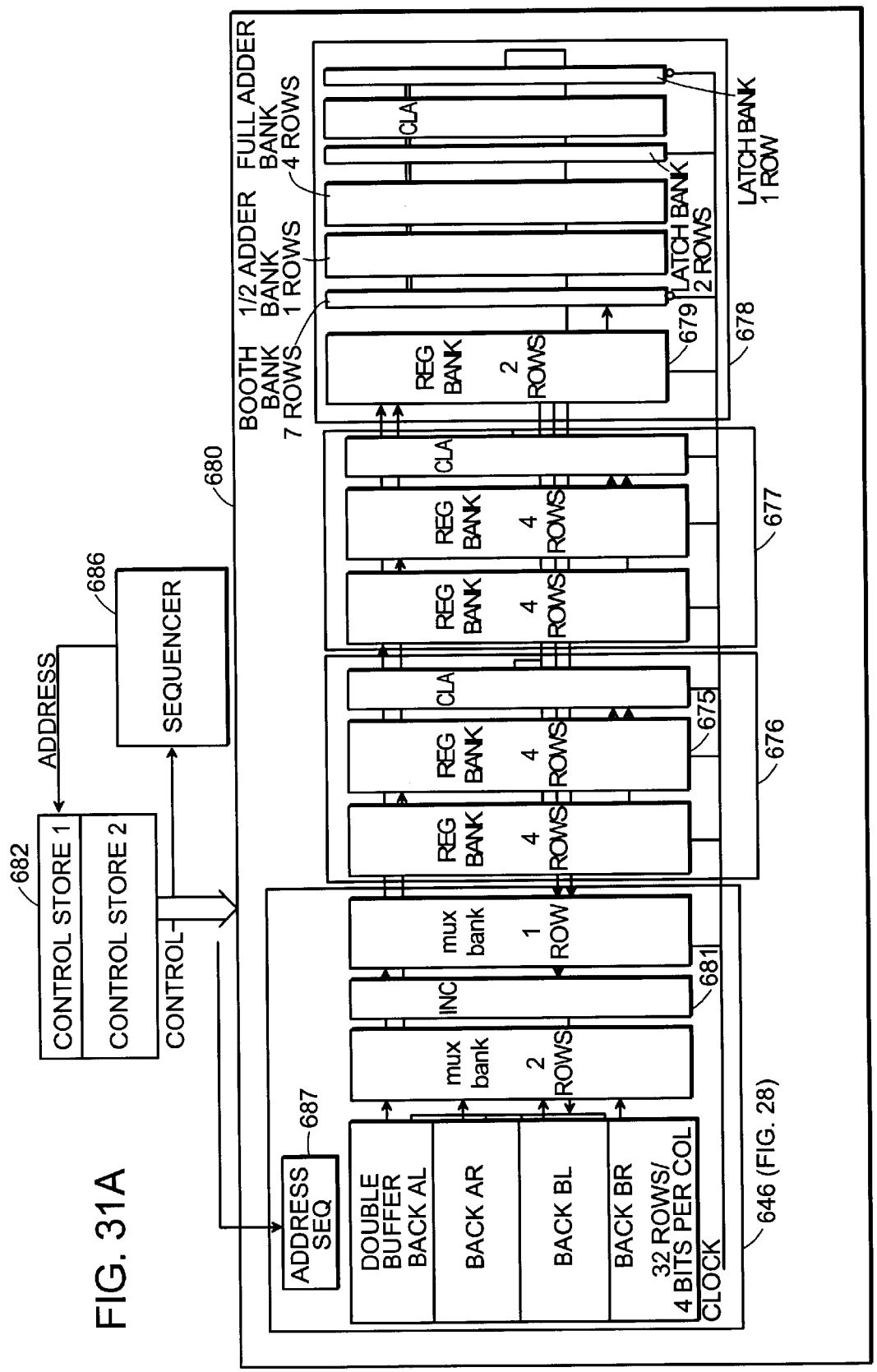
FIGS. 31A and 31B are block diagrams illustrating one embodiment of the data path of the Discrete Cosine Transform unit and Double Buffer of the Video Compression/Decompression Unit of FIG. 28.

Referring now to FIG. 31A, the above described approach to DCT and IDCT computing can be provided via the DCT unit 648 (FIG. 28) data path implementation 674, which is shown to include 4 functional units. The first is the double buffer operand store 646. The second and third functional units are adders 676 and 677. Each adder has four associated scratchpad registers 675. These registers are 2 write/2 read port registers. Each adder is capable of performing 2's complement addition or subtraction. The fourth unit is a multiplier unit 678. It has 8 associated scratchpad registers 679.

The data path is 24 bits wide. Prior to writing the row or column results into the double buffer 646, each result must be rounded via an incrementer 681, which is a non-biased two's complement rounding unit.

Control for all four units is via two 18 word fully decoded control stores 682 and a sequencer 686. The addressing of the double buffer is through a separate RAM based addressing sequencer 687, which is controlled by one field in the control store.

Three important features of this method of performing DCT/IDCT include a distributed register file structure that allows fewer intermediary storage units, careful optimization of register allocation and functional unit scheduling to allow high speed computation using minimal hardware, and low input and output bandwidth for block storage.

The hardware or circuit used to perform the DCT transform must be made as fast and as simple as possible. It is highly desirable to use the same physical logic gate for as many parts of the transform as possible, since to do so results in the fewest number of transistors needed to perform the operation. The fewer the number of transistors used, the faster and more economical the circuit will be. The VCDU uses the same circuit algorithm and same circuit hardware for all eight partitions of the DCT and the IDCT transformations, thereby minimizing logic gate usage, memory space consumption, and thus reducing the size of the circuit.

Here, a single ported RAM structure is used to deliver the pairs of operands to the DCT circuit. That is, a single ported RAM structure is used to deliver two simultaneous pieces of data by providing a unique decomposition of the storage and retrieval locations of the 64 bits of data held in each block. Using single ported RAM instead of the dual ported RAM structures that would have been required in the prior art DCT circuit results in fewer transistors, greater speed of operation, lower cost and the ability to use off-the-shelf components in the design of the circuit.

Also, the need for a transpose buffer in addition to the initial operand storage buffer is eliminated as a result of a unique storage and retrieval technique described here below, which allows the intermediate results of the row transformations to be stored in the same location that the original operand came from. Thus, the same exact memory buffer holds the original operands and the results of the DCT row transformation in the same memory location.

Here, the single ported RAM, in combination with the unique storage and retrieval technique, is used as double buffer 6446 which can be used by both the DCT circuit and the quantization circuit since the transfer of immediate data to the separate transpose buffer has been eliminated. Thus the memory reads to the DCT and to the quantization elements can be in parallel as opposed to serially, as would be the case where a single buffer was used.

According to the preferred embodiment, the VCDU uses a circuit area conserving four element wide memory circuit in the design, since the industry standard four RAM per data path bit pitch memory design results in the best available circuit density and simplicity of design. The memory design is also more area conserving than the standard four bit pitch single ported RAM memory design since the last multiplex element (i.e., MUX) in the memory chain may be deleted. This is possible since the unique memory storage and retrieval method of the keeps the two members of the operands pairs required by the DCT circuit on opposite sides of the memory, thereby eliminating the possibility of data 'collisions' and removing the need for the MUX, and also because it is always a pair of memory elements that is retrieved.

It should be noted that the present invention provides the ability to have a single ported RAM structure used where a dual or a multi-ported RAM would normally be required. Once of skill in the art will recognize that the utility of the invention is not limited to the video compression art, but has widespread application; i.e., wherever multi-port RAM structures are used. Thus the description of the preferred embodiment in the context of a video codec should not be seen as a limitation of the present invention.

Figures 31B, 32:
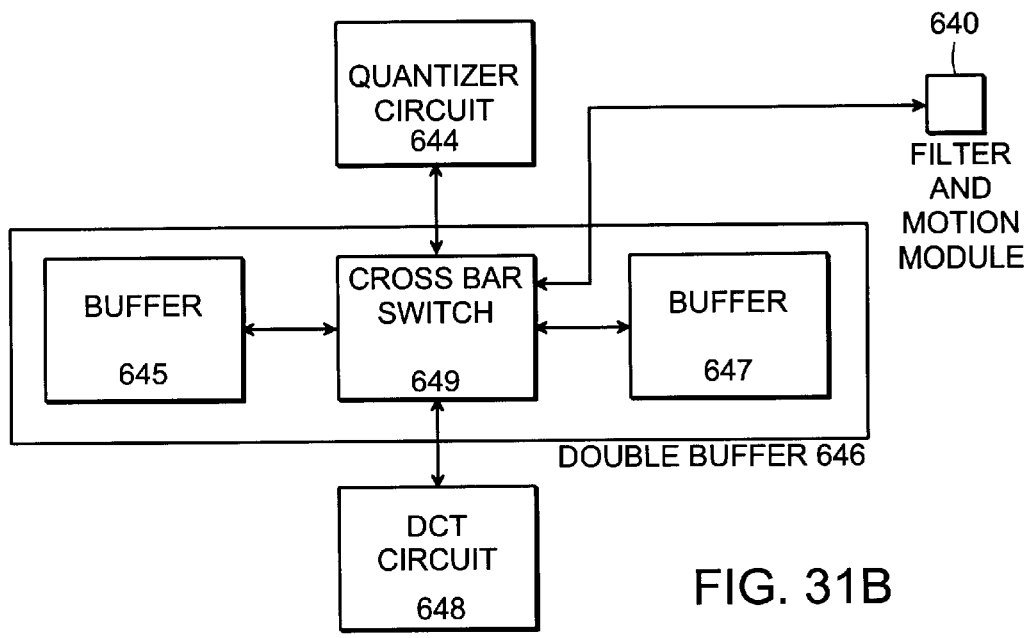
FIG. 32 illustrates a partitioning of a block of video data into left and right halves for row transforms, and into top and bottom halves for column transforms, for purposes of the DCT operation of FIGS. 31A and 31B.

Referring now to FIG. 31B, the details of the double buffer 646 are shown. It should be noted that the present invention could be implemented with single buffers. The double buffer 646 is comprised of a cross bar switch 646 which routes signals to and from the DCT circuit 648 and quantizer circuit 644 to the appropriate halves of the double buffer itself, buffers 645 and 647. The transform coefficients may be divided into left and right halves and separately stored in either half of the double buffer. The coefficient's halves may then be transposed separately. This procedure leads to increased memory utilization and increased speed of operation if the scheduling of the operations is performed appropriately. The double buffer 646 is also connected to the filter and motion module 640 via the cross bar switch 649.

Referring now to FIG. 32, a specific example of the separation of the column transform and the row transform into left and right operands or parts is shown. The figure shows a single block (i.e., an eight by eight pixel region of the whole image) of image data with the numbers in the array representing the identification number of the specific pixel location for future reference and calculation of the image value contained at that pixel location. (Note that each of the numbered pixel locations is used as the number of an operand in the DCT transformation circuit order of operations.) As will be described below the organization of the data structure into which these pixel locations are stored in the double buffer memory is a key consideratio. By structuring the storage of the coefficients in a certain fashion, the DCT circuit may access the operand (i.e., the numbers 0–63) pairs using single ported RAM, storing the results of the row transform back into the same memory location the operand come from (rather than using a separate buffer), and perform the column transform without having to rotate the data from row format into column format (thus eliminating the need for a transpose buffer).

Referring now to FIG. 33, the specific order and location of the DCT operands (i.e., the number 0–63) in the single ported memory (known as RAM) used in double buffer 646 (FIG. 28) is shown. Proper organization of the DCT data by ensuring that there would be no collisions during a fetch of the operands allows the preferred embodiment of the present invention to use a single buffer memory employing a compact single port RAM structure. Here, the coefficients are stored using the specific ordering and location in structure 651 to support transformation of the 8×8 pixel array of FIG. 32. Other arrangements may be possible as long as the method for fetching the operands coupled with the arrangement of the operands ensures that there are no collisions during a fetch of two operands simultaneously. This is one example of paired fetch order problem. However, this invention is not limited to this type of problem and can be applied to any 'dual read' type of problem. Another example of a paired fetch order problem will be shown with regard to the IDCT calculation. The scope of this invention should not be limited to DCT and IDCT problems, but can also be applied to other transformations such as the Fast Fourier Transform (FFT), wavelet problems and other common transformations.

The DCT calculation requires two operands per cycle, as can be seen by the operand fetch order diagram, 654. The first calculation cycles uses operands 2 and 5. Referring back to FIG. 32, these two operands can be seen to be the third and sixth elements in the first row. These two operands (i.e., 2 and 5) are stored in accordance with the specific storage and retrieval technique used in the present invention in the four word wide RAM memory cell in the address word line numbered 2, as can be seen by the DCT data store organization diagram, 651. Since the operand number 2 is on the left half of the RAM location, and the operand number 5 is on the right half of the RAM, both operands can be output to the DCT calculation circuit even though the RAM memory used is a single port memory. Thus a single port RAM can be used to do the job of a dual ported RAM structure.

The use of the single ported RAM structure decreases the size of the circuit and increase the ease of manufacture, thus resulting in decreased cost and increased speed of transformation operation. This ability to use single ported RAM is based partially upon the fact that the storage locations chosen for the DCT operand pairs are always on opposite sides of the four bit wide RAM memory. As a further demonstration of the separation of the operand pairs into the left and right halves of the four bit wide memory structure, observe the second pair of DCT operands from diagram 654. Operands 0 and 7 are found stored on address line 0 in diagram 651, with operand 0 on the left half and operand 7 on the right half, the same order as was found for operands 2 and 5. Thus, the same RAM bit line control logic (see diagram 653) can be used to output both the first and the second pairs of DCT operands. Further inspection of diagrams 654 and 651 shows that in fact the first four pairs of DCT operand all have the same bit line control (i.e., the entire first row transformation), only the word line shifts as is shown in the DCT double buffer addressing diagram 652. Further inspection of Diagram 653 shows that the bit line address algorithm used for the first row transform is used on all of the first four row transform as well (i.e. those numbered 0–3) using bit lines 2 for the left operand and 3 for the right operand. The word line address algorithm is detailed in diagram 652, called "Row 0:3", and shows that for the first four row transformations the same order of word line addressing is used. Thus, the order of the calling of operands from the DCT data store, diagram 651, is shown in the DCT double buffer addressing diagram 652, where it shows that for the first four row transforms (i.e., 0–3) the word line order is 2, then 0, then 1 and then 3. Taking the number 2 word line from diagram 651 does indeed show that using bit lines 2 and 3 as required by diagram 653, produces the DCT operand pair of 2 and 5, as required by diagram 654. Using word line 0 then produces operands 1 and 6, and so on.

After the first four operand pairs are read out, the procedure repeats itself for the rest of the operands numbered 8–63 in FIG. 32. the same DCT fetch order is done for the second row (i.e., operands numbered 8–15) as was done for the first row transform as discussed above. Diagram 654 shows that operands 2 and 5 are to be fetched first. Examination of FIG. 32 shows that operand 10 in the second row transform is the third operand in that row just as operand 2 was the third operand in the first row, and operand 13 replaces 5. Looking at diagram 651 shows that operands 10 and 13 are in the third row of the second group of four memory locations, and can thus be read out using exactly the same ordered sets of bit line and word line addresses as was used for the first row transform. As noted above the same structure works for all of the first four row transforms (i.e., operands numbered 0–31 of FIG. 32).

The situation changes slightly for row transforms 4–7 (i.e., operands 32–63). As can be seen from diagram 653, the bit line controls are still separated into left and right parts, as is required to use single ported RAM and still be enabled to read two operands per cycle, but now the two enabled bit liness are the first and fourth lines. Diagram 652 shows that the word line addressing used is the same as that used for the first four row transforms, but with the number order shifted by exactly 12. Shifting by twelve requires only a double shift and exclusive OR operation. Thus the row transforms numbered 4–7 are performed using the same arrangement as the first four row transforms. This completes the row transforms for the 8×8 pixel block of video image data. Now the column transforms must be performed on the results of the row transforms.

The column transforms can be done using the same control logic as was used for the row transforms because of the efficiency of the unique data storage and retrieval method used in the present invention. This results in greatly reduced numbers of logic elements and memory locations dedicated to storing the specific order of operations. The operand fetch order is the same as used for the eight row transforms, but the bit line selection is now changed to lines 2 and 4. Note that the two operands per cycle are still divided by the present method into a left half and a right half data element, again a result of the unique data storage and retrieval method used in present invention. The word line addressing is shown in diagram 652 wherein it shows that the same word line order is used as was used for the first four row transforms, but now simply multiplied by 4. Multiplying by 4 is requires only a double shift of the first address number. This can be seen by noting in diagram 652 that the numbers in rows 0–3 are all exactly four times greater than the numbers in rows 0–3. In other words, in order to access word line 8, then 0, 4 and 12, as is necessary to do the first four column transforms, use the same logic elements that were used to define the order 2, 0, 1 and 3 (i.e., the first four row transform order), but multiply the address values by four through the simple expedient of a double upward shift. Thus, the amount of logic necessary to perform the DCT operation is greatly reduced, since the same logic elements can be used repeatedly with the addition of very simple shift and OR operations.

It should be noted that the column transpose operations discussed above are performed using the results of the eight row transforms which are located in the same memory locations in which the original operands were stored. This means that the data has not been transposed from row format into column format as was required by prior art DCT circuits. Thus the initial operand buffer may be used to store the row transform data for the column transform operation, thereby eliminating the need for a separate and unique transpose buffer.

Referring now to FIG. 34, the same information shown in FIG. 33 is shown, but now with reference to the IDCT preferred order of operation order and location. A key feature can be seen by comparing FIG. 34 with FIG. 33, the DCT control structure. Notice that there is a great deal of symmetry between the control of the bit lines and of the word lines. The IDCT bit line control is the same as shown in FIG. 33 diagram 653, and the IDCT word line control is the same as used in the DCT row transform, with the two column sections using the same simple double shift addressing scheme used in the DCT for columns 0–3, in FIG. 33, diagram 652.

It should be noted that the transform process (i.e., the data organization technique) is extensible to much larger matrices. Thus the description with respect to an 8×8 matrix of image data should only be seen as an illustration of the present technique and not a limitation of the present invention.

Figure 35:
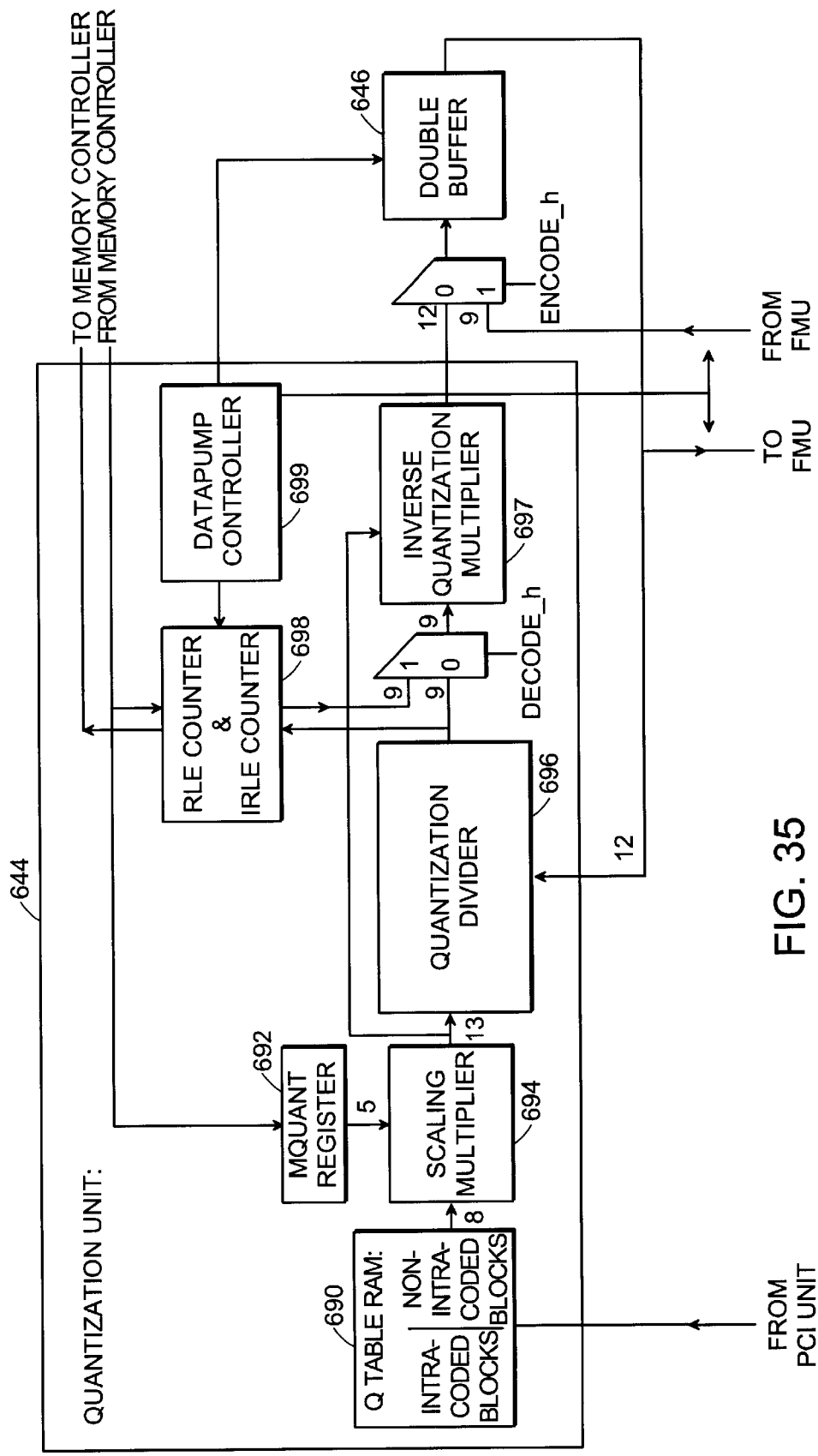
FIG. 35 is a block diagram illustrating one embodiment of the quantization unit of the Video Compression/Decompression Unit of FIG. 28.

Referring now to FIG. 35, a block diagram of the Quantization Unit 644 (FIG. 28) is shown coupled to the double buffer 646. As described above, there are two levels of quantization in MPEG/JPEG and H.621; the first uses the quantization table (such as Quantization matrix 434 in FIG. 19A), and the second is the macroblock scaling factor MQUANT. In the preferred embodiment there are two quantization tables; one table is used when operating on intra-coded macroblocks, the other table is used on non-intra-coded macroblocks.

As shown in FIG. 35, the quantization tables are stored in Q table rams 690. The CPU is responsible for loading all Q table entries. During encode and decode the CPU loads the tables as required. Thus, the CPU is responsible for updating Q tables on video stream context switches.

The MQUANT value is stored in MQUANT register 692. As described above, the MQUANT value is determined during the ME of the macroblock, and stored with the macroblock data structure. The MQUANT value is multiplied by the values in the quantization tables 690 via scaling multiplier 694. The resulting quantization matrix is forwarded to the quantization divider 696. The quantization divider also receives pixel data as input from the DCT portion of double buffer 646. In addition, the scaling multiplier values are forwarded to an inverse quantization multiplier 697, which is used during decompression. A data pump controller 699 controls the movement of data between the quantizer unit 644 and the DCT unit.

The quantization divider divides the pixel data by a value in the corresponding position of the quantization matrix. The result is forwarded to the RLE/IRLE counters 698. The RLE/IRLE counters count the number of zeroes between non-zero coefficients after the coefficients have been quantized, as discussed above. The results are forwarded to VCDU memory via the memory controller 634 (FIG. 28).

The quantization step should be designed to facilitate high bandwidth data transfer. In the preferred embodiment, the performance of the quantization unit is improved through the use of a high speed divider circuit as described below.

X. Quantization Divider

As previously described in conjunction with step 441 of FIG. 19B, the DCT result is quantized. Quantization is a processing step performed as in spatial compression processing in which frequency components of a transformed image are removed or reduced in the quantization step effectively compressing the image. Also, as previously discussed, the quantization step includes performing element-wise division which has a high bandwidth requirement. An implementation of the divider used to perform division, as in step 444 of FIG. 19B, will now be described.

In one implementation, the input divisor has a data width of 13 bits and the input dividend has a data width of 12 bits. The input dividend represents the 12-bit quantity input from the double buffer 646 of FIG. 28 produced by the DCT unit. The 13-bit input divisor is the product of a value stored in Q table 690 multiple by a value stored in MQUANT register 692 (FIG. 35). It should be noted that the size of the input divisor and the input dividend vary with implementation and are not required to be 13 bits and 12 bits respectively, in size.

The quantization divider 696 employs a pseudo pipelined technique to perform the division required to produce a quotient. The quantization divider is a multi-stage pseudo pipelined divider which has a minor clock cycle which iterates 3 times for each major clock cycle. In other words, in addition to the system or minor clock there is a second or major clock which is derived from the minor clock. The minor or system clock ticks 3 times for every one major cycle or pipeline stage unit of time.

In this particular implementation, an input dividend, which is an 8×8 matrix comprising 64 coefficients, is produced by the DCT unit every 280 minor cycles. If the quantization divider 696 is not to stall the data flow pipeline or require buffering of data, then the divider and the quantization unit should have a throughput which keeps up with a production of data by the DCT unit.

Figure 36:
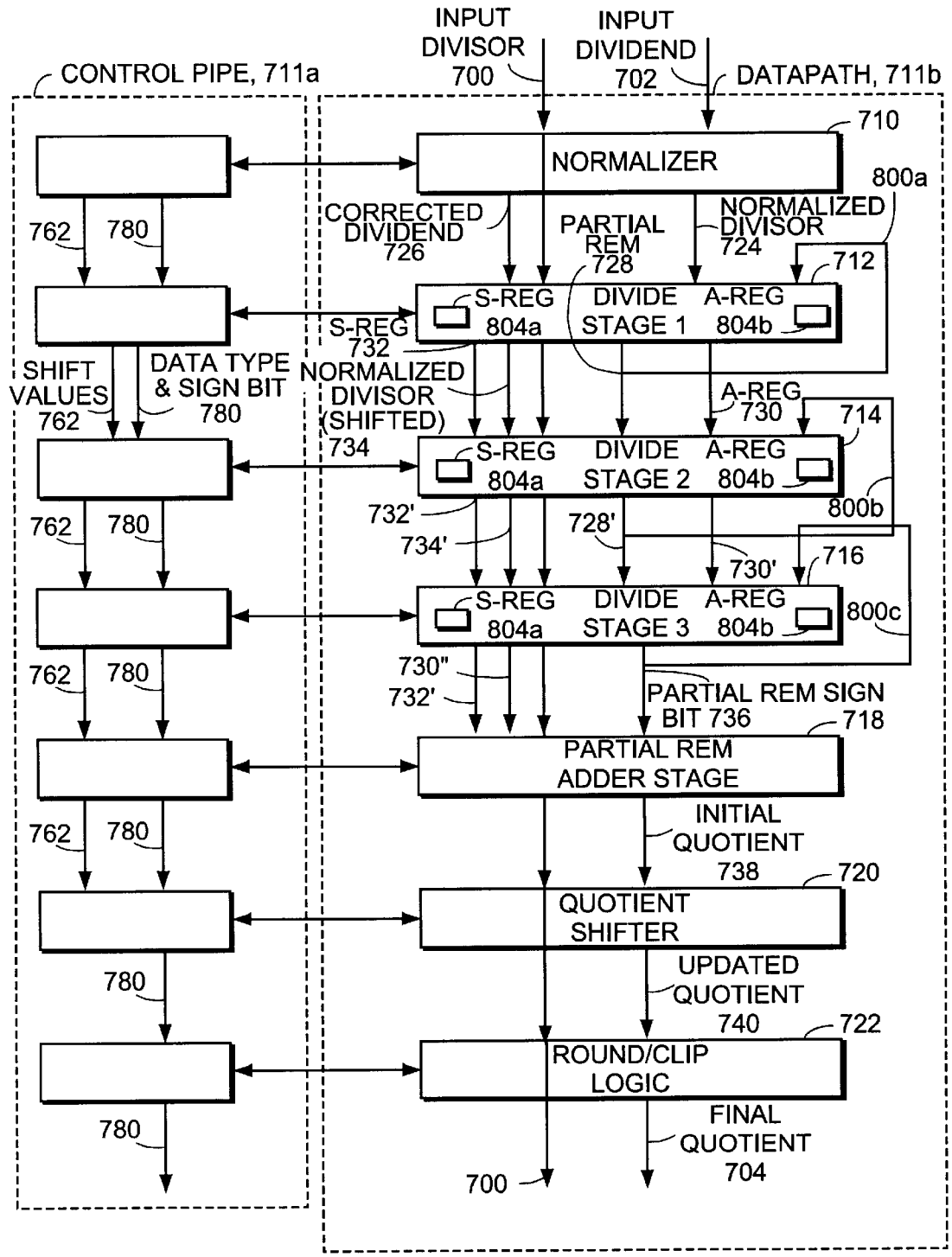
FIG. 36 is a detailed diagram of the quantization divider of FIG. 32.

Referring now to FIG. 36, a quantization divider 696 is shown as including seven pipeline stages 710, 712, 714, 716, 718, 720 and 722 used to produce a final quotient 704. As shown in FIG. 36, the pipeline stages include control logic 711*a* for controlling the data flow pipeline 711*b* within the quantization divider. Each pipe stage corresponds to a major cycle or three minor clock cycles. In FIG. 36 a pipe stage or major cycle is represented as one of elements 710, 712, 714, 716, 718, 720 and 722 depicting the data flow within the quantization divider 696. Divider 696 includes a first pipe stage 710 which is coupled to signal paths 700 and 702 carrying, respectively, an input divisor and input dividend. The first pipe stage 710 produces a normalized divisor along signal path 724 and a corrected dividend along signal path 726. Additionally, the input divisor is propagated through to the next stage 712. Stage 1 also produces shift values along signal path 762 and a data type and sign bit signal on path 780. Shift values are generated as a result of normalizing the divisor and propagated to a later stage for use. The data type and sign bit represent a combined signal of, respectively, data type information and sign information about the input dividend propagated to subsequent stages for later processing.

Stages 2, 3 and 4, respectively, elements 712, 714, and 716 are generally identical stages. This will become more apparent in the following paragraphs and figures.

The second stage 712 provides a partial remainder (Partial Rem) along signal path 728, which updates the contents of data latch registers A-REG 804*b* and S-REG 804*a*, respectively, along signal paths 730 and 732, and produces a shifted normalized divisor along path 734. Additionally, the input divisor on path 700 is propagated to the third stage 714, as are the data type and sign bit on signal path 780 and shift values on signal path 762. Included in the second, third and fourth stages (respectively elements 712, 714 and 716) are data latch registers S-REG 804*a* and A-REG 804*b* used for recording the division operation results. S-REG records when a subtraction is performed and A-REG records when an addition is performed. The use of A-REG and S-REG in the division technique is described in detail in the following paragraphs. In the second stage 712, the values contained in A-REG and S-REG are passed, respectively, on signal paths 730 and 732, to the third stage 714. The partial remainder from state 712 is passed to stage 714 on signal path 728 and also recirculated as an input to stage 712 along path 800*a*.

Similarly, as produced by the second stage 712, the third stage 714 outputs a partial remainder on signal path 728' and updates the contents of A-REG with a new value along signal path 730', and S-REG with a new value on signal path 732'. The third stage 714 also recirculates a partial remainder as input to itself along path 800*b*. The third stage propagates the input divisor on signal path 700 to the fourth stage 716 and once again shifts the normalized divisor producing an updated normalized divisor on signal path 734'. The third stage propagates shift values on signal path 762 and data type and sign bit along path 780 to the fourth stage. The fourth stage 716 propagates the input divisor on path 700, shift values on signal path 762, and input dividend data type and sign bit information along path 780 to the fifth stage 718. A-REG is updated with a new value on signal path 730' and S-REG is updated with a new value on signal path 732". The sign bit of the partial remainder is passed, via signal path 736, to the fifth stage 718 as opposed to the partial remainder being propagated to the next stage, as was done in the second and third stages. The partial remainder along path 800*c* is recirculated as an input to stage 716 similar to the recirculated partial remainders along paths 800*a* and 800*b* as previously described, respectively, for stages 712 and 714.

Stage 718, the fifth stage, propagates the input divisor along path 700, the data type and sign bit information along path 780, and shift values along path 762 to the sixth stage 720. Additionally, the fifth stage passes a quotient value on signal path 738 to the sixth stage. The sixth stage once again propagates the input divisor on signal path 700, and the data type and sign bit information along path 780 to the seventh and final stage 722. An updated quotient is passed to the seventh stage 722 along signal path 740. The seventh stage produces the final quotient on signal path 704 and propagates the values for the input divisor on path 700, and the data type and sign information of the input dividend along path 780 to a subsequent component included in the system following the Q unit 696.

The functions performed by each of the foregoing seven stages will be described in more detail in the following text.

The first stage 710 normalizes the input divisor on signal path 700 producing a normalized divisor on signal path 724. This is done by shifting the divisor left as needed so that the first non-zero bit will be in the most significant bit position. Values corresponding to the number of bit positions shifted are passed onto subsequent stages along signal path 762. The first stage also corrects input divided input to stage 1 on signal path 702 producing corrected dividend on signal path 726. The input dividend on signal path 702 is modified in accordance with a compression standard used in a particular implementation. Thus, the actual corrected dividend will vary with the standard used and will depend on characteristics of the data such as whether the data is inter or intra coded, and is a DC or AC coefficient. Characteristics of the dividend and its sign bit are propagated to subsequent stages along a combined signal path 780 for use in later processing stages.

Stages 2, 3 and 4, elements 712, 714, and 716 of FIG. 36 here implement a division algorithm generally known as the SRT non-restoring division algorithm, as described by Kai Hwang in "Computer Arithmetic. Principles, Architecture, and Design". Each of stages 712, 714 and 716 comprise two 1-bit non-restoring divide stages such that two bits of the dividend are retired every minor cycle and 6 bits of the dividend are retired every major cycle. Therefore, 18 bits of the dividend can be retired in 3 major cycles. The use of each of the data inputs and outputs of the stages will be more apparent when described in detail in following paragraphs.

Stage 5, element 718, generates an initial quotient on signal path 738 using results recorded in prior stages 2–4 and the sign of the dividend on signal path 780. This quotient is updated or corrected in stage 6. In particular, stage 6 "undoes" the normalization shifting which was done in the first stage, using the shift values on signal path 762, to produce the normalized divisor on signal path 734. Stage 7 is the final stage of the divider, element 722, and performs rounding and clipping of the updated quotient on signal path 740 producing final quotient on signal path 704. Specifically how the rounding is performed is dependent upon the compression standard using the data type value of the dividend on signal path 780. Clipping limits the quotient to a particular integer range. In the instant case, the clipping function performed in stage 7 is within the inclusive range 255 to –255 depending on the updated quotient value 740.

As previously described, stages 2, 3 and 4, (respectively, 712, 714 and 716) each retire two bits of the dividend every minor cycle and six bits every major cycle such that 18 bits of the dividend can be retired across stages 712, 714 and 716. Generally, the SRT method for performing division, as here implemented, involves using a normalized divisor and successful partial dividends which are also normalized. Within stages 712, 714 and 716, two bits of the dividend are retired by using two 1-bit non-restoring divide substages in which the first substage cascades into the second substage. In each substage the divisor can be added to the dividend or partial remainder, subtracted from the dividend or partial remainder, or 0 may be added to the dividend or partial remainder. With the first iteration of the first substage of the first stage, the partial remainder is the dividend. On subsequent iterations and in subsequent stages and substages, the divisor is added to an updated dividend or partial remainder.

In summary, stages 712, 714 and 716 are the 3 divider stages performing the actual dividing of the dividend by the divisor using the SRT non-restoring division algorithm. Each of these stages iterates for 3 minor clock cycles recirculating an output partial remainder as an input to the same stage on each minor cycle. On each major cycle, the output partial remainder of one stage serves as an input to the next subsequent division stage. This process is repeated until 18 bits of the dividend are retired. The overall design of these 3 stages can be termed a pseudo pipelined design for performing division. There are 3 stages used in 9 minor clock cycles with each stage iterating 3 times or 3 minor clock cycles before proceeding to next pipelined stage. This differs from the traditional fully pipelined divider which would have 9 hardware stages rather than the three stages 712, 714, and 716 as described. The full pipelined divider typically would not iterate for 3 minor cycles, but would rather propagate values from one stage to the next subsequent stage for each minor cycle.

Using the foregoing approach, the amount of required hardware is reduced and thus the area of the integrated circuit is minimized while meeting high bandwidth requirements for processing video data. This becomes apparent using the prior equations when comparing the cycle time for the Q unit to process an 8×8 block of video data with the output rate of an 8×8 block of video data by the DCT unit.

In the foregoing description, values of the input divisor, input dividend and intermediate values as well as the final quotient had specific data widths. Note that these data widths are particular to this implementation. Data widths of the input divisor, input dividend, intermediate data values and final quotient vary depending on the standard and the size of the particular inputs and the specified data width in the foregoing example should not be construed as being limited to those values. Similarly, other implementations may vary the approach implemented in stages 2, 3 and 4 corresponding to elements 712, 714 and 716, respectively. The general approach taken is to provide the quantization divider with a throughput in accordance with other components of the system, such as the DCT unit, to avoid causing a bottleneck or holdup in the data flow of the system between components. In another implementation, the component prior to the quantization unit need not be a DCT unit. However, the general technique can be applied using other system configurations. Other variations of the overall approach in stages 712–716 can appear in an implementation depending upon the processing requirements and speed of a particular system and application. For example, an implementation may require the same bandwidth as previously discussed such as processing one block or other unit of data every 280 cycles. However, the size of the input dividend may be smaller. If the input dividend were a maximum of 9 bits in data width rather than 12 or 18, each of stages 712, 714 and 716 could retire 1 bit per minor cycle rather than 2. Thus, the same iterative approach would exist in that each of the stages would iterate for 3 minor cycles. However only a single 1 bit non-restoring divide stage rather than two 1 bit non-restoring divide stages would exist within each of the stages 712–716. This could easily be implemented by one skilled in the art. Similarly, stages 712, 714 and 716 can be expanded to include more than two sub-stages in which each sub-stage comprises a 1 bit non-restoring divide retiring a single bit of the dividend per minor cycle. Other variations on the technique previously described include increasing or decreasing the number of stage, and have a corresponding minor cycle time, depending on the required throughput of the system. These alternate implementations can be performed by modifying the foregoing description, for example, to include larger or smaller data widths and increase or decrease the amount of hardware needed for the number of sub-stages and stages as well.

Using the foregoing technique, a pseudo pipelined division technique is performed which, when given a particular bandwidth requirement, minimizes hardware and conserves integrated circuit area. Additionally, this technique provides a flexible approach which can be adapted for particular bandwidth requirements and constraints of the overall pipeline. The foregoing technique for performing division produces a fully completed quotient for high quality video quantization without stalling the data flow pipe of the entire system. Additionally, since stages 712, 714, and 716 are similar in that hardware portions are replicated throughout each stage, design costs, problem determination and correction costs are greatly decreased.

XI.) Video Decompression

Figure 37:
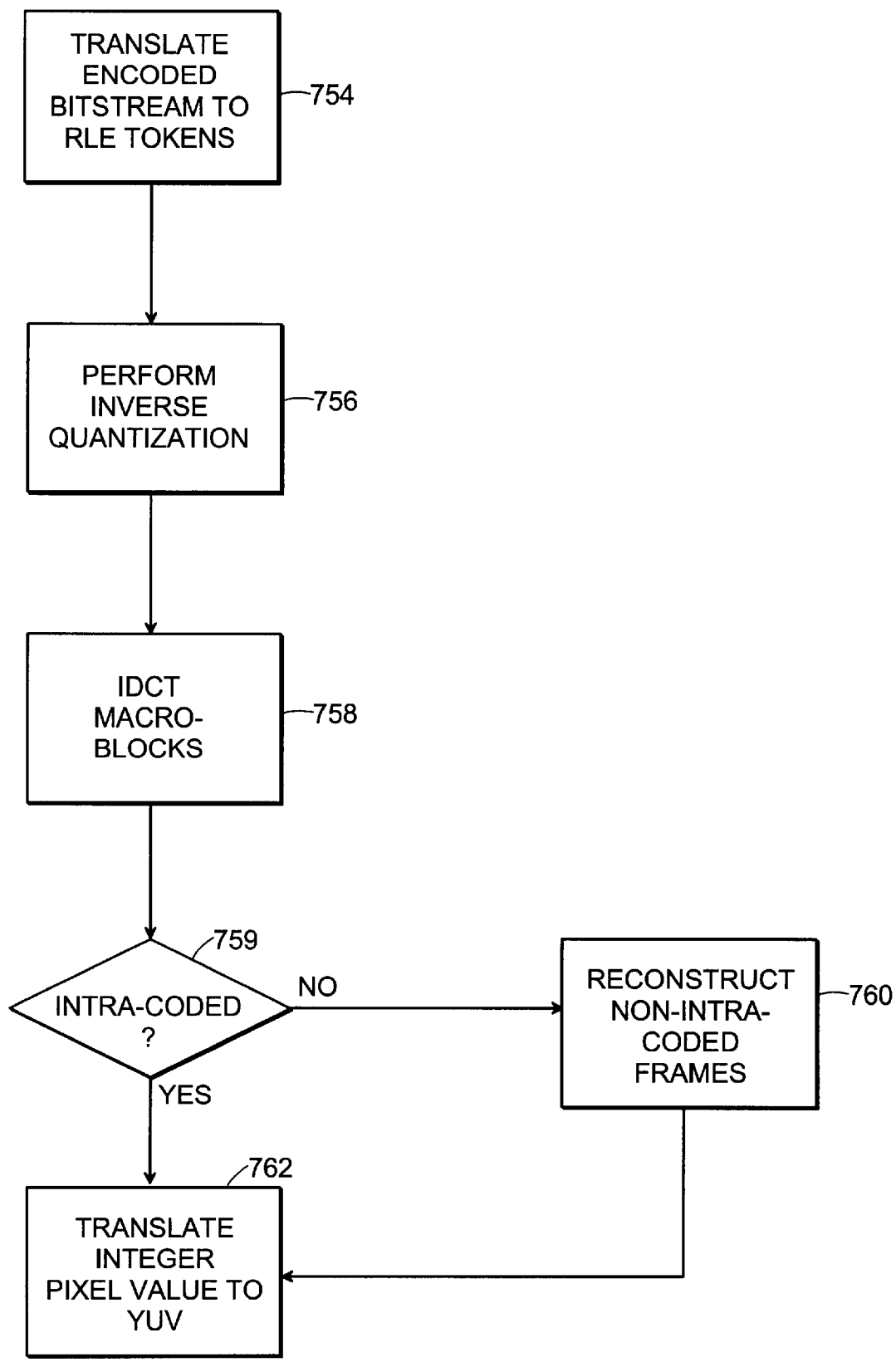
FIG. 37 is a flow diagram illustrating the steps used by a video decoder for decompression of a video image.

Referring now to FIG. 37, although thus far the discussion has been directed to the compression of a video image, it can be easily understood how the present invention can also accommodate image decode. At step 754, the encoded bit stream is translated into RLE tokens. This translation may be performed in either hardware or software, as each method has its advantages. The use of a software method reduces the logic required on the VCDU chip, yet uses valuable compute cycles to perform the operation, thus affecting performance. Implementing translation in hardware saves compute cycles, yet tradeoffs must be made to ensure adequate speed while minimizing the size of the logic circuit. A hardware device for providing fast, efficient translation of an encoded bit stream to RLE tokens will be described in further detail later herein.

After translation, the RLE tokens are forwarded, via DMA to VCDU memory for temporary storage. At step 756, the Quantization unit 48 (FIG. 3) first constructs macroblocks using the RLE tokens (via the IRLE counters 698 in FIG. 35). The constructed macroblock is then inverse quantized by multiplying non-zero coefficients by the value of the element in the corresponding location of the quantization table, then scaling the result by the MQUANT value. At step 758, the results are forwarded to the DCT unit 648 (using the double buffer 646), where the Inverse Discrete Cosine Transform is evaluated using techniques described in FIGS. 30C and 30D.

The resulting macroblock will be either an intra-coded macroblock or an inter-code macroblock which is determined at step 759. The CBP for each macroblock will dictate whether it was intra-coded or inter-coded, and if it was inter-coded, which are the appropriate frames to use during reconstruction. If it is intra-coded, the frame may be translated at step 762 to its YUV components.

If it is inter-coded, the macroblock contains differential data. At step 760 the differential data is added to the appropriate reference macroblock to provide the correct integer pixel values. Then, at step 762 the macroblock may be translated into its YUV components.

XII. Hardware Decoder for Translating Encoded Bit Stream to RLE Tokens

Figure 38:
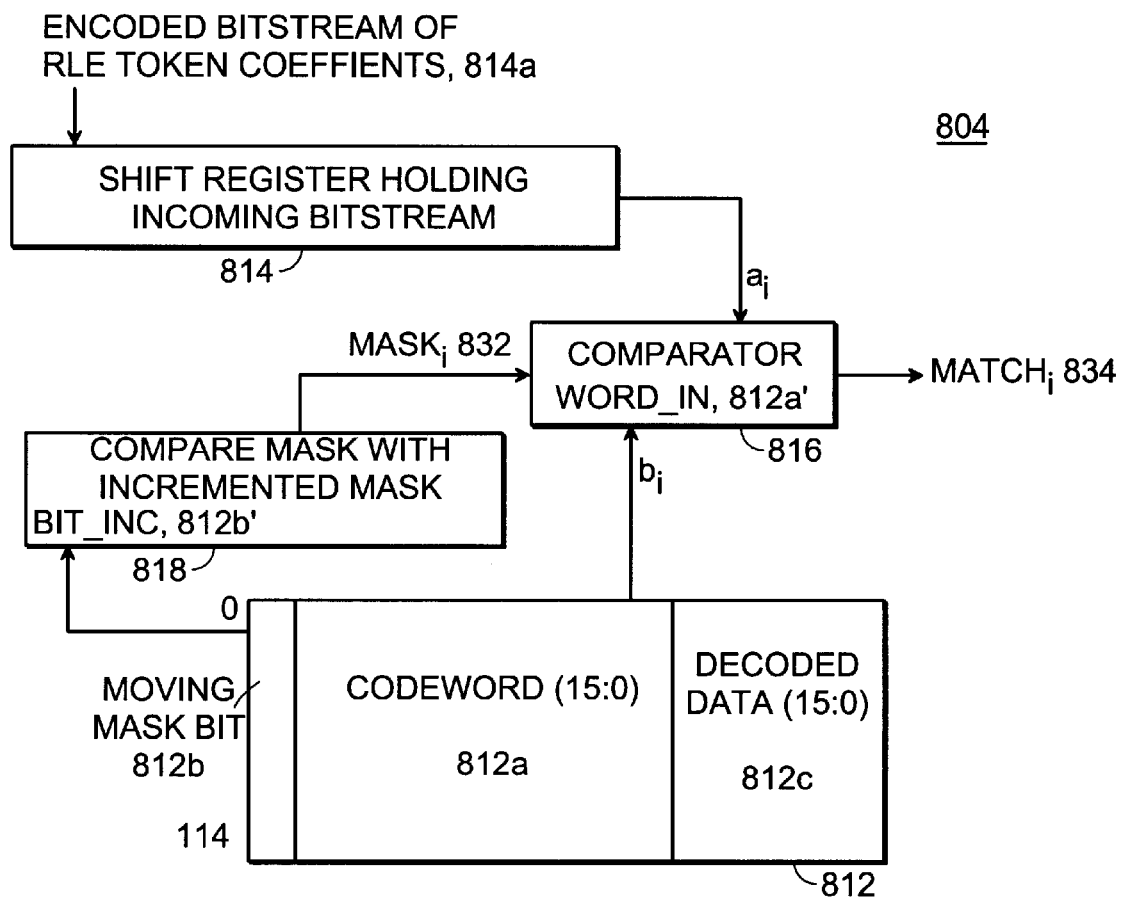
FIG. 38 is a detailed block diagram of a decoder portion of FIG. 2.

Referring now to FIG. 38, a variable length decoder 804 is shown to include a random accessible memory (RAM) table 812 which is situated in VCDU memory 35. The memory table 812 could be implemented with read-only memory (ROM). Table 812 is pre-loaded and stores all the possible matching codeword 812a, along with a moving mask bit 812b, and decoded data 812c. See also FIGS. 39 and 39a–39d. Also shown is a shift register 814, a comparator 816, and a compare mask with incremented mask 818.

The shift register 814 receives as input data, encoded run-level token (RLE) coefficients or any variable length encoded data, 814a. The encoded RLE token coefficients 814a may represent either a macroblock or block of pixel data. These encoded run-level tokens 814a are in a bitstream of "1s" and "0s". The function of the decoder 804 will be to translate the encoded bitstream 814a to run-level (RLE) tokens.

In the preferred embodiment, each of the possible matching codeword 812a comprise 16 bits or 2 words. The corresponding decoded data 812c reside at the same address as the matching codewords 812a in the RAM table 812 and at each of the addresses, the decoded data 812c comprises 16 bits, or 2 words. The moving mask bit 812b also resides at the same address as the codewords 812a in the RAM 812, but at each address, the moving mask bit 812b is just one bit long.

The moving mask bit 812b is utilized as a control, input bit_inc 812b', to the compare mask with incremented mask 818. Specifically, the moving mask bit 812b dictates how many bits should be compared using the comparator 816. The compare mask with incremented mask 818 acts as an incrementing shifter. The compare mask 818 is a group of flip-flops in a shift register with a "1" entering in the left most bit position and "0s" in all remaining positions. In the preferred embodiment, there are 15 flip-flops and not 16 flip-flops assuming there will not be a codeword detected with less than two bits including a sign bit, as will be discussed below in conjunction with FIGS. 39a–39d. This implementation is design-specific and an OR gate could be utilized in the design, though not described in the present invention, to discriminate between sign-bit and non-sign bit usage. The moving mask bit 812b line is tied to the enable of each of the flip-flops and hence, when the moving mask bit 812b is a "1" it pushes in a "1" into the compare mask 818 and a "1" in the left most bit position of the compare mask 818 shifts to the right by one bit. In this way, a contiguous number of "1s" are right-shifted through the compare mask 818 via the moving mask bit 812b, creating a mask for the number of bits in the bitstream 814a intended to be compared. When a match occurs at the output, match$_i$, of the comparator 816, the flip-flops in the compare mask 818 are reset to their initial condition with a "0" in every bit position and the input to the left most bit position being a "1", indicating that a new codeword 812 is being decoded.

Basically, the stream of encoded data 814a held in shift register 814 will be inputted to the comparator 816 and will be compared with the codeword data 812a which is inputted to the comparator 816 at word_in 812a'. The comparator 816 compares the bits from register 814 and the codeword data 812a to determine if there is a match, or if they are equivalent. If there is match, the corresponding decoded data 812c located at the same address in the RAM table 812 is found. The comparison process is repeated until the entire bitstream 814a has been decoded.

The decoder 804 function of the preferred embodiment is best explained by using the table data shown in FIGS. 39 and 39a–39d, where an example of a RAM table 812 is shown to include moving mask bit 812b data, codeword data 812a, and decoded data 812c. Codewords 812a are stored in the table 812 in monotonically increasing bit length order. That is, in the preferred embodiment, there may only be a single bit increase in match length from one codeword line to the next.

The incoming bitstream of encoded run-level token (RLE) coefficients 814a is "10 01010 001111 0001011 000001

00010100000101 10" as shown in FIG. 39 and will be inputted to shift register 814. Referring now to FIG. 39a–39d, a codeword table 812 is shown to include moving mask bits 812b, variable length codewords 812a, and decoded data 812c in terms of run and level tokens. Initially, the decoder 804 looks at the second codeword address in the codeword table 812 assuming that the bitstream data has not reached the end of block as indicated in decoded data 812c at the first address with corresponding codeword, "10". There is an exclusive-or (XOR) operation on the wordline logic controlling the first two addresses of table 812 to handle initial "begin" and "end of block" anomalies, since only one (ie. beginning a block decode) or the other (ie. end of a block decode), can occur, but not both. Thus, only after the first codeword lookup of the second codeword at the second address is completed, is the first codeword "10" at the first address compared with the bitstream data. In other words the sequence of the codeword as they will be stepped through will be to look at the second codeword first, then the first codeword and then at the third look up to skip over the second codeword to the third codeword. It should be noted that one skilled in the art may or may not wish to implement an exclusive-OR operation to initially skip the first "end of block" codeword table entry. The present implementation is highly dependent on the table 812 shown in FIGS. 39a–39d, and hence, other designs are possible which are highly dependent on other specified applications.

At the second address, the second codeword 812a, which is a "1s" as shown in the table in FIG. 39 will be compared via comparator 816 with the first two bits of the encoded bitstream 814a (which is, starting with the left most bit, "10". The "s" at the end of each codeword in table 812 denotes the sign of the level, "0" for positive and "1" for negative. For purposes of simplification in explanation of the decoding method, these "s" sign bits will be ignored or assumed as "don't cares". Thus, they will be assumed as "don't cares" when matching. In this example, we have a match in that "10"="1s", as the "1s" can be assumed to be a "10". Therefore, the corresponding decoded data 812c is denoted as the RLE token "0/1" or "0 plus 1" since the "s" bit was positive, as indicated in the table in FIG. 39a where the run is a "0" and the level is a "1". Thus, the first two bits of the encoded bitstream 814a have been decoded to "0/1".

Because two bits were decoded or "digested", the shift register 814 will shift out these two bits, having two less bits to decode. In order to decode the rest of the bitstream when a match occurs, as above, the shift register 814 having advanced or shifted to the next bits in the bitstream 814a awaits the comparison process to start over. That is, the search is reset to the first codeword in the table 812 in FIG. 39a, which is a "10". In this example, the next bits in shift register 814, left to right, are "01". The first moving mask bit 812b is a "0" indicating no increase in the bits compared, and hence, a compare operation by comparator 816 of two two-bit lengths, the bits "01" from the bitstream 814a and the first codeword 812a, which is a "10". The result of this comparison is that there is no match, since "10"≠"00". Thus, the two bits of the encoded bitstream 814a have not been decoded and thus the search must continue until a match is found.

In order to continue to decode the bitstream 814a when a match does not occur, the table 812 address advances, in this implementation, to the third wordline pointing to the third codeword 812a, which in this example in FIG. 39a "11s". The corresponding moving mask bit 812b for this codeword 812a is a "1" which indicates that the mask length for the comparison should be incremented by one, such that the compare is a three bit operation. Hence, the three bits of bitstream 814a which are compared are "01" from the previous compare operation, and the "0" in the next bit position, ie. "010". Thus, the three bits of bitstream "010" held in shift register 814 are compared with the three bits (two bits plus the sign bit) of the codeword 812a "11s". There is no match, since "010"≠"11s". Thus, the three bits of the encoded bitstream 814a have not been decoded and thus the search must continue to the next codeword 812a in table 812 until a match is found.

The table address advances one wordline to point to the next codeword 812a, which in this example in FIG. 39a is the fourth codeword 812a or "011s". The corresponding moving mask bit 812b for this codeword is a "1" which indicates that the mask length for the comparison should be incremented. This signifies that the compare will occur using the four bits of bitstream data, i.e., "0101". The comparator compares the four bits of bitstream "0101" with the two bits of the codeword 812a "011s" and once again there is no match.

Since there was no match, the table address advances one wordline to point to the next codeword 812a, which in this example in FIG. 39a is the fifth codeword or "0100s". The corresponding moving mask bit 812b for this codeword is a "1" which indicates that the mask length for the comparison should be incremented by one, such that the compare is now a five bit operation. Hence, the five bits of bitstream which are compared are "0101" from the previous compare operation, and the "0" in the next bit position of the bitstream, ie. "01010". Thus, the compare of the five bits of bitstream "01010" are compared with the bits of the codeword 812a "0100s" and once again, there is no match.

Since there was no match, the table address advances one wordline to point the next codeword 812a, which in this example in FIG. 39a is the sixth codeword or "0101s". The corresponding moving mask bit 812b for this codeword is a "0" which indicates that the mask length for the comparison should not be incremented by one, such that the compare is still a five bit operation. The five bits of bitstream data "01010" are compared with the sixth codeword, "0101s". There is a match since, assuming the "s" bit is a "don't care" for matching purposes. Therefore, the corresponding decoded data 812c is denoted as the RLE token "2/1" or "2 plus 1" since the "s" bit was positive, as indicated in the table in FIG. 39a where the run is a "0" and the level is a "1". Thus, the next five bits of the encoded bitstream 814a have been decoded to "2/1".

The shift register 814 will shift out the decoded or "digested" five bits, bits 2–6 in the bitstream 814a. In order to decode the rest of the bitstream when a match occurs, the search is reset to the first codeword in the table 812 in FIG. 39a which is a "10". In this example, the next two bits in shift register 814, left to right, are "00". There is no match between the first codeword "10" and the two bits "00".

Since there is no match, the table address advances one wordline to point to the next codeword 812a, which in this example in FIG. 39a is the third codeword or "11s". The corresponding moving mask bit 812b for this codeword is a "1" which indicates that the mask length for the comparison should be incremented by one, such that the compare is now a three bit operation. The three bits of bitstream data will be "001" and are compared with the third codeword, "11s" and once again there is no match.

Since there was no match, the table address advances one wordline to point to the next codeword 812a, which in this example in FIG. 39a is the fourth codeword 812a, which in this example in FIG. 39a is the fourth codeword or "011s". The corresponding moving mask bit 812b for this codeword is a "1" which indicates that the mask length for the comparison should be incremented by one, such that the compare is now a four bit operation. The four bits of bitstream data are now "0011" and are compared with the fourth codeword, "011s". Once again, there is no match.

Since there was no match, the table address advances one wordline to point to the next codeword 812a, which in this example in FIG. 39a is the fifth codeword or "0100s". The corresponding moving mask bit 812b for this codeword is a "1" which indicates that the mask length for the comparison should be incremented by one, such that the compare is now a five bit operation. The five bits of bitstream data are now "00111" and are compared with the sixth codeword, "0100s". Once again, there is no match.

This process of advancing through the table and incrementing the compare mask length based on the moving mask bit value continues until finally there is a match at the eighth codeword, or "00111s". The corresponding decoded data 812c at the eighth word address as indicated in the table in FIG. 39a is a run of three, and a level of 1, "3/1" or "3 minus 1" since the "s" sign bit is negative.

Thus, the seventh through the twelfth bits of the encoded bitstream 814a have been decoded. The shift register 814 therefore shifts right six bits to begin decoding of the rest of the bitstream 814a. Similarly, bits 13 through 19 of the bitstream data 814a will be decoded at the twelfth word address as a run of six, and a level of 1, "6/1", or "6 minus 1" since the "s" sign bit is negative.

The compare and search functions above are repeated for the remaining bits of the bitstream data until codeword matches are found for the entire encoded bitstream.

According to FIG. 39a, if the fourteenth codeword "0000 01" is reached in the codeword table 812, the decode is indicated as ESCAPE. The ESCAPE sequence, though not common, signifies that the decoder 20 will extract the run and level tokens directly and exactly from the bitstream 814a, where "run" is a 6 bit-field and where "level" is an 8 bit-field. In this example, bits 20 through 25 are "0000 01" and thus would match with the 14$^{th}$ codeword according to the comparison process described above. This sequence is decoded as an ESCAPE which indicates that the next 6 units in the bitstream data 814a, bits 26 through 31, represent "run" data, and the subsequent eight bits, bits 32 through 39, represent "level" data. In this case, a run of "000101" translates to a decimal "5", and a level of "0000 0101" translates to a decimal "9", thus decoded data 812c for this ESCAPE sequence would be a "5/9".

The shift register 814 will shift out the decoded or "digested" bits, all of bits 20 through 39 in the bitstream data 814a to reset to the first codeword in the table 812 in FIG. 39a, which is a "10". Bits 40 and 41 of bitstream data 814a are "10" and hence there is a match with the first codeword in the table 812. The corresponding decoded data 812c is "END OF BLOCK" which, as mentioned earlier, indicates that the end of the bitstream data 814a in the shift register has been reached.

Thus, in this example the resulting decoded data 812c for the bitstream "10 01010 001111 0001011 000001 00010100000101 10", would be 0/1, 2/1, 3/1, 6/1, (ESCAPE) 5/9, "END OF BLOCK".

If all the codewords 812a in table 812 in FIG. 39a–39d have been searched and no match resulted, an illegal bitstream has been encountered and is invalid.

Figure 38A:
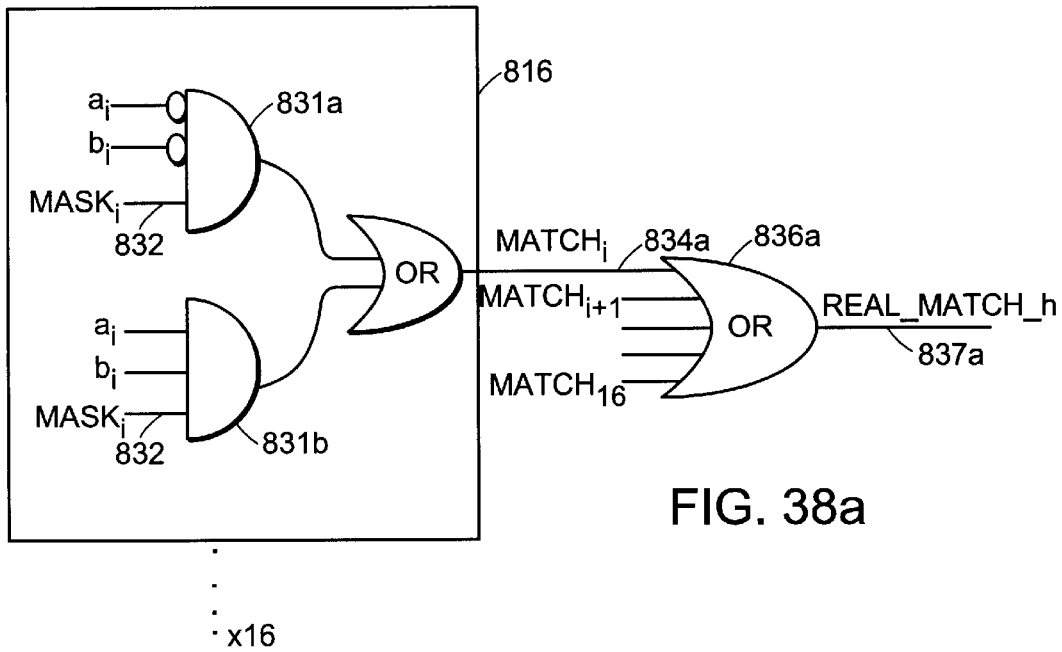
FIG. 38a is a detailed logic diagram of a comparator in FIG. 38.

A detailed logic diagram of the comparator 816 in FIG. 38 is shown in FIG. 38a depicting logic elements utilized in a present implementation for a bit-wise comparison. As shown in FIG. 38a, the inverses of bit $a_i$, and bit $b_i$, coming from the codeword 812a of FIG. 38, are AND'ed with the mask$_i$ signal 832a, coming from the compare mask register 818, via AND gate 831a. Similarly, via AND gate 831b, bit $a_i$ and $b_i$, coming from the codeword 812a of FIG. 38, are AND'ed with the mask$_i$ signal 832a, coming from the compare mask register 818. Both AND gate results are then OR'ed to produce the resulting match$_i$ 834a signal. An end result match$_i$ 834a value of "1" indicates there has been a match of bits $a_i$ and $b_i$ and the bit comparison is enabled. The bitwise comparison is logically repeated 16 times for all 16 bits of the bitstream data 814a. All 16 outputs will be OR'ed via OR gate 836a and a real_match_h 837a output is obtained when there has been a match of the enabled bits of the bitstream 814a with the corresponding codeword data 812a.

Figure 38B:
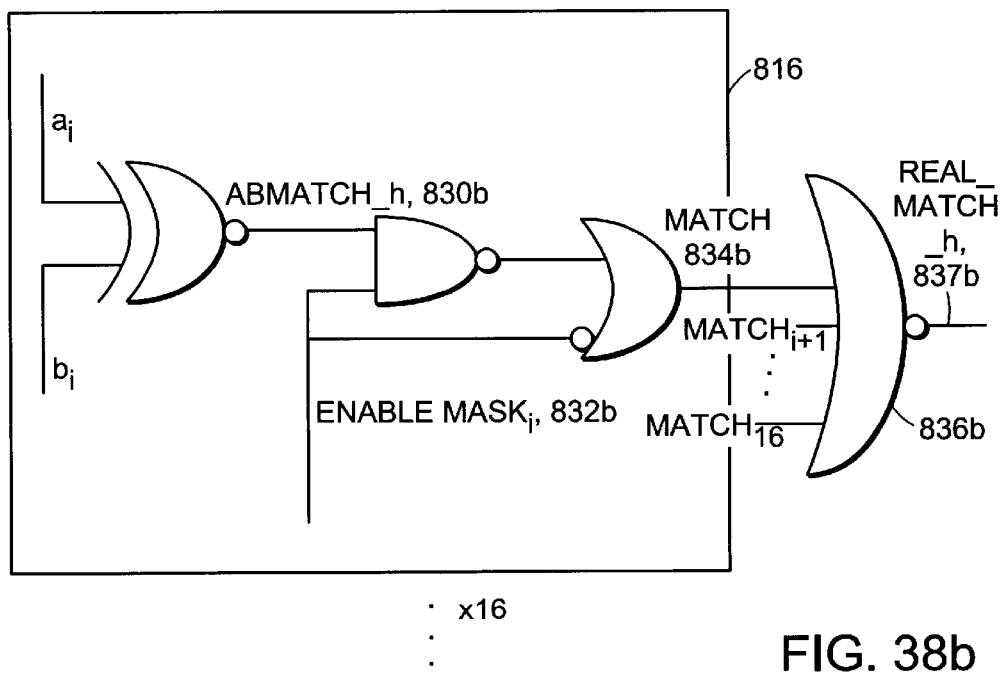
FIG. 38b is an alternate detailed logic diagram of a comparator in FIG. 38.

An alternate comparator design is depicted in FIG. 38b. As shown in FIG. 38b, bit $a_i$, coming from the bitstream 814a of FIG. 38, and bit $b_i$, coming from the codeword 812a of FIG. 38, are exclusive-NOR'ed producing a signal abmatch_h 830b. This latter signal 830b will be a "1" if the two bits, $a_i$ and $b_i$ are the same value. As shown in the figure abmatch_h 830b is then NAND'ed with the mask$_i$ signal 832b, coming from the compare mask register 818. An end result match$_i$ 834b value of "1" indicates there has been a match of bits $a_i$ and $b_i$ and the bit comparison is enabled. This bitwise comparison is logically repeated 16 times for all 16 bits of the bitstream data 814a. All 16 outputs will be NOR'ed via NOR gate 836b and a real_match_h 837b output is obtained when there has been a match of the enabled bits of the bitstream 814a with the corresponding codeword data 812a.

Though several other possible logic designs providing methods of comparing can be implemented, the bitwise comparator of FIG. 38a is the preferred implementation of the present invention providing fewer logic levels and less costly logic components.

For the majority of the decoder operations, the bulk of table searches occur in the first fifteen to twenty addresses.

It is important to note that the search is non-deterministic in terms of completion time, but a worst case search time would be every search requiring a complete table search. The table search is dependent on the number of codeword stored in the table. However, in the preferred embodiment, the Huffman code property of storing the shortest, most common codes at the top of the table as shown in FIG. 39a–39d is taken advantage of with this design. That is, the search rate is dependent upon the information content across all codeword or the entropy of the codeword, roughly according to equation 11.

$$\text{entropy} = h = \sum_{x_1=1}^{112} P(x_i) \log_2(x_i)$$

where $P(x_i)$ represents the probability of codeword $x_i$ and where $\log_2(x_i)$ represents the length of the codeword.

The probability of codeword $x_i$ occurring, $P(x_i)$ is inversely dependent on the amount of information in the bitstream. The $\log_2(x_i)$ function roughly represents how deep into the codeword table the search has to go in order to find a match and how many bits there are in the codeword. For instance, if the codeword table had three entries in it, and a one codeword deep search (ie. the first entry) occurred 50% of the time, and a two or three codeword search (ie. the second and third entries) occurred 25% of the time, respectively, the average search rate would be determined according to the equation 11 above. The table below shows the values that will be inserted into equation 11.

| $P(x_i)$ | $\log_2(x_i)$ |
|---|---|
| 1/2 | 1 |
| 1/4 | 2 |
| 1/4 | 3 |

Thus, the average search rate will be:

$h=1/2(1)+1/4(2)+1/4(3)=1\ 3/4$.

This Huffman coding design takes advantage of the fact that the more often occurring codewords will be decoded first because of their order as loaded into the table.

Figure 40:
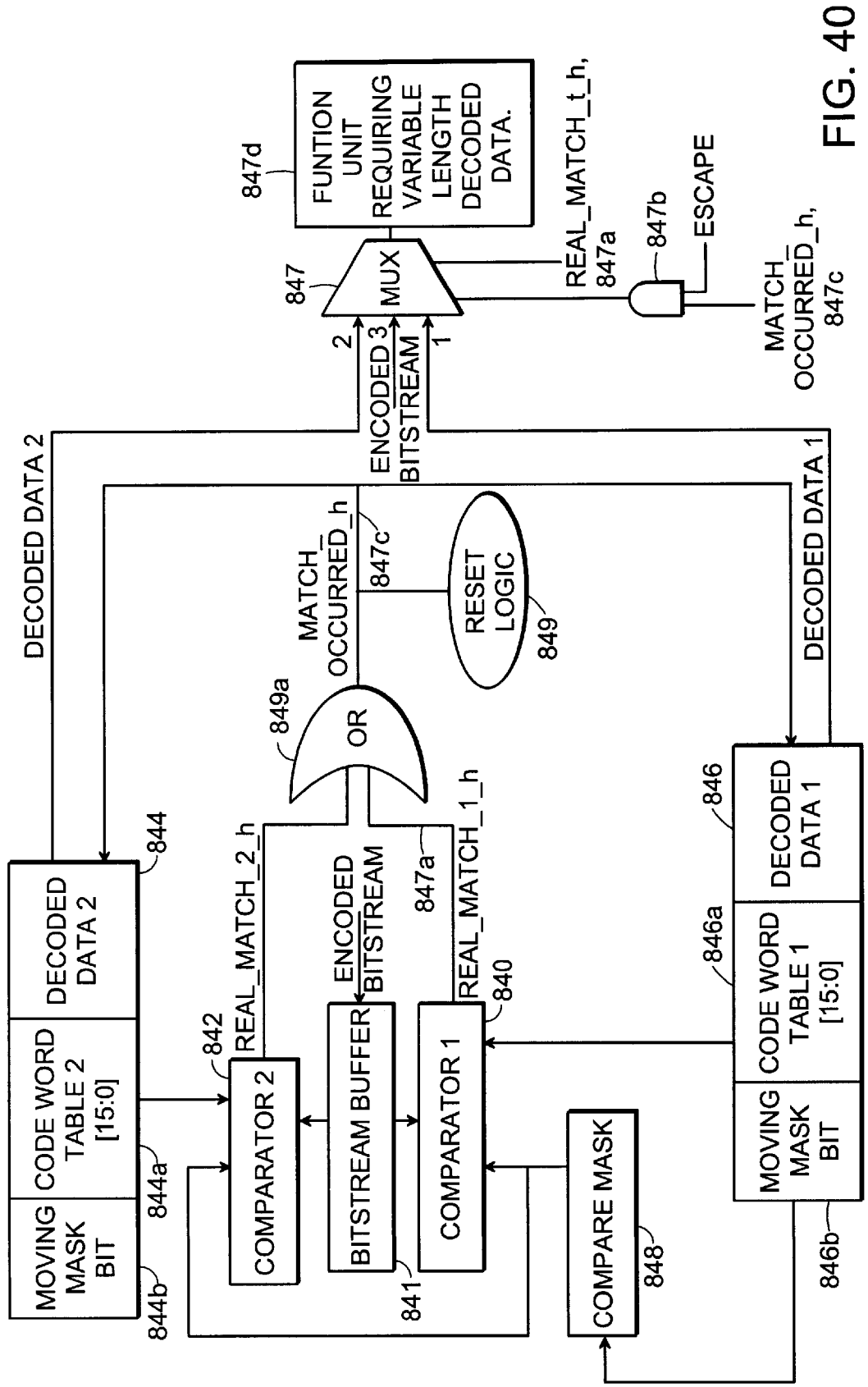
FIG. 40 is an alternate embodiment of the variable length decoder of FIG. 38 using a pair codeword tables and one compare mask.

An alternate embodiment of the present invention, shown in FIG. 40, further refines the invention shown in FIG. 38 to include two independent cooperators 840 and 842 searching two parallel tables 844 and 846, each roughly half the depth of the single table 812 of FIG. 38 and FIG. 39*a*–39*d*, while still having only one moving mask bitfield. The moving mask bitfield 844*b* and 846*b* of table 844 and table 846, respectively, are identical. There is only one compare mask 848 which controls the masking for the bitstream data buffer 841 when used for comparing with both tables 844 and 846. The cooperators 840 and 842 control the advance of the bitstream data buffer 841 in a similar fashion as that described in detail with respect to FIG. 38, in that when a match occurs, the decoded matched bits can be shifted out of the bitstream data buffer 841 for the next codeword look-up. The codeword tables 844*a* and 846*a* are not identical and must be "padded" in order to advance at exactly the same rate relative to the moving mask bits. This "padding" duplicates certain codewords in 844*a* and 846*a* when the moving mask bit is about to be asserted. When there is a match, or a "hit" occurs, as indicated at the output of the OR gate shown, a reset is forced. Reset logic 849 includes logic where a state machine is used to step through the codewords 844*a* and 846*a* until a match occurs or where an escape code is implemented. The output decoded from the encoded bitstream is sent to a function unit 847*d* requiring variable length decoded data, but first it must be determined which of decoded data 1 or 2 from tables 846 or 844 contains the data corresponding to a codeword match. A multiplexer 847 provides this selection function based on two select inputs. The first select input, real_match_1_h 847*a* is tied to the signal at the output of comparator 1, 840. The second select input is the output provided via AND gate 847*b* which represents the AND product of the signal match_occurred_h, 847*c* found at the output of OR gate 849*a* and an escape signal decoded from either of codeword tables 844 or 846. Thus, multiplexer 847 provides for a selection of either of the decoded data from whichever of the codeword tables 844 or 846 is selected. Multiplexer 847 also profiles for a selection of the encoded bitstream where an ESCAPE sequence is decoded, as discussed above in conjunction with FIG. 39*a*.

Figure 40A:
FIG. 40a is an example of a decomposition of a pair of codeword tables as shown in FIG. 40.

Referring now to FIG. 40*a*, an example of the structure of a portion 843 of an original codeword table 812 of FIG. 38 is shown with the decomposed two new portions 844' and 846' of codeword tables 844 and 846 of FIG. 40 having identical moving mask bits. In order to split the original codeword table portion 843 into two parts, there must be an even number of codeword entries of a certain bit length n.

A closer inspection of example codeword table portion 843 indicates that for the first codeword "01" of bit length n=2, there is only one entry, one being an odd number. Further, for the codewords in codeword table portion 843 of length n=3, "101", "100", and "110", there are three entries, three being an odd number as well. Thus, one of these entries will be repeated or duplicated in one of the new tables 846' and 844' such that an even decode can occur and the moving mask bits 844*b*' and 846*b*' can be identical. For instance, in order for the first moving mask bit to be identical, both codeword tables 844' and 846' must have as a first entry the codeword "01". Two different codewords, "100" and "101" at the second addresses of the respective tables, 844' and 846', decrease the search time, asymptotically approaching the factor of two (2). Similarly, two different codewords, "100" and "110" at the third addresses of the respective tables, 844' and 846', decrease the search table time. By decomposing in this fashion, an "even" table 844' and an "odd" table 846' can be viewed as having been formed.

This one-mask embodiment in FIG. 40 would roughly double the speed in terms of search depth since the parallel tables 844 and 846 are each only roughly half as deep as table 812 in FIG. 38, as well as matching the more often occurring codewords in tables 844*a* and 846*a* twice as fast. Furthermore, this design provides a simple, regular, low-cost (ie. the cost of one additional comparator) design.

Figure 41:
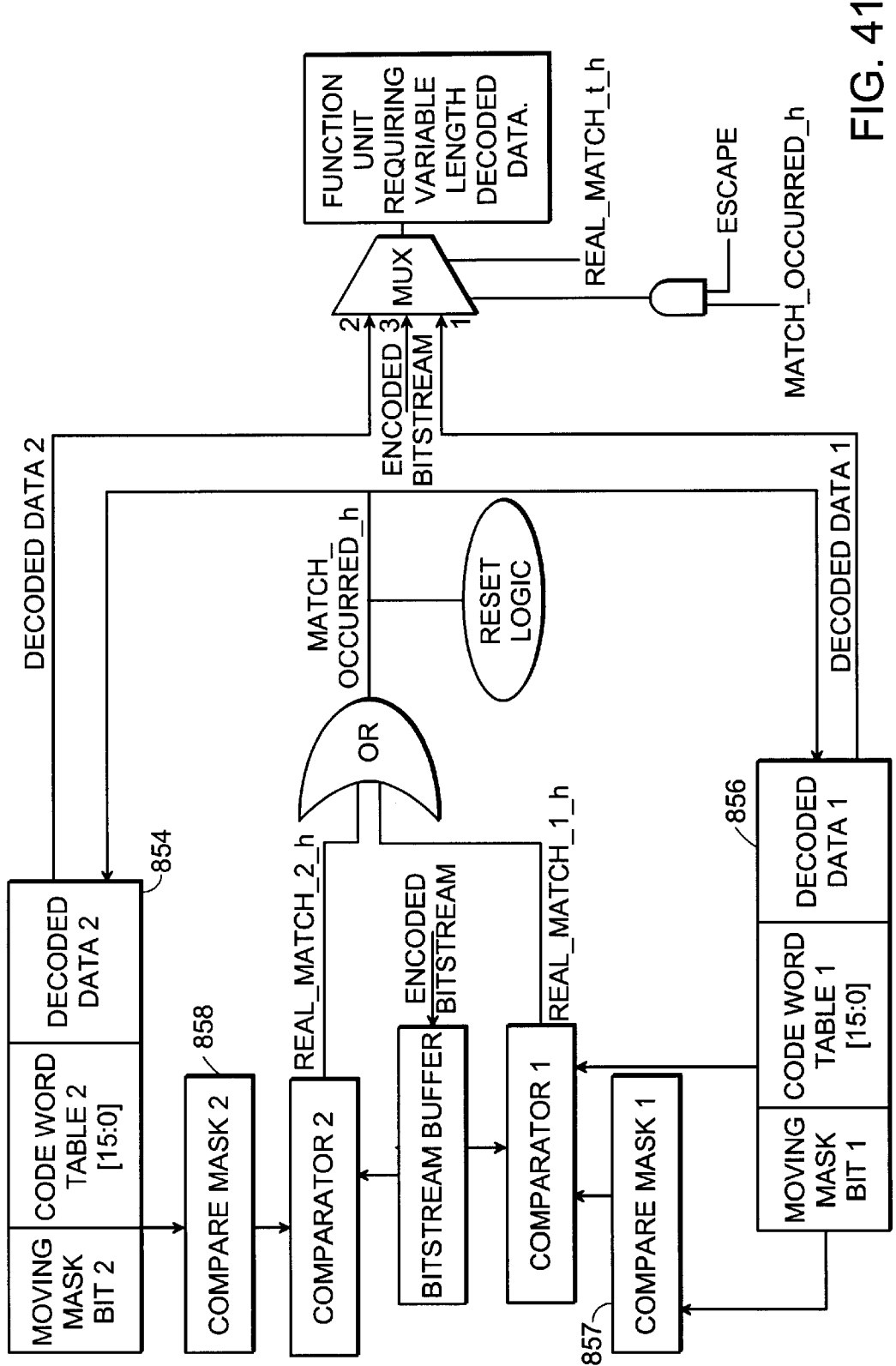
FIG. 41 is another alternate embodiment of the variable length decoder of FIG. 38.

Another alternate embodiment of the present invention, shown in FIG. 41 and is very similar to FIG. 40, except that it includes two compare mask registers 857 and 858. Thus, this two-mask design can handle more densely packed, or less "padded" codeword tables 854 and 856, since, with two masks there is no need to advance at exactly the same rate through the codeword tables 854 and 856. This design allows either more codewords in the same table area due to the elimination of "padding" or reduces the size of the codeword table, but may be a bit more complex than that of FIG. 40 as the reset logic will likely be more complicated. Furthermore, this design does not require much redesigning of FIG. 38 as it is essentially two one-mask designs duplicated.

XIII. Interleaving and D-Intreleaving Data Transferred Over the PCI Bus

Figure 42:
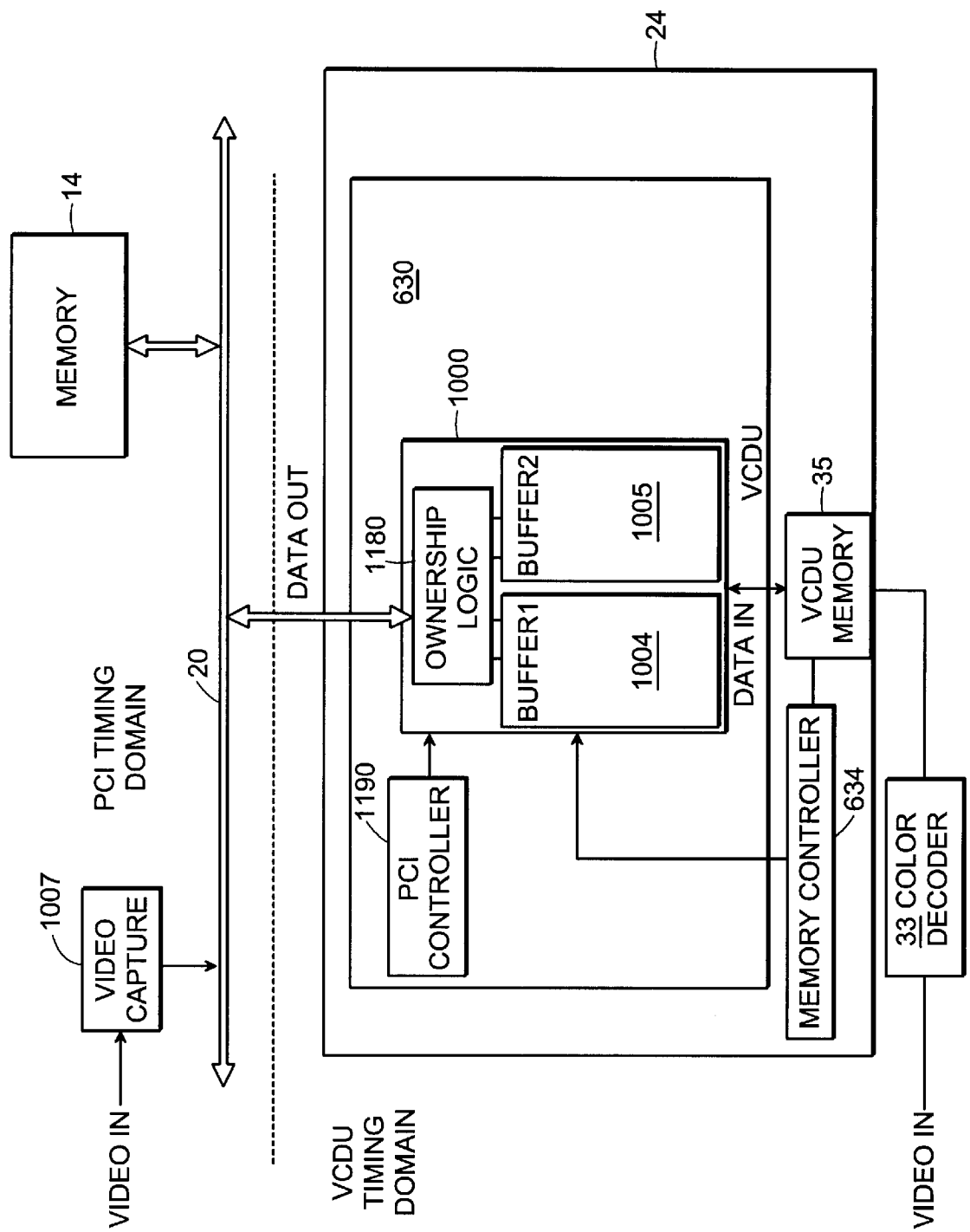
FIG. 42 is an exploded diagram of the PCI controller logic of FIG. 28.

Referring now to FIG. 42, an expanded diagram of the PCI interface 630 of the VCDU is shown to include double buffer 1000. The double buffer 1000 includes a first buffer, buffer1 1004 and a second buffer, buffer2 1005. Data may be fed to the double buffer 1000 from either VCDU memory 35 (which receives frame input data from color decoder 33), or from the PCI bus 20. As such, the double buffer receives input control signals from memory controller 634 and PCI controller 1190.

As described previously, color decoder 33 decodes incoming video data into YUV data. The YUV data is fed to the decimate and filter unit 42 (FIG. 3) as described previously, and stored in VCDU memory for compression purposes. The YUV data may also be forwarded from VCDU memory to host memory 14, for transfer to the graphics controller 26 for display on the CRT 28 (FIG. 2) or other multimedia device.

Note also that FIG. 42 includes a video capture unit 1007. The video capture unit may be a USB video capture unit, for capturing digital data from USB digital camera. It is also envisioned that the double buffer logic 1000 and associated control logic could reside in the video capture unit 1007 for providing an optimized interface to PCI bus 20. In fact, the advantages of the present invention may be utilized in any peripheral device coupled to an internal, host bus, as will be described.

The dashed line in FIG. 42 indicates the demarcation between the timing domain of the VCDU and that of the PCI/host computer system. As mentioned previously, since both the VCDU and the PCI bus operate according to different timing requirements, synchronization of data transfers between the two domains must be provided in order to ensure coherent data transfer.

As described above, video data is received in interleaved 4:2:2 format, and translated into 4:2:0 format by the decimate and filter unit for use by the VCDU. Interleaved 4:2:2 format includes 4 bytes of luminance information for every 2 pairs of chrominance (Cr and Cb) color information. The data is stored in planar format; i.e. blocks of Y, Cr and Cb data, in VCDU memory for use by the VCDU.

The planar data may need to be transferred to other multi-media devices coupled to the PCI. If so, the other devices expect to receive the data in interleaved format. As such, the data must be translated from planar format to interleaved format for transfer over the PCI bus.

Figure 43A:
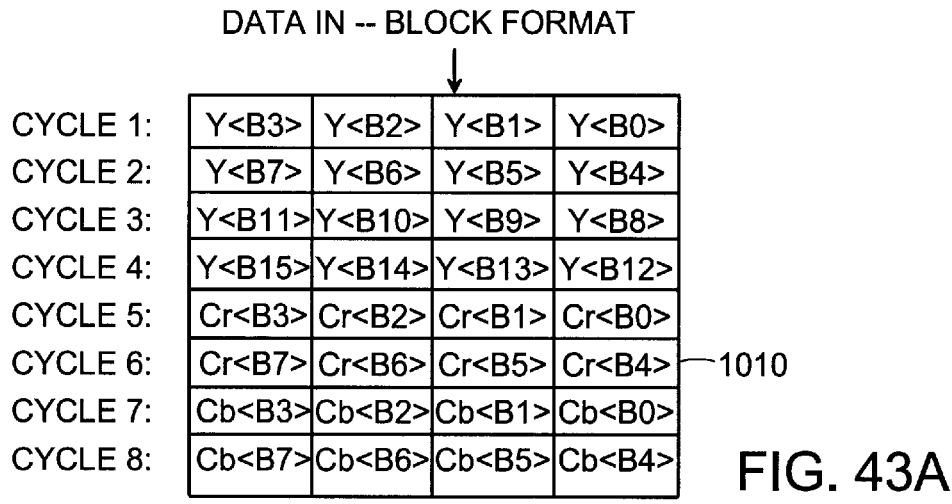
FIGS. 43a–43c is a series of diagrams illustrating the layout of data forwarded over the PCI bus to buffers in the PCI controller of FIG. 42.
Figure 43B:
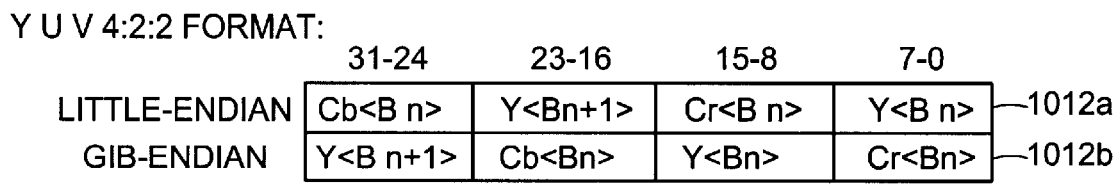

Referring now to FIG. 43A, one block of planar format input data 1010 is shown. The block of data includes 64 bits of Y data, 32 bits of Cr data, and 32 bits of Cb data. Each byte of the input data is designated as <Bn>, with 'n' indicating the byte number of data input at that input bus byte position. This data block must be converted into the universal standard for PCI multimedia transfer of 4:2:2 interleaved format, in order to be compliant with multimedia devices coupled to the PCI bus. As shown in FIG. 43B interleaved, 4:2:2 format provides that two pixels of luminance 'Y' data are interleaved with one pixel each of chrominance 'Cr' and 'Cb' data within a longword. Interleaved 4:2:2 format may be required in little endian form 1012a, or in GIB endian form 1012b, depending upon the requirements of the coupled peripheral multimedia device.

Figure 43C:
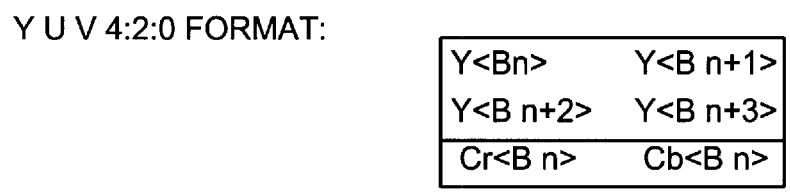

As mentioned previously, the data that is fed to the VCDU by the decimation and filter unit is interleaved 4:2:0 format, shown in FIG. 43C, in which four pixels of luminance data share one byte each of Cr and Cb data.

Therefore the input data, in block YUV format, must be translated into interleaved 4:2:2 format (either little endian or GIB endian) for transfer to multimedia devices coupled to the PCI bus. The present invention provides a method and apparatus for providing data conversion from block format to interleaved format while eliminating the prior art performance disadvantages incurred during synchronization by providing a double buffer design, where each of the buffers includes byte rotate logic on the input and output ports for providing the appropriate output conversion format.

XIV.) Format Conversion: Interleaving Block Format Input Data

Figure 44:
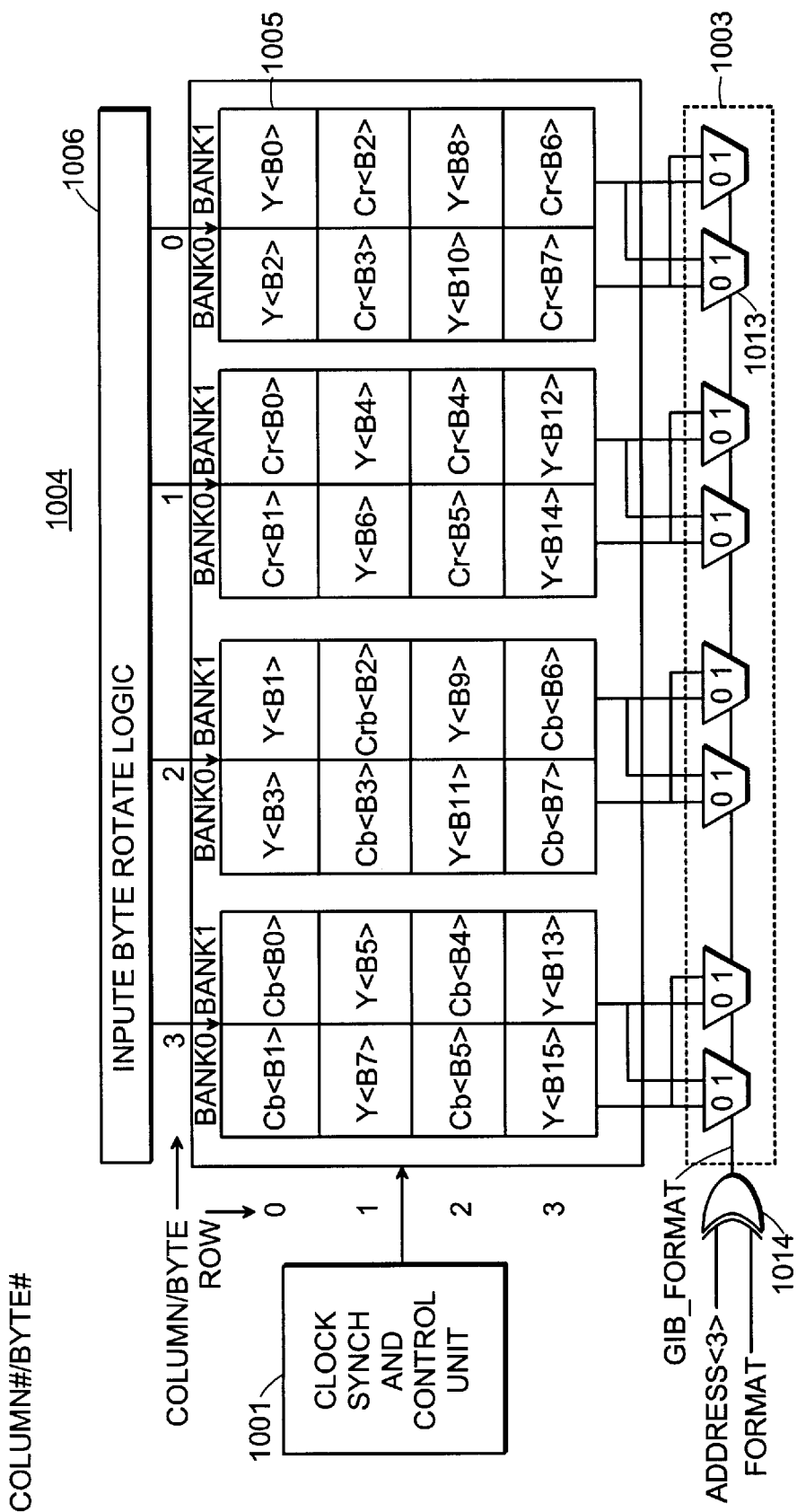
FIG. 44 is a block diagram of one of the buffers of FIG. 42.

According to one aspect of the invention, performance is enhanced by performing data conversion 'on the fly' as the data is written into the buffers. This conversion process is accomplished via the input byte rotate logic 1006 (FIG. 44) and the output byte rotate logic 1003 (FIG. 44). By appropriately 'rotating' the bytes as they are input, the Y, Cr and Cb data may be placed in the appropriate buffer location such that, when they are read out, they may be read out in 4:2:2 interleaved little endian or GIB endian format. The output byte rotate logic facilitates the selection of either the little endian or GIB endian format.

For example, referring now to FIG. 44, a conceptual view of one of the buffers, buffer1 1004 is shown. It should be understood that buffer2 is substantially identical to buffer1 and will therefore not be described in detail herein. Each buffer includes a 256×8 RAM storage array 1005. Each array 1005 comprises 4 rows of a quadword of data. Each row comprises 3 wordlines; one each for accessing Y, Cr and Cb data. The buffer is a 2 write port, one read port memory device. The buffer memory is apportioned into an even bank (Bank0) and an odd bank (Bank1). The buffer additionally includes an input rotate stage 1006 and output byte rotate logic 1003. Each rotate stage allows for receive bytes to be placed in appropriate locations of the bus to enable bytes to be written to or read from array 1005 in a desired format. The array 1005 and input and output rotate stage 1003 receive control inp9ut from clock synch and control unit 1001.

The buffer arrangement provides a number of advantages. Because the memory is double banked, and because there are two write ports, 4 bytes of data can be written during each buffer write transaction. Thus, the assertion of the appropriate row address and column addresses will cause the bytes to be written to the desired location. As a result, each longword of the block format data may be written to the buffer as it is received, without any added delay or buffering.

For example, as shown in FIG. 43A, during cycle 1, the first longword of input data, Y<31:0> is received at the PCI interface of the VCDU. The results of the write during cycle 1 are shown bolded in FIG. 44. By asserting the 'Y' wordline for row 0 and the column 0 address, bytes Y<B0> and Y<B2> can each be written to the first byte position (Byte 0) of each bank. Similarly, by asserting the 'Y' wordline for row 0 and the column 2 address, bytes Y<B1> and Y<B3> will be written to the third byte position (byte 2) of each bank. The same arrangement applies to the Cr and Cb longwords. As they are received, the appropriate wordline for the row, and the column addresses are asserted to write the bytes to the desired locations. For example, the destination of the cycle 8 write of Cb data is also shown bolded in FIG. 44.

Accordingly, FIG. 44 illustrates the destination storage locations for each of the bytes of block data input to the buffer. Note that the format of stored data alternates from row to row. In row 0, the data is stored in little endian format, while in row 1 the data is stored in GIB endian format. Such an arrangement allows for quick retrieval of video data in either format using only a minimal amount of logic.

For purposes of explanation, the output byte rotate logic 1003 is shown to conceptually include a bank of muxes 1013, with a pair of muxes for each pair of columns. The select for each multiplexer is driven by an exclusive OR 1014 of the least significant bit of the byte address of the row and a FORMAT bit (which indicates that the data is to be fed out in GIB endian format), to provide a signal GIB_FORMAT. When the GIB_FORMAT bit is set, and the row address bit is a 0, the effect will be to swap the byte values in the column pair to provide GIB endian format data. However, if the row address bit is a 1, then the data is already in GIB format, and no swapping need be performed. Similarly, if the GIB_FORMAT bit is not set, then 'even' numbered rows will flow through without swapping, while 'odd' numbered row outputs will be swapped to provide little endian format data.

Figure 45:
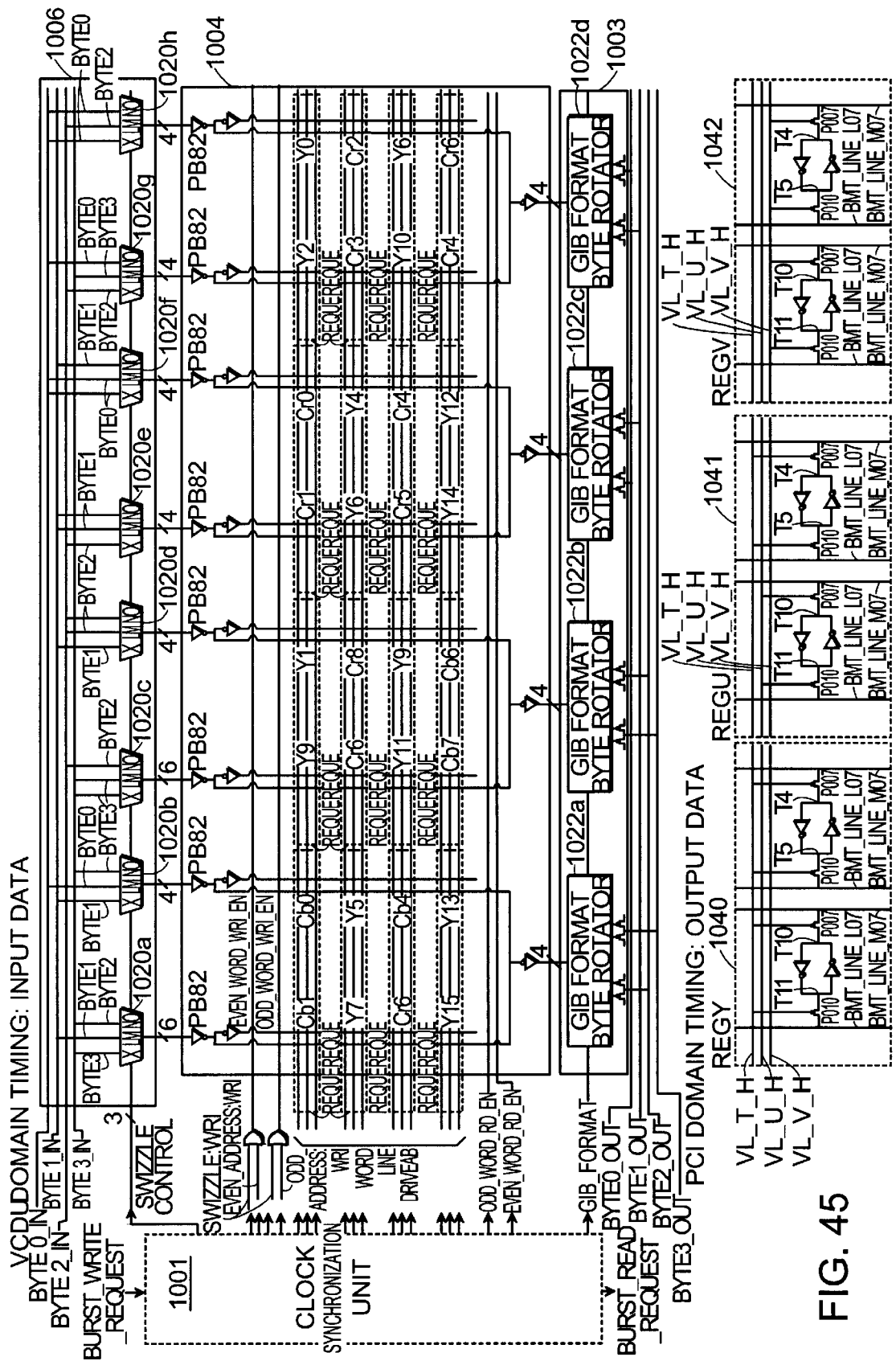
FIG. 45 is a schematic diagram of the buffer of FIG. 44.

Referring now to FIG. 45, a schematic diagram illustrating one embodiment of buffer 1004 is provided. Thus, in accordance with FIG. 44, writes to Y<B0> and Y<B1> will be asserted when there are writes to 'odd' banks, and writes to Y<B2> and Y<B3> will occur for writes to 'even' banks.

The input byte rotate logic 1006 is shown in more detail to include a group of multiplexers 1020a–1020h, for selecting the appropriate byte from the input data longword to be selected for writing to the desired cell of a RAM storage buffer 1004. As mentioned above, the RAM storage array comprises 256×8 memory storage locations, apportioned into 4 rows of 4 cells of data, where each cell is double banked. The configurations of the three types of double banked cells are shown as double-banked cell Y 1040, double-banked cell Cr 1041, and double-banked cell Cb 1042.

Coupled to the RAM storage buffer 1004 is output byte rotate logic 1003, which controls the presentation of the output data as either little endian, GIB endian. Output byte rotate logic includes, for each byte of the output data, a GIB rotator 1022a–1022d, respectively, coupled via a pair of series coupled transistors to the associated pair of output bytes (either C or Y, depending upon the format). It should be noted that the invention also allows for the data to be stored and retrieved in input block format by simply selecting the flow through path of the rotate logic blocks 1003 and 1006.

The control of the input rotate logic, the output rotate logic and the RAM array is performed by clock synchronization and control unit 1001. The clock synchronization unit receives as input a Burst Write Request from the VCDU (or other controlling peripheral device). It also generates a 'Burst Read Request' when read data is being returned from main memory to the VCDU.

During operation, input rotate logic 1003 performs byte rotation of the input longword. Each input to each column of the buffer is fed via one of the 3:1 multiplexers 1020a–1020h. The select for the 3:1 multiplexer is driven by a signal Swizzle Control <2.0>, provided by a clock synchronization unit 1001. The select will vary depending upon what type of pixel data is being driven (Y or U/V) and an indication of whether conversion is to be performed. For example, if luminance 'Y' data is being driven in cycle 0, then the swizzle value will be a '0', causing byte 0 to be selected for the Y<0> byte, byte 1 to be selected for the Y<1>, etc.

Once the data is stored, when it is ready to be forwarded over the PCI interface, the clock synchronization logic asserts the Burst Read request. Depending upon whether an even or an odd bank is being accessed, either 'Odd_word_rd_en' or 'Even_word_rd_en' will be asserted, causing the associated transistors to be enabled to forward the cell contents to the output rotate logic 1003. Depending upon the format of the data required by the PCI multimedia environment and upon the row being addressed, a signal GIB_FORMAT will be asserted. The signal Gib Format reflects the value of a register (not shown) in the PCI interface logic that is written with the expected format of the data by the multimedia device.

Thus the conversion of data from input, block format to YUV 4:2:2 format is implemented using a minimum of hardware complexity. Because the CPU is not required to perform real-time format conversion on a per-pixel basis, CPU performance is improved. This allows for more efficient scheduling of the processor's compute resources. In addition, a higher bandwidth can be achieved because the overall data bandwidth of a software solution can easily be limited by the processing capability of the CPU. Performing this function in hardware eliminates the relatively slow CPU bottleneck.

The above method can further be augmented to provide conversion and synchronization between two devices operating in different clocking by using two buffers having the above described design.

XV.) Double Buffer Operation

Referring back briefly to FIG. 42, according to a second aspect of the invention, double buffer 1000 provides the solution to the synchronization problem by allowing each of the buffers to be independently controlled by either logic in the PCI domain or logic in the VCDU domain as required. When video data is being fed into the VCDU, one of the buffers, buffer1 for example, may be used to store the incoming data. When buffer1 is full, control logic signals the PCI buffer that the data buffer1 is available, and the PCI logic is able to read buffer1 contents. At the same time that the PCI logic is reading the buffer1 contents, the VCDU may be writing incoming data to buffer2. When buffer2 is full, the PCI unit may retrieve data from buffer2. By alternating the control of the buffers as they are filled, and as they are exhausted, maximum data throughput may be achieved with a minimum of hardware.

Figure 46:
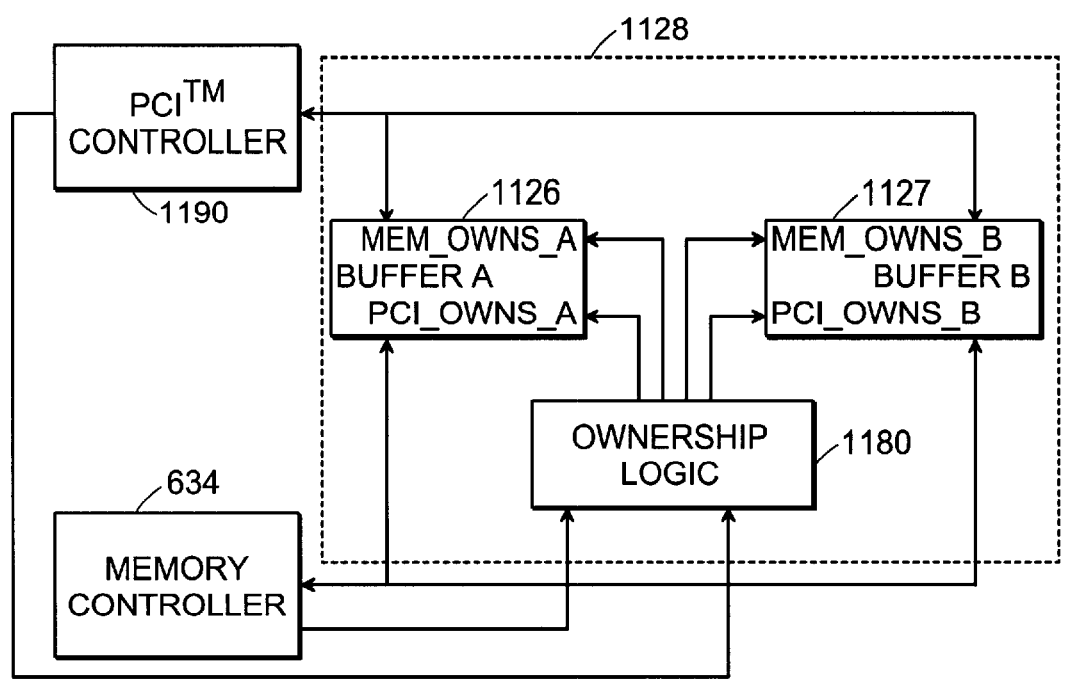
FIG. 46 is a block diagram illustrating the control paths for the buffers of FIG. 44.

Referring now to FIG. 46, a more detailed block diagram of the inter-relationship between the double buffers and the PCI and VCDU logic is provided as described above each of these buffers, 1004 and 1005, stores eight longwords of data sent from VCDU memory 35 via memory controller 634 (FIG. 28) for transfer over the PCI™ bus using DMA. The buffers are further capable of buffering data received from the PCI™ bus 20 to be passed to memory controller 634. The double buffer configuration enables continuous transfer of data between the PCI™ bus 20 VCDU memory, and hence increases the amount of data that the PCI™ controller can transfer during a given DMA data transfer.

Referring now to FIG. 46, a block diagram is shown depicting the configuration of the double buffer unit 1000. Ownership logic 1180 is also shown receiving inputs from PCI™ Control logic 1190 and the Memory Controller 634 that are used to determine the ownership of each buffer, 1004 and 1005.

A first aspect of the double buffer unit 1000 is that a first buffer 1004 is written to while a second buffer 1005 is being read from, thereby eliminating the latency caused by having only a single buffer. In the case of DMA reads from memory system 14, the memory controller 634 reads data out of a first buffer 1004 while the PCI ™ controller 1190 writes data into the second buffer 1005. It should be noted that buffers 1004 and 1005 are interchangeable and therefore either buffer could be owned by the PCT™ bus 20 or the memory controller 646.

In the DMA write case where VCDU is writing data to the PCI bus, ownership logic 1180 determines that memory controller 634 should acquire ownership of a first data buffer 1004 for data writes at the same time that the PCI™ controller 1190 acquires ownership of a second buffer 1005 for reads. When either the memory controller is finished writing to the first data buffer 1004, or when the PCI™ controller is finished transferring the contents of the second buffer 1005 to the PCI™ bus, ownership logic 1180 specifies that ownership of that buffer is to be exchanged. When ownership of both buffers has been exchanged, the PCI™ controller thereafter transfers data out of the first buffer 1004 and the memory controller writes data into the second buffer 1005.

It should be noted that because buffer ownership may not always be synchronously exchanged, it is possible for both buffers to be owned by either memory controller 634 or by PCI™ controller 1190. For example the ownership of both buffers is given to PCI™ bus 20 at the beginning of a DMA read operation since that is where all the write data originates for purposes of the data transfer to memory controller

634. When one buffer is filled with read data, ownership of that buffer is exchanged and memory controller 634 can empty it while the other buffer is being filled. Likewise, at the beginning of a DMA write operation, ownership of both buffers is given to memory controller 634 since that is where all the write data originates, for purposes of the data transfer to PCI™ bus 20.

Figure 47:
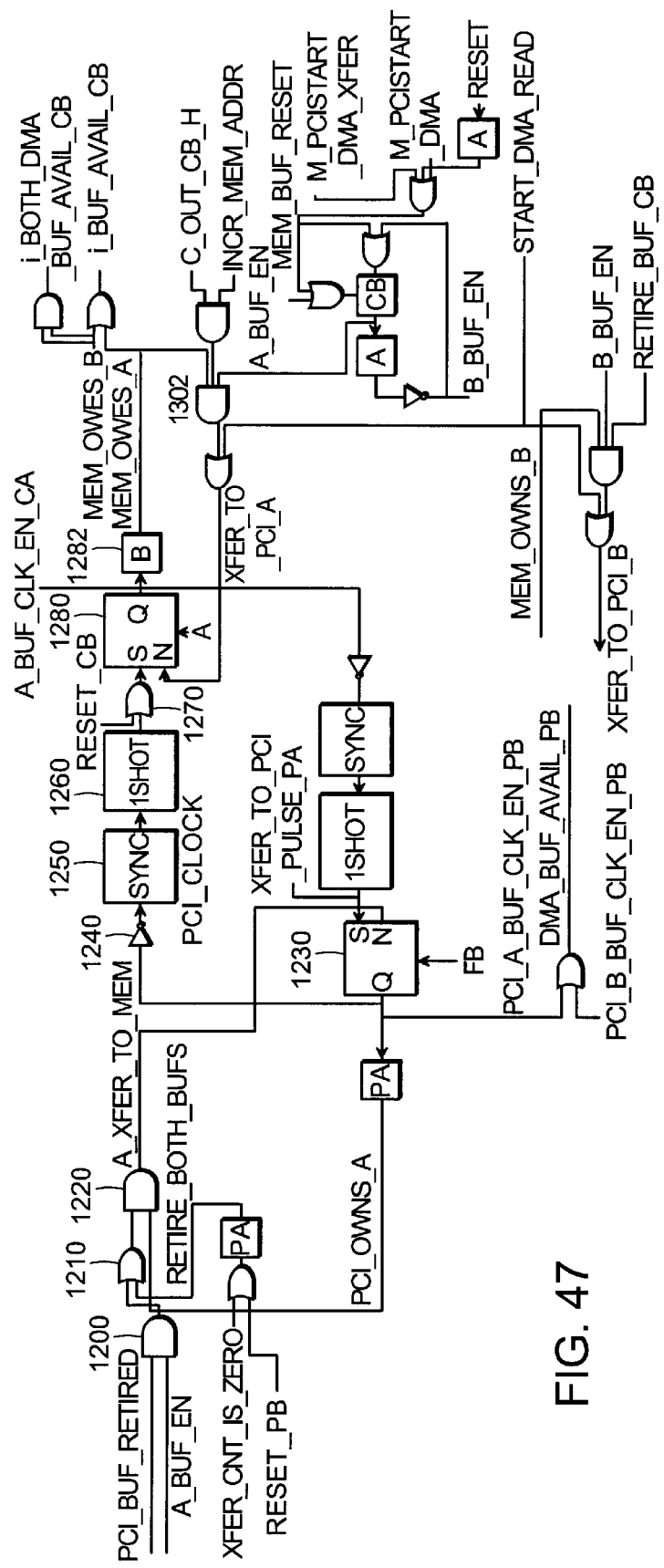
FIG. 47 is a schematic diagram illustrating the control logic used to control the writing and reading of the buffers of FIG. 44.
Figure 48:
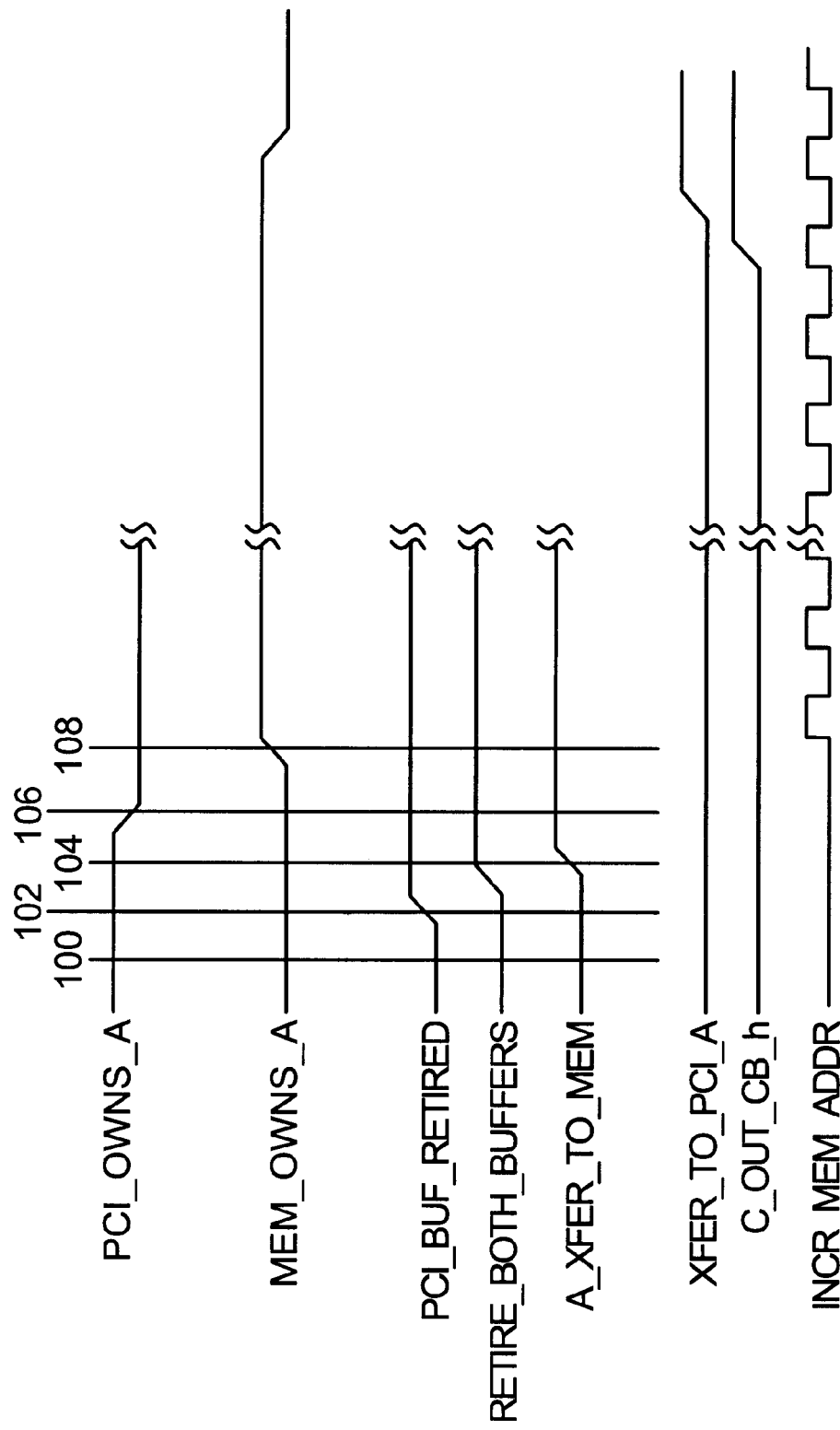
FIG. 48 is a timing diagram illustrating the operation of the control logic of FIG. 47.

Referring now to FIG. 47, one embodiment of a circuit for controlling ownership of one double buffer is shown and will be described with reference to timing diagram 48. A second circuit (not shown) which is functionally similar to the circuit of FIG. 47 is used to control ownership of the second buffer. It should be noted that for illustration purposes, the schematic diagram references each double buffer individually as buffer A and buffer B.

The depicted DMA write operation begins at time T0 with signals PCI_OWNS_A and MEM_OWNS_B asserted, and signals MEM_OWNS_A and PCI_OWNS_B (not shown) de-asserted. At time T2, memory controller 634 is finished loading buffer B with data to be transferred to system memory and controller 1190 is finished emptying buffer A to the PCI™ bus. Therefore the device driver subsequently asserts signal PCI_BUF_RETIRED which causes the outputs of gates 1200 and 1210 to assert. The assertion of the output of gate 1210 causes the output of gate 1220, referred to as signal A_XFER_TO_MEM, to assert at time T4.

The assertion of A_XFER_TO_MEM resets the output of SR-flop 1230 which in turn de-asserts signal PCI_OWNS_A at time T6. The output of SR-flop 1230 is inverted by inverter 1240 and input to synchronizer 1250 which synchronizes it to the PCI™ clock. The synchronized output of 1250, passes through one-shot device 1260 and gate 1270. The output of gate 1270 asserts the output of flop 1280 which, after passing through buffer 1282, becomes signal MEM_OWNS_A at time T8. Thus, at Time T8 the memory controller has acquired ownership of buffer A.

The transfer of ownership of buffer A back to the PCI™ controller 1190 occurs when memory controller 634 completely fills buffer A. Signal XFER_TO_PCI_A is asserted by two data paths. The first data path, referred to as signal START_DMA_READ asserts when a DMA read operation is beginning. The effect of this assertion is to transfer ownership of both buffers to the PCI™ controller because during a read operation, at least one buffer needs to be filled before the memory controller can operate on it. The second data path is comprised of a plurality of signals, beginning with signal A_BUF_EN. Signal A_BUF_EN is one of three inputs to AND gate 1302 which is asserted when the memory controller is actively using buffer A. Signals C_OUT_CB_H and INCR_MEM_ADDR are asserted when the address counter indicates that a full buffer was operated on. When all three signals are asserted, signal XFER_TO_PCI_A is asserted. Therefore at this point in the cycle, buffer A is owned by PCI™ controller 1190 and buffer B is owned by memory controller 634. The cycle will repeat when PCI™ controller empties buffer A.

It should be noted that signal RETIRE_BOTH_BUFFERS only de-asserts when the circuit is in a reset state or when the entire DMA transaction has completed. Upon de-assertion, ownership of both double buffers is passed to the memory controller anticipating that the next data transaction will be a DMA write. This is beneficial because at the beginning of a DMA write operation, the memory controller 634 has to fill at least one buffer before the PCI controller can begin a DMA transfer of data.

The double buffering of data between the PCI controller and memory controller 634 has the advantage of sustaining a continuous flow of data from VCDU to the PCI™ bus 20, as well as from the PCI™ bus 20 to the attached VCDU memory 35.

In terms of the design of the double buffer 1000, the duration of time for memory controller 634 to access data and write it into a buffer is designed to be comparable to the time that it takes the PCI™ controller 1190 to load the same data onto the PCI™ bus. This access time is complicated by independent operations of the PCI™ bus, such as operations which occur during retry cycles, which significantly extends the duration of the data transfer.

Accordingly, the double buffer apparatus can be used in conjunction with the format conversion logic to provide fast format conversion across clock boundaries with a minimum of logic overhead.

XVI.) Data De-interleaving

As mentioned above, data is forwarded to the PCI bus for some purposes in interleaved format. This data may be either forwarded to another multimedia device for immediate display, or stored in a file for later processing. In addition, interleaved data may be input from other sources, besides cameras or video devices such as color decoder 33, such as over a network in the form of a file of interleaved data. At some point the data may need to be processed by the VCDU, which, as described previously, handles data in a planarized, 'block' format. As such, the data must be 'de-interleaved', for handling by the FMU and other devices.

Figure 49:
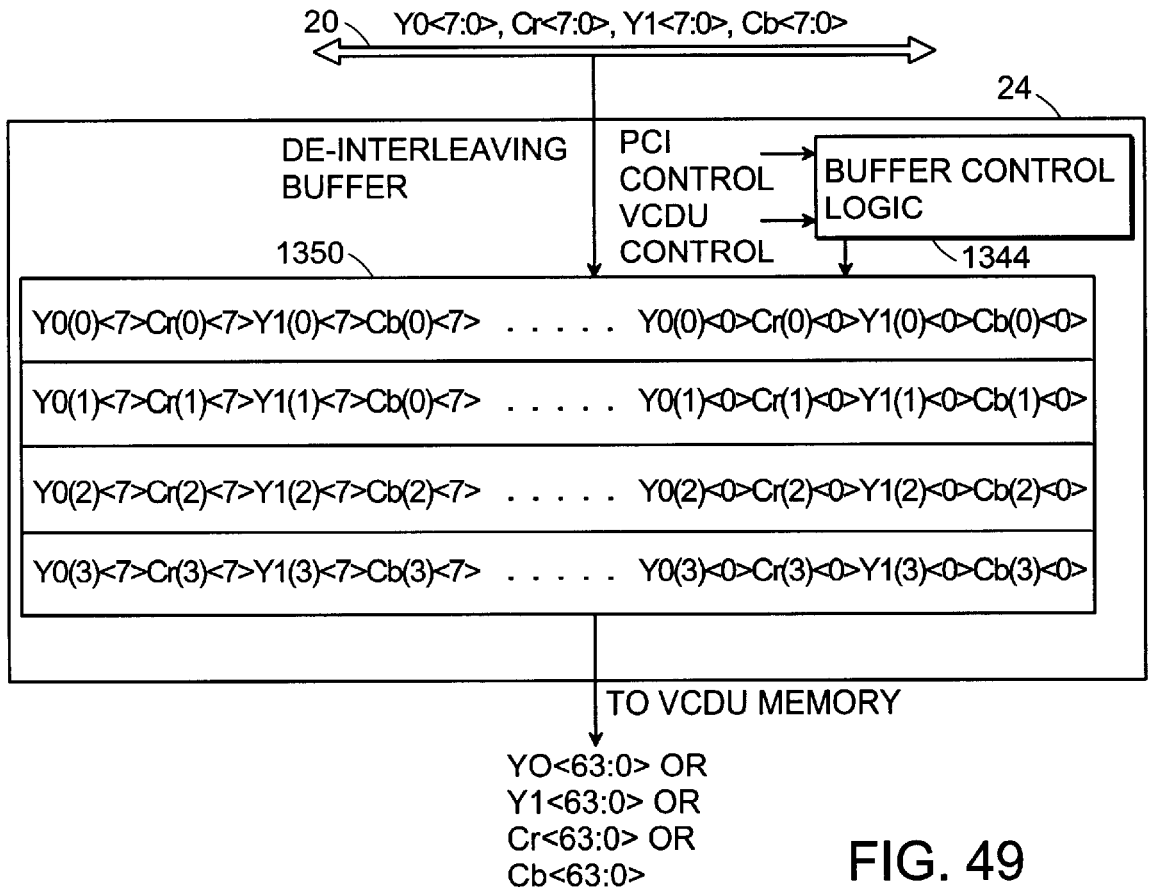
FIG. 49 is a block diagram illustrating a de-interleaving buffer for use in the computer system of FIG. 28.

Referring now to FIG. 49, a block diagram of a de-interleaving buffer 1350 is shown to include 4 rows of data. Each row stores 256 bits of data, although for illustration purposes only the first 32 of each row are shown here. Each row of data stores the pixel data in groups of pixel components in 4:2:2 format. Each 4 bit pixel group of Y0 Cr Y1 Cb values is hereinafter referred to as a '4-tuple'. The input data is received over the PCI bus in the format of a vector of 4-tuples Y0[0:N], Cr[0:N]Y1[0:N]Cb[0:N], where, using a 32 bit PCI bus, N=7.

The de-interleaving buffer is controlled by control signals from the PCI interface logic and from the VCDU functional units as will be described later herein.

When a write is performed to the de-interleaving buffer, all four elements of the 4-tuple are written to one of the four entries in a RAM row sequentially (although it should be noted that the logic may easily be modified by one of skill in the art to allow for virtually simultaneous updates to each of the 4 entries). A distinguishing characteristic of the RAM cell design is that there are multiple RAM cells in one bit pitch. In this embodiment, each RAM cell comprises 4 wordlines, only one of which may be asserted at any given time, and each of which is triggered off of the row address. In addition, each cell includes multiple bit lines, two each (a high and low asserted version) for each of the Y0, Y1, Cr and Cb input signals. A bit-line will only be asserted if that appropriate type of data is to be written during the write operation. Thus data is updated in the RAM cell as a function of not only the address of the bit in the array, but also the type of the data which is being addressed that cycle.

By controlling reads and writes to the memory array as a function of the type of the data, that the overall control of the circuit is simplified and is suited ideally for the video compression application. In addition, the size of the memory cell is comparable to standard RAM cell designs. In addition, the number of read operations that must be performed to retrieve the desired data is reduced.

Figure 50:
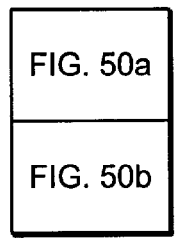
FIGS. 50, 50a and 50b are a schematic diagram of the de-interleaving buffer of FIG. 49.
Figure 50A:
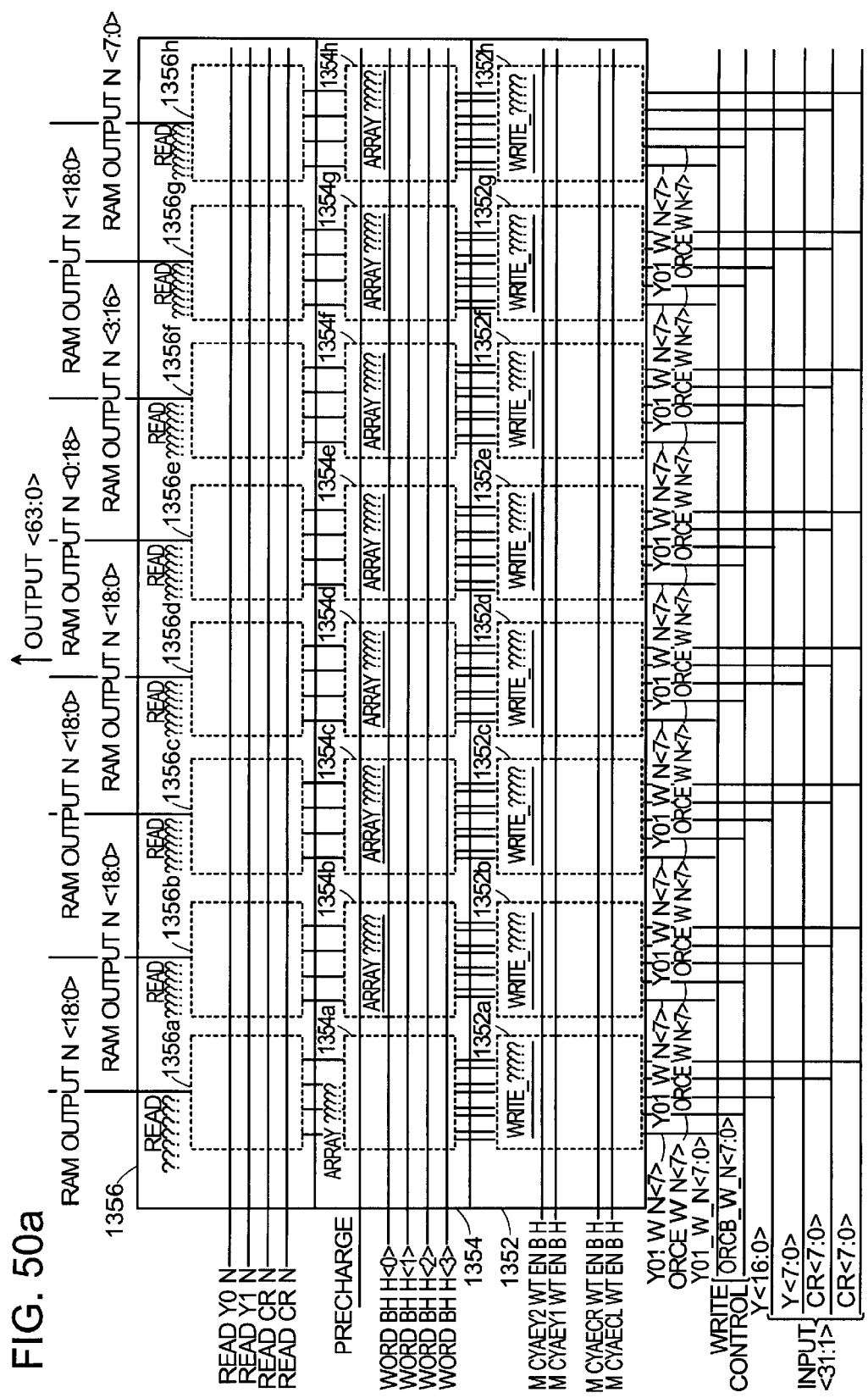
Figure 50B:
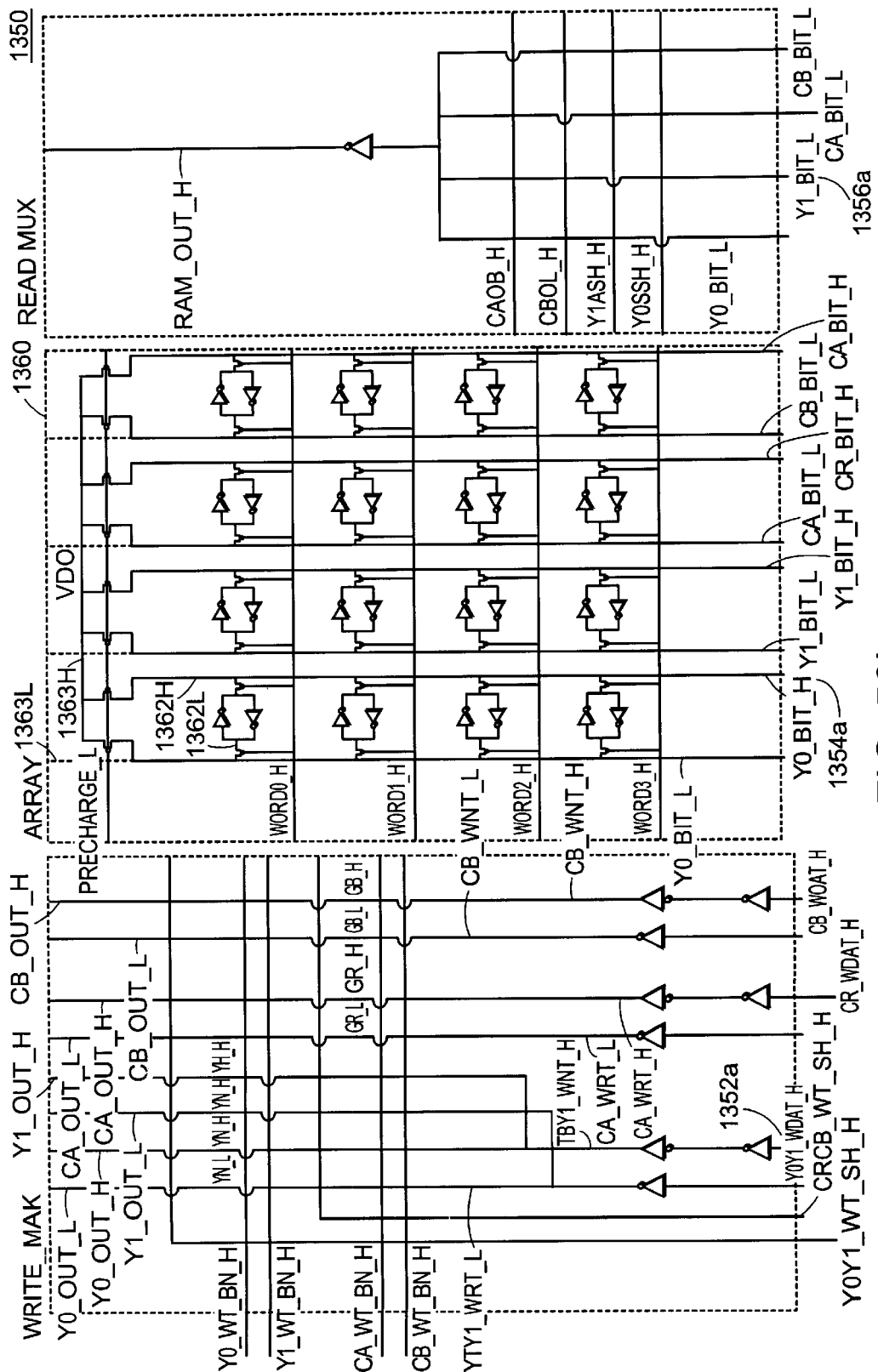

For example, referring now to FIG. 50, and example embodiment of a RAM array 1350 that uses the data type as the address to retrieve data is provided.

Array 1350 is shown to include write logic 1352, storage logic 1354, and read logic 1356. The input data path, here described as received from a PCI bus, provides 32 bits of information for a write operation, comprising 8 bits of Y0, 8 bits of Y1, 8 bits of Cr and 8 bits of Cb data. The input data is received as a series of bit vectors in the form Y0[0:N]Cr[0:N]Y1[0:N]Cb[0:N]. The write control logic 1352 operates to store the data in the form Y0[0]<0>Y1[0]<0>Cr[0]<0>Cb[0]<0>. With such an arrangement data may easily be retrieved for those applications that desire 4:2:2 format.

However, the above arrangement of write data also allows data to be retrieved in planar format for later processing by other elements in the VCDU. The desired output would be a vector 64 bits of luminance data or 64 bits of chrominance data. Retrieving the data in large blocks rather than in the 4:2:0 format allows for the processing unit to separately process the different types of color information as desired.

Storage logic 1354 is further apportioned into 8 sub-arrays 1354a–1354h, where each row of each sub-array stores 8 4-tuples of pixel data information. Associated with each sub-array is a write-mux unit such as unit 1352a and a read mux unit 1356a. The operation and layout of each of the units and the sub-array will now be described with reference to a typical read and write operation.

During a write operation, as mentioned above the input data is received as a series of bit vectors in the form Y0[0:7]Cr[0:7]Y1[0:7]Cb[0:7]. As shown in write_mux block 1352a, the Y0 and Y1 bit values are forwarded on respective bit lines through the write_mux unit 1352. The propagation of these values through the mux is controlled by the Y0_WRT_EN and Y1_WRT_EN signals respectively. These signals are sourced by the buffer controller 1344 in response to write signals received from the PCI bus in accordance with the PCI protocol. In addition, these signals are controlled in response to the type of data that is being updated during this transaction. During normal operation, as described above, a vector of Y0, Y1, Cr and Cb data is received for each PCI cycle. However, there may occur instances when data is fed to the buffer in planar format. As such, some of the write enable signals would not be asserted during that transaction.

The Cr and Cb signals are similarly forwarded through the write_mux 1352a, and passed in response to signals CR_WRT_EN and CB_WRT_EN respectively. Note that, if the enable signals for any of the signals are not asserted, the bit lines output from the mux will similarly not be able to be asserted. These output signals from the write_mux 1352 are then forwarded to their respective arrays 1354.

An example of one bit of one of the sub-arrays 1354a is shown in exploded view to include a precharge stage 1360 for sourcing current to bit lines 1363. Before a read operation, the bit lines 1363H and 1363L are charged to a '1' value by the precharge stage 1360. Four wordlines are shown, with one wordline for each row of data. During a read operation, a wordline is asserted. This allows the storage nodes 1362H and 1362L to drain charge from the appropriate bitline 1363H or 1363L and thus produce a copy of the stored value on the bitlines. Before a write operation, the bit lines 1363H and 1363L are charged to a '1' value by the precharge stage 1360. To perform a write, the data to be stored is driven on to the bit lines via the write control circuit 1352a. When the word line is asserted, the storage node is forced to assume the value on the bitlines in the following manner:

If storage node 1362H is a '1' bitline 1363H is driven by 1352a to a '0', current will be drawn through the pass device onto the bitline and shunted to ground by the write control circuit. This will cause the storage node 1362H to assume a value of '0'. It's complementary node 1362L will then he driven to a '1' by the cross-coupled inverters in the storage cell. If the storage node 1362H is a '0' and bitline 1363H is driven by 1352a to a '1', then no change will occur in either 1362H or 1362L. The behavior of node 1362L is similarly controlled. It should be noted that the operation shown with regard to array 1360 is a typical storage circuit known to those of skill in the art, and thus should not be taken to limit the invention as other variations thereof may be equally operable.

When the data is to be read out of the arrays 1360, the appropriate addresses is asserted, and the corresponding wordline also becomes asserted to drive the value of the storage node onto the output bit lines to the read_mux logic 1356. An exploded view of one of the read_muxes 1356a is shown to include simple pass inverters, with gates tied to the appropriate data type that is being written during the given operation. As such, the read may be conditioned merely by an address and data type desired.

The above arrangement is therefore able to provide de-interleaving of video data at a decreased cost. Read operations are saved because desired large blocks of the desired data type may be retrieved in a given transaction without the need of extra multiplexing, thereby reducing the circuit area and decreasing overall compute cycles.

It should be noted that the above arrangement should not be limited to addressing memory devices as a function of videotype, yet may be broadened to provide a method and apparatus for retrieving desired data based on any characteristics of the data itself.

Thus an architecture has been provided that is capable of providing real-time two pass video compression. The architecture divides portions of the compression process between hardware and software in a manner that minimizes the amount of data transfer over the PCI bus while maximizing the strengths of each of the computational methods. For example, software is used to make encoding decisions and generate the quantization factor. In addition, software is used to translate tokens into bit stream values. By performing both the encoding and the quantization factor generation in the CPU, software is able to monitor the bits usage, and tailor the quantization factor to the requirements of the image. To provide these tasks in hardware would require complex arbitration protocols which would unnecessarily utilize semi-conductor area while removing the flexibility of the CPU to alter the encoding criteria based on performance needs.

In contrast, hardware is used to perform the computational complex tasks of computing energy coefficients and performing block matching for motion estimation, and to encode each macroblock based on the encoding directives provided by the CPU. Encoding involves transforming the macroblock into the frequency domain, quantizing the results and transforming them into run level tokens. Although such a process could be performed in software, implementing the process in hardware saves valuable compute cycles, thereby increasing the overall performance of the system.

The allocation of tasks also serves the important interest of minimizing traffic on the I/O bus. By minimizing traffic, the performance of other external devices, such as the display, is largely unaffected by the addition of a VCDU to the overall system.

In addition, moving a portion of the compression process to software control allows for the motion estimation and motion compensation portions of the compression process to be pipelined such that two frames are always being processed at any given time. By pipelining the motion estimation and motion compensation portions high quality two pass compression can be provided. In particular, by providing a buffer scheme that allows B frames to be delayed, and executed whenever there is a free slot in the pipeline, two pass compression can be provided in real-time.

Having described a preferred embodiment of the invention, it will now become apparent to one of skill in the art that other embodiments incorporating its concepts may be used. It is felt, therefore, that this invention should not be limited to the disclosed embodiment, but rather limited only by the spirit and scope fo the appended claims.

What is claimed is:

1. A method of providing compression of video data input to a video compression/decompression unit (VCDU) coupled to a central processor unit (CPU), said video data comprising a plurality of frames, including predictive frames and bi-directional frames, each of said frames apportioned into a plurality of macroblocks, each of said macroblocks comprising a plurality of pixels, said method comprising the steps of:

said VCDU comparing each of said frames to other ones of said frames to estimate the motion characteristics of each of said macroblocks of each of said frames;

determining, by said CPU, a coding type for each of said macroblocks of each of said frames responsive to said motion characteristics provided from said VCDU;

said VCDU encoding each of said macroblocks of each of said frames responsive to said coding type determined by said CPU to provide one or more tokens for each of said plurality of frames;

buffering, by said CPU, selected ones of said bi-directional frames and processing the buffered frames out of order in which said plurality of frames initially occur;

translating, by said CPU, said one or more tokens for each of said plurality of frames into a bit stream for storage in a storage device; and wherein said VCDU and said CPU are connected by an input-output bus and the steps of the VCDU comparing and the CPU determining provide for minimal traffic on the input-output bus while tasks are efficiently apportioned between said VCDU and said CPU.

2. The method according to claim 1, wherein said step of said VCDU comparing each of said frames further comprises the steps of:

determining at least one motion vector for each of said macroblocks, said at least one motion vector indicating a motion characteristic between said each macroblock and a similar macroblock in a preceding or succeeding frame.

3. The method according to claim 1, wherein said step of said VCDU comparing each of said frames further comprises the steps of determining energy characteristics of each of said macroblocks.

4. The method according to claim 1, wherein said step of said VCDU comparing each of said frames further comprises the steps of:

determining a first and second motion vector for each of said macroblocks, said first and second motion vectors indicating a motion characteristic between said each macroblock and a similar macroblock in a preceding and succeeding frame, respectively; and determining energy characteristics of each of said macroblocks.

5. The method according to claim 2 wherein said step of said determining, by said CPU, a coding type for each of said macroblocks of each of said frames responsive to said motion characteristics further comprises the steps of:

designating each of said macroblocks as either spatial or temporal coding type; and assigning a quantization value to each of said macroblocks, said quantization value for controlling the number of bits that are to be used to encode the macroblock.

6. The method according to claim 4 wherein said step of determining, by said CPU, a coding type for each of said macroblocks of each of said frames responsive to said motion characteristics further comprises the steps of:

designating each of said macroblocks as either spatial or temporal coding type; and assigning a quantization value to each of said macroblocks, said quantization value for controlling the number of bits that are to be used to encode the macroblock.

7. The method according to claim 6, wherein said quantization value is assigned to each of said macroblocks responsive to the energy characteristics of other macroblocks within said associated frame.

8. The method according to claim 6, wherein the step of said VCDU encoding each of said macroblocks of each of said frames responsive to said coding type comprises the steps of:

responsive to said coding type being a temporal coding type and said macroblock being a reference type macroblock, providing an error macroblock by calculating the difference between the value of pixels within said macroblock and the value of pixels within the macroblock indicated by said first motion vector;

responsive to said coding type being a temporal coding type and said macroblock being a non-reference type macroblock, providing an error macroblock by calculating the difference between the value of pixels within said macroblock and the average of value of pixels within the macroblock indicated by said first motion vector and the value of pixels within the macroblock indicated by said second motion vector.

9. The method according to claim 8, wherein the step of said VCDU encoding each of said macroblocks further comprises the step of:

applying a discrete cosine transform to either said macroblock, or said error macroblock, responsive to said coding type being either a spatial coding type or a temporal coding type, respectively, to provide a transformed macroblock.

10. The method according to claim 9, wherein the step of said VCDU encoding each of said macroblocks further comprises the step of:

quantizing each of the macroblocks by multiplying the quantization value provided from said CPU to each of the entries of said transformed macroblock to provide a quantized macroblock.

11. The method according to claim 10, further comprising the step of:

generating one or more tokens for each of said macroblocks, said tokens generated by traversing said quantized macroblock and recording the distance between frequency components in said quantized macroblock.

12. The method according to claim 1, wherein the step of translating, by said CPU, said one or more tokens for each of said plurality of frames into a bit stream for storage in a storage device includes the steps of defining, for each unique one of said one or more tokens, a compact code.

13. A method of performing decompression of a bit stream representing video data stored in a storage device of a computer system, said computer system including a central processing unit (CPU) and a video compression/decompression unit (VCDU) coupled to said CPU, said video data comprising a plurality of frames, each of said frames apportioned into a plurality of macroblocks, said method comprising the steps of:

translating, by said CPU, said bit stream into one or more tokens for each of said plurality of frames;

said VCDU decoding each of said tokens to construct a plurality of macroblocks for each of said frames;

decoding, by said CPU, a coding type for each of said macroblocks of each of said frames, said coding type for indicating how each of said macroblocks is compressed; and using at least one stored motion vector for each of said macroblocks, and responsive to said coding type of each of said macroblocks, reconstructing each macroblock to provide a restored video image;

wherein said coding types include temporal coding types and spatial coding types, and wherein said step of reconstructing each said macroblock further comprises the step of:

responsive to said coding type being a temporal coding type providing said restored macroblock by adding the contents of each entry of said macroblock to the value of pixels within the macroblock indicated by a first motion vector;

applying an inverse discrete cosine transform to either said constructed macroblock, or said restored macroblock, responsive to said coding type being either a spatial coding type or a temporal coding type, respectively, to provide a reconstructed macroblock for use in said restored video image;

wherein the macroblock is double-buffered between a quantization process and a discrete cosine transform process; and wherein said VCDU and said CPU are connected by an input-output bus and in a compression process the VCDU compares frames to estimate motion characteristics of macroblocks and the CPU determines code types of the macroblocks based on the motion characteristics from the VCDU, said comparing and determining providing minimal traffic on the input-output bus while tasks are efficiently apportioned between said VCDU and said CPU.

14. An apparatus for performing compression and decompression of video data input to a video compression/decompression unit (VCDU) coupled via interface means to a central processor unit (CPU), said video data comprising a plurality of frames, including predictive frames and bi-directional frames, each of said frames apportioned into a plurality of macroblocks, each of said macroblocks comprising a plurality of pixels, said VCDU further comprising:

motion estimation means, in said VCDU for comparing each of said frames to other ones of said frames to estimate the motion characteristics of each of said macroblocks of each of said frames;

means for encoding each of said macroblocks of each of said frames responsive to a coding type determined by said CPU to provide one or more tokens for each of said plurality of frames;

means for buffering, by said CPU, selected ones of said bi-directional frames and for processing the buffered frames out of order in which said plurality of frames initially occur; and wherein said interface means comprise an input-output bus and the motion estimation means and means for encoding provide minimal traffic on the input-output bus while each means efficiently apportions tasks between said VCDU and said CPU.

15. The apparatus of claim 14, wherein said CPU further comprises:

means for determining said coding type for each of said macroblocks of each of said frames responsive to said motion characteristics provided from said VCDU via said interface means; and translating means for converting said one or more tokens received via said interface means from said VCDU for each of said plurality of frames into a bit stream for storage in a storage device.

16. The apparatus of claim 14 further comprising:

reconstruction means, in said VCDU for translating said bit stream representing said plurality of frames into frame data.

17. The apparatus of claim 16 wherein said motion estimation means is coupled to receive video data from an external device and is further coupled to receive frame data from said reconstruction means.

* * * * *